(12) United States Patent
Rabhi

(10) Patent No.: US 12,523,210 B2
(45) Date of Patent: Jan. 13, 2026

(54) MECHANICAL LIQUID PISTON SLOW EXPANSION COMPRESSOR

(71) Applicant: Vianney Rabhi, Lyons (FR)

(72) Inventor: Vianney Rabhi, Lyons (FR)

(*) Notice: Subject to any disclaimer, the term of this patent is extended or adjusted under 35 U.S.C. 154(b) by 0 days.

(21) Appl. No.: 18/636,695

(22) Filed: Apr. 16, 2024

(65) Prior Publication Data

US 2024/0344508 A1    Oct. 17, 2024

Related U.S. Application Data

(60) Provisional application No. 63/496,553, filed on Apr. 17, 2023.

(51) Int. Cl.
| | |
|---|---|
| *F04B 39/00* | (2006.01) |
| *F04B 39/06* | (2006.01) |
| *F04B 53/08* | (2006.01) |
| *F04B 53/14* | (2006.01) |
| *F04B 53/16* | (2006.01) |

(52) U.S. Cl.
CPC .......... *F04B 39/0011* (2013.01); *F04B 39/06* (2013.01); *F04B 53/08* (2013.01); *F04B 53/141* (2013.01); *F04B 53/162* (2013.01)

(58) Field of Classification Search
CPC ...... F04B 39/0011; F04B 39/06; F04B 53/08; F04B 53/141; F04B 53/162
USPC ......................................................... 417/460
See application file for complete search history.

(56) References Cited

U.S. PATENT DOCUMENTS

| | | | | |
|---|---|---|---|---|
| 1,681,280 | A * | 8/1928 | Bruckner | F04B 39/06 92/186 |
| 1,872,932 | A * | 8/1932 | Goldsborough | F04B 25/005 417/438 |
| 1,929,350 | A * | 10/1933 | Christensen | F25B 31/00 417/438 |
| RE37,603 | E * | 3/2002 | Coney | F04B 39/062 60/407 |
| 8,657,588 | B2 * | 2/2014 | Lund | F04B 9/06 417/259 |
| 2007/0251379 | A1* | 11/2007 | Lund | F04B 39/0016 92/172 |

(Continued)

FOREIGN PATENT DOCUMENTS

| | | | |
|---|---|---|---|
| CN | 111734604 A * | 10/2020 | |
| GB | 2534244 A * | 7/2016 | F02G 1/055 |

*Primary Examiner* — Christopher S Bobish
(74) *Attorney, Agent, or Firm* — NIXON & VANDERHYE

(57) ABSTRACT

The mechanical liquid piston slow expansion compressor (1) comprises a liquid cylinder (8) which pivots about a tilt axis (9) and into which a hydraulic piston (10) translates, which is fixedly secured to a connecting rod (11) connected to a crank (26) of a crankshaft (24), the axis of rotation of which is parallel to the tilt axis (9), while piston guiding means (23) maintain the connecting rod (11) and the hydraulic piston (10) always parallel to the liquid cylinder (8), these two latter forming a variable hydraulic volume (12) filled with a working liquid (13) which communicates with a gas and liquid reservoir (14) in which heat exchange and accumulation means (16) are housed, said reservoir (14) and said liquid (13) forming a variable pneumatic volume (2) in which a working gas (5) is compressed or expanded.

32 Claims, 23 Drawing Sheets

(56) References Cited

U.S. PATENT DOCUMENTS

2015/0110647 A1* 4/2015 Wilhelm ............ F04B 39/0005
417/228

* cited by examiner

[Fig. 1]
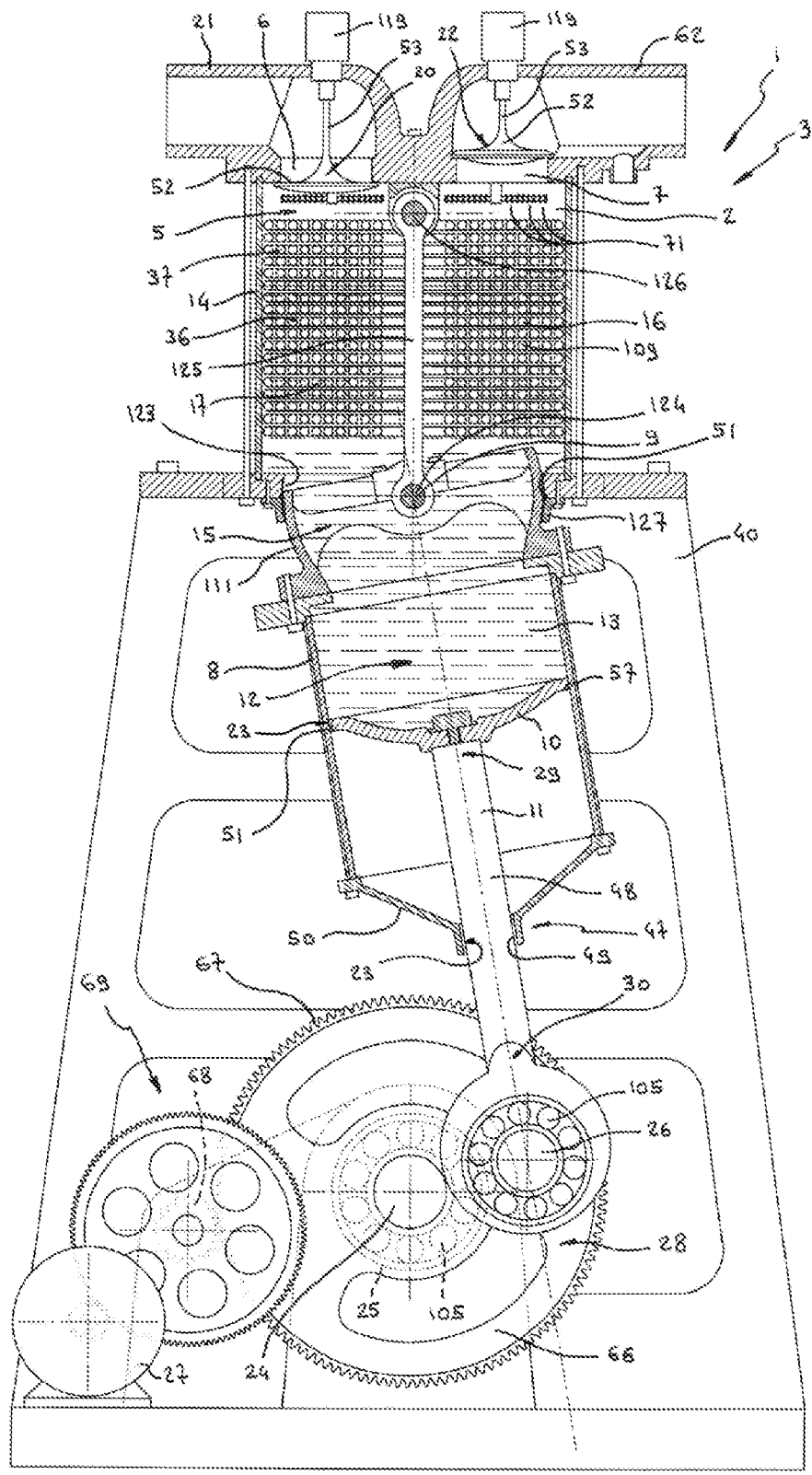

[Fig. 2]
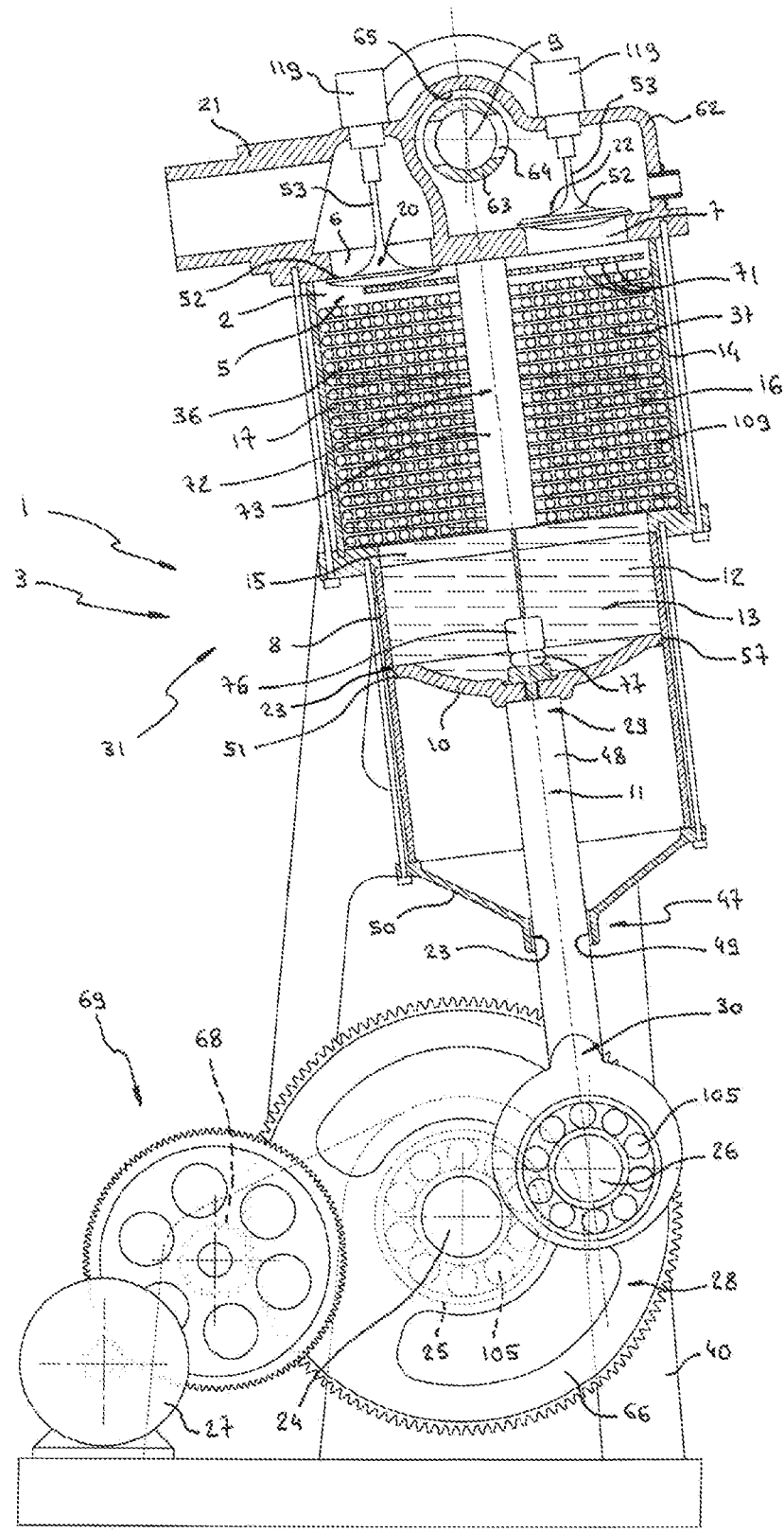

[Fig. 3]
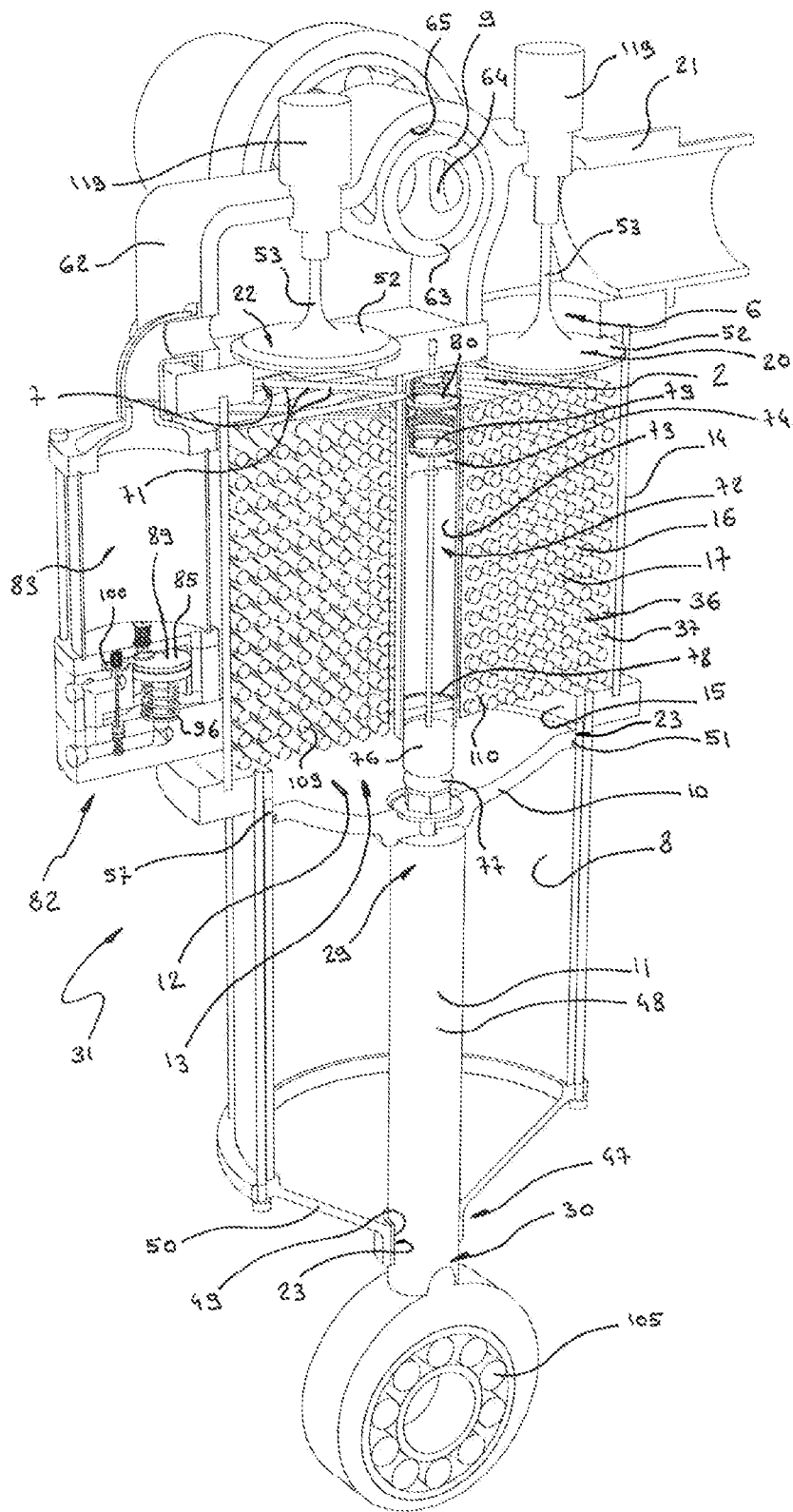

[Fig. 4]
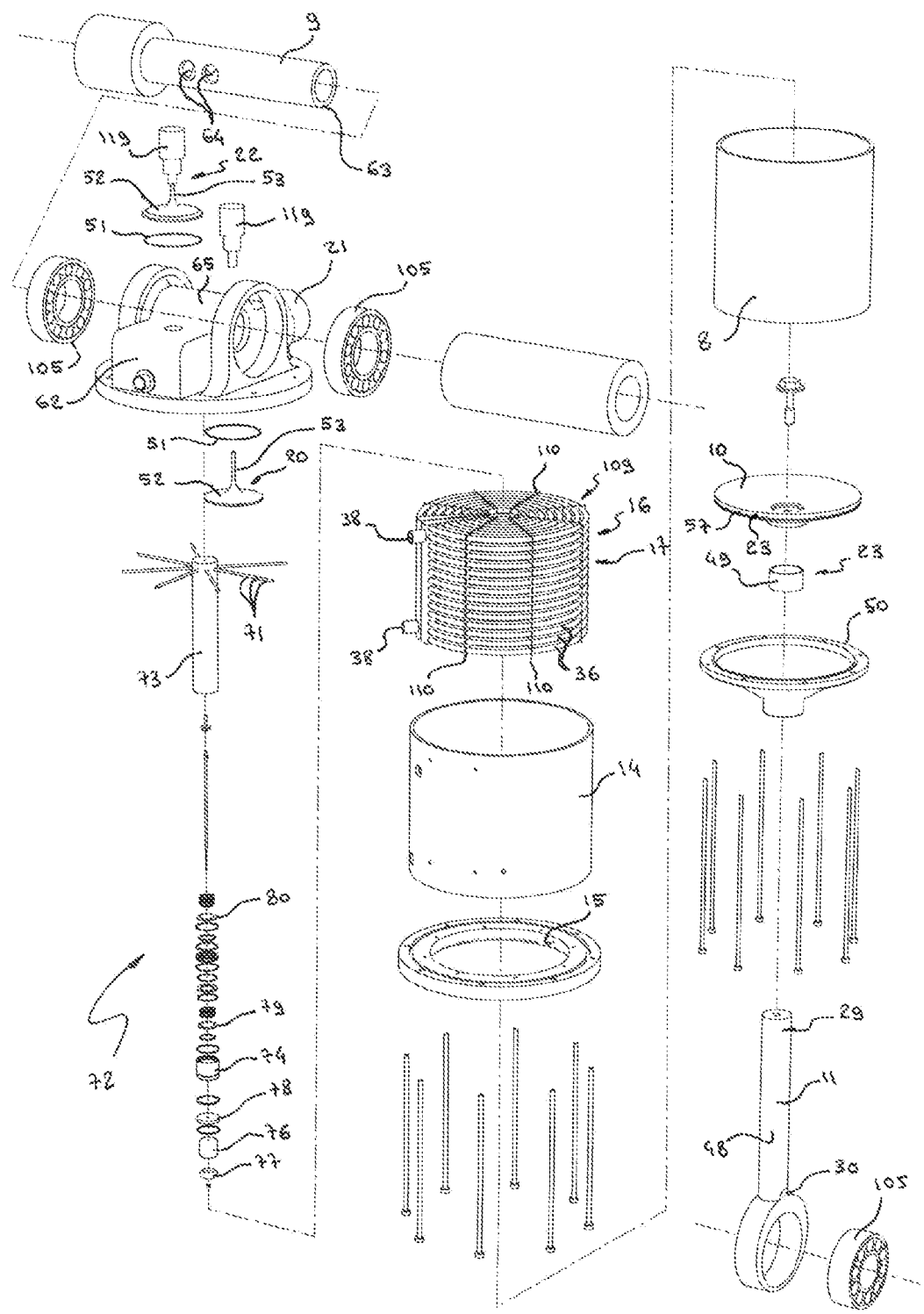

[Fig. 5]
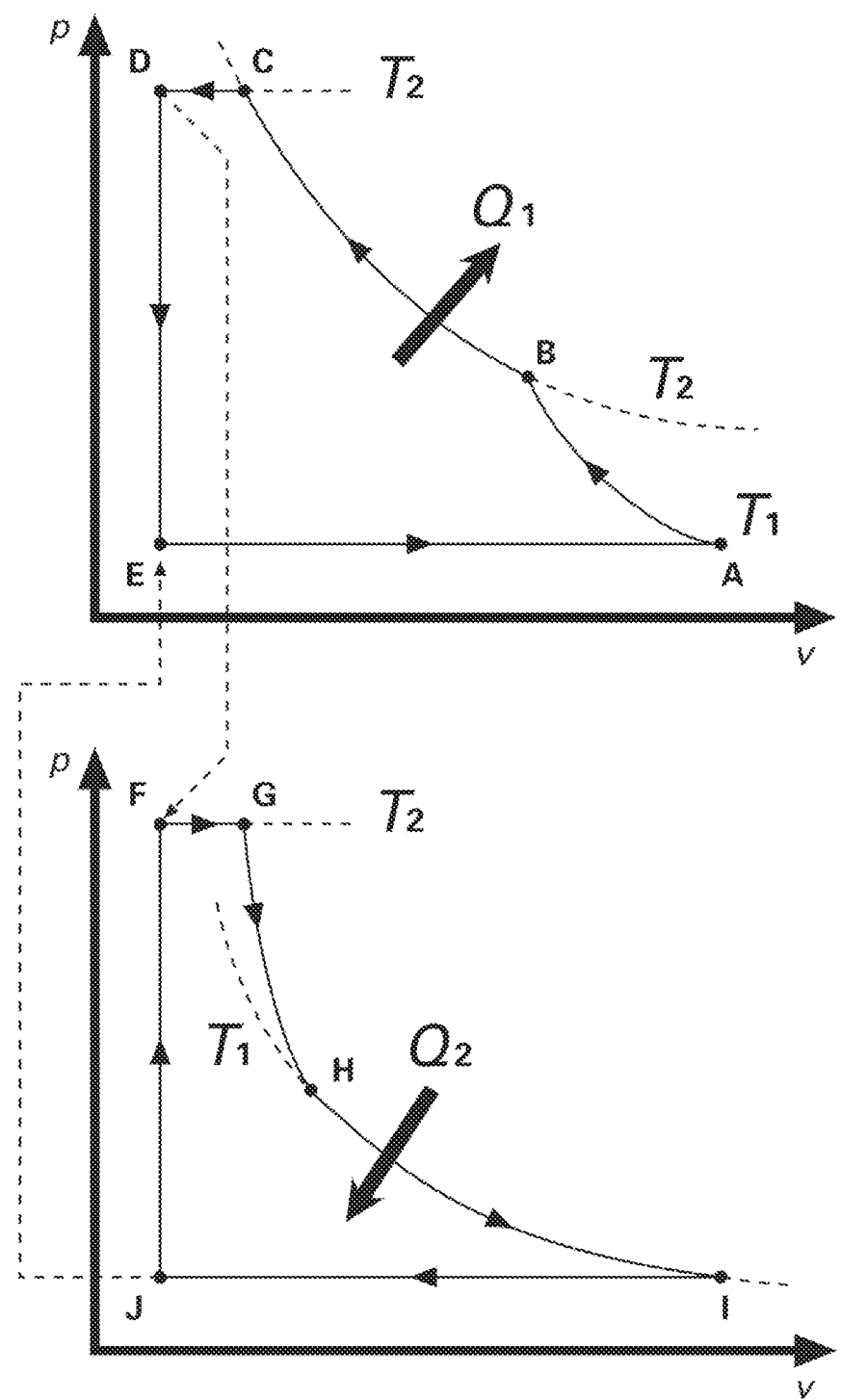

[Fig. 6]
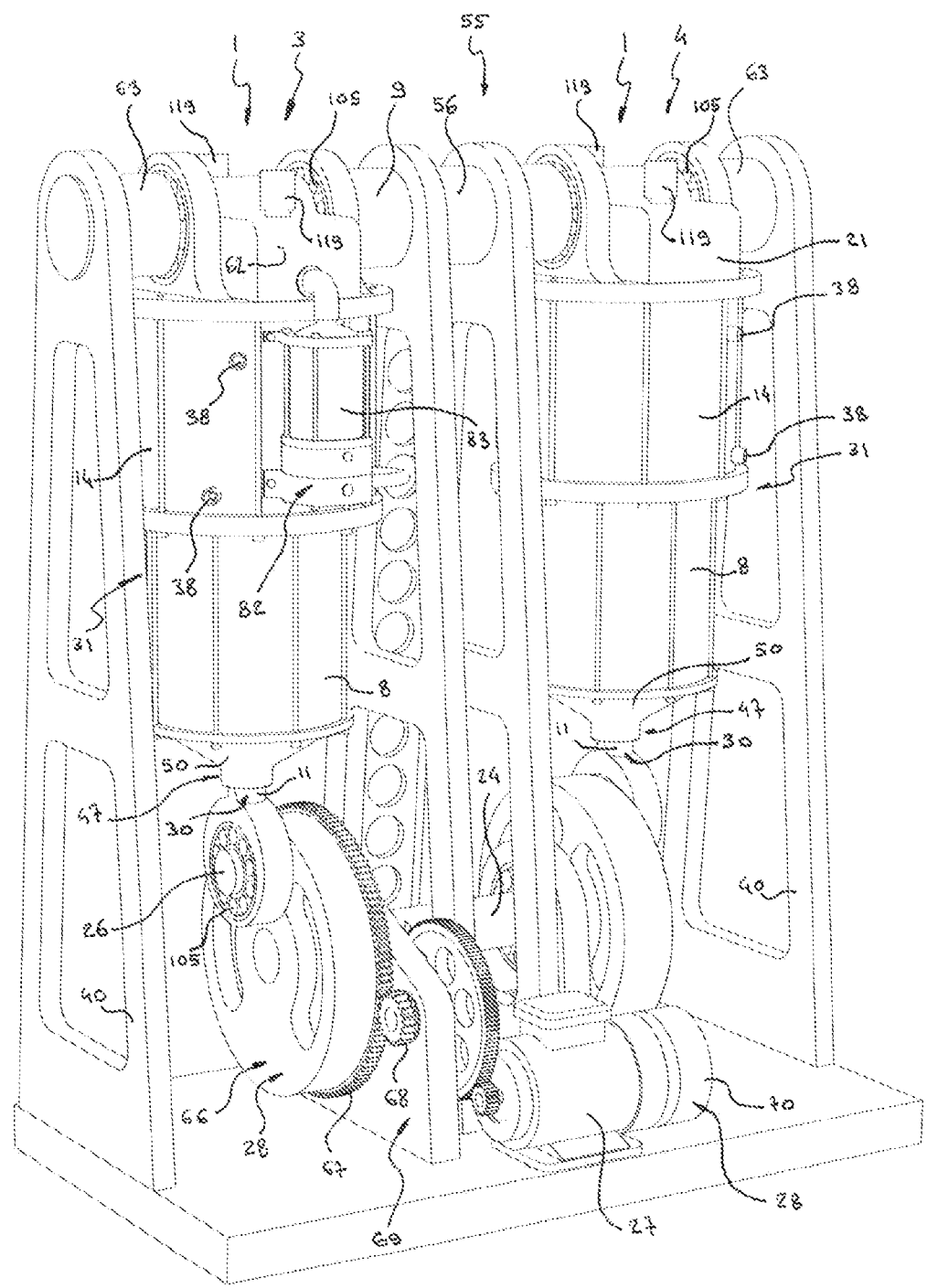

[Fig. 7]
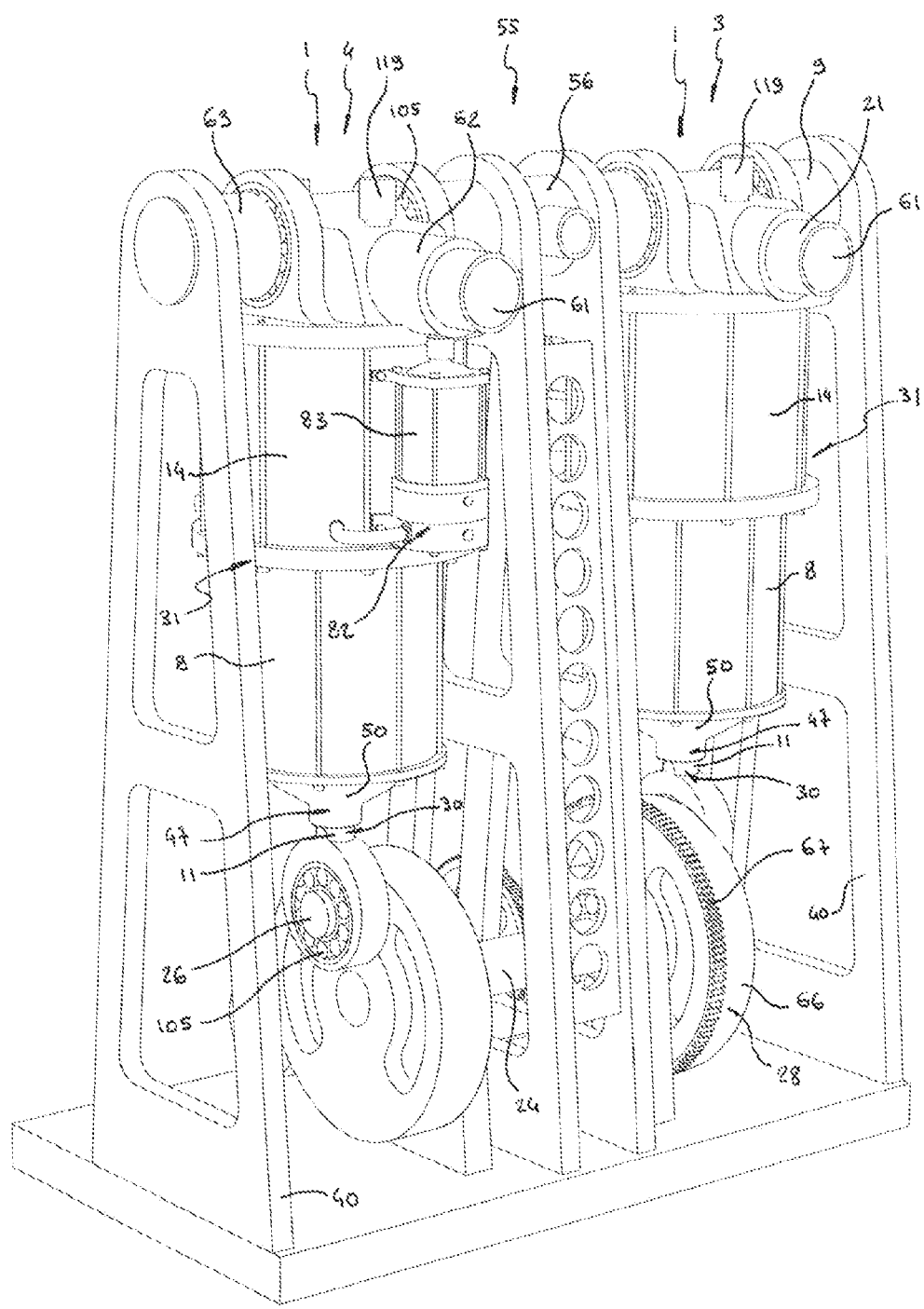

[Fig. 8]
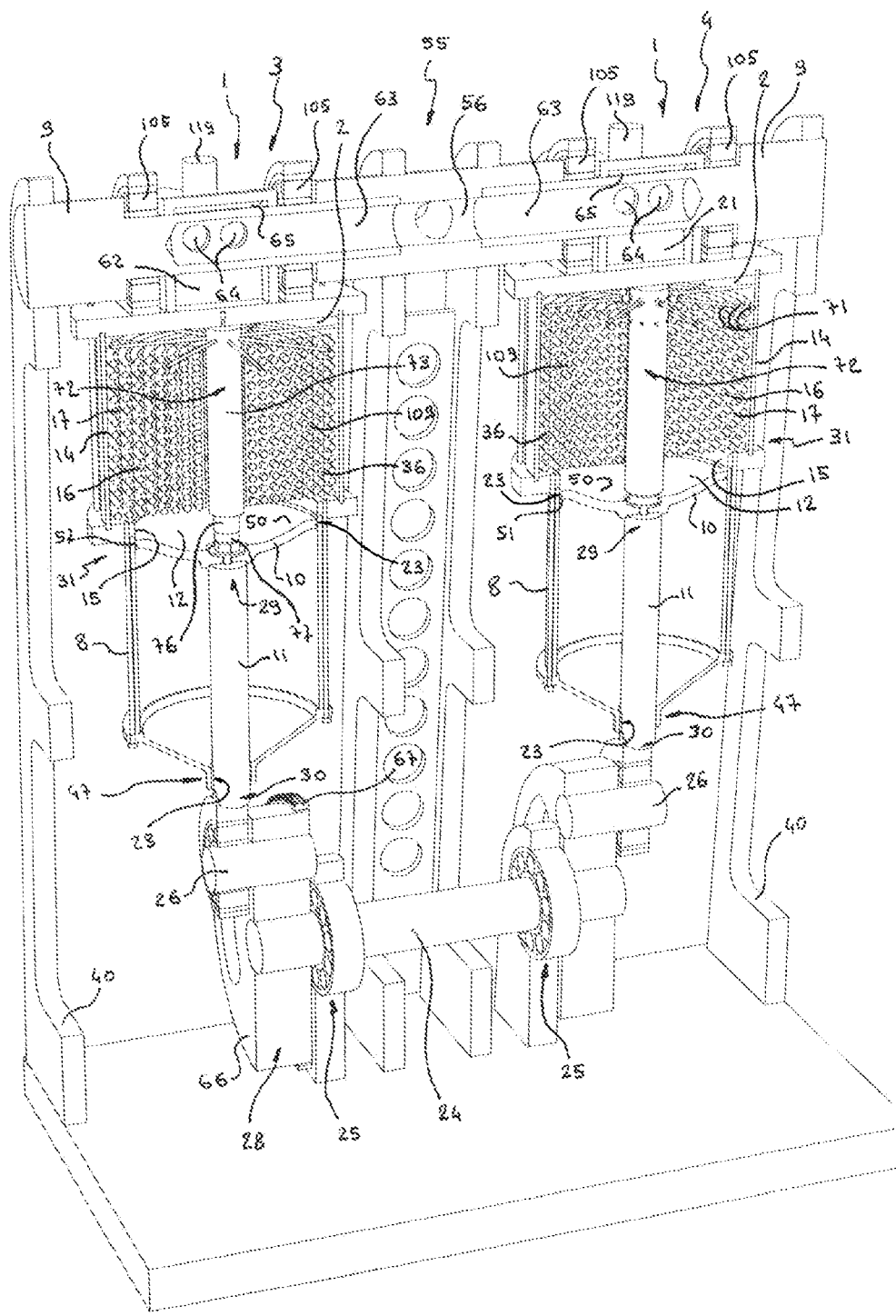

[Fig. 9]
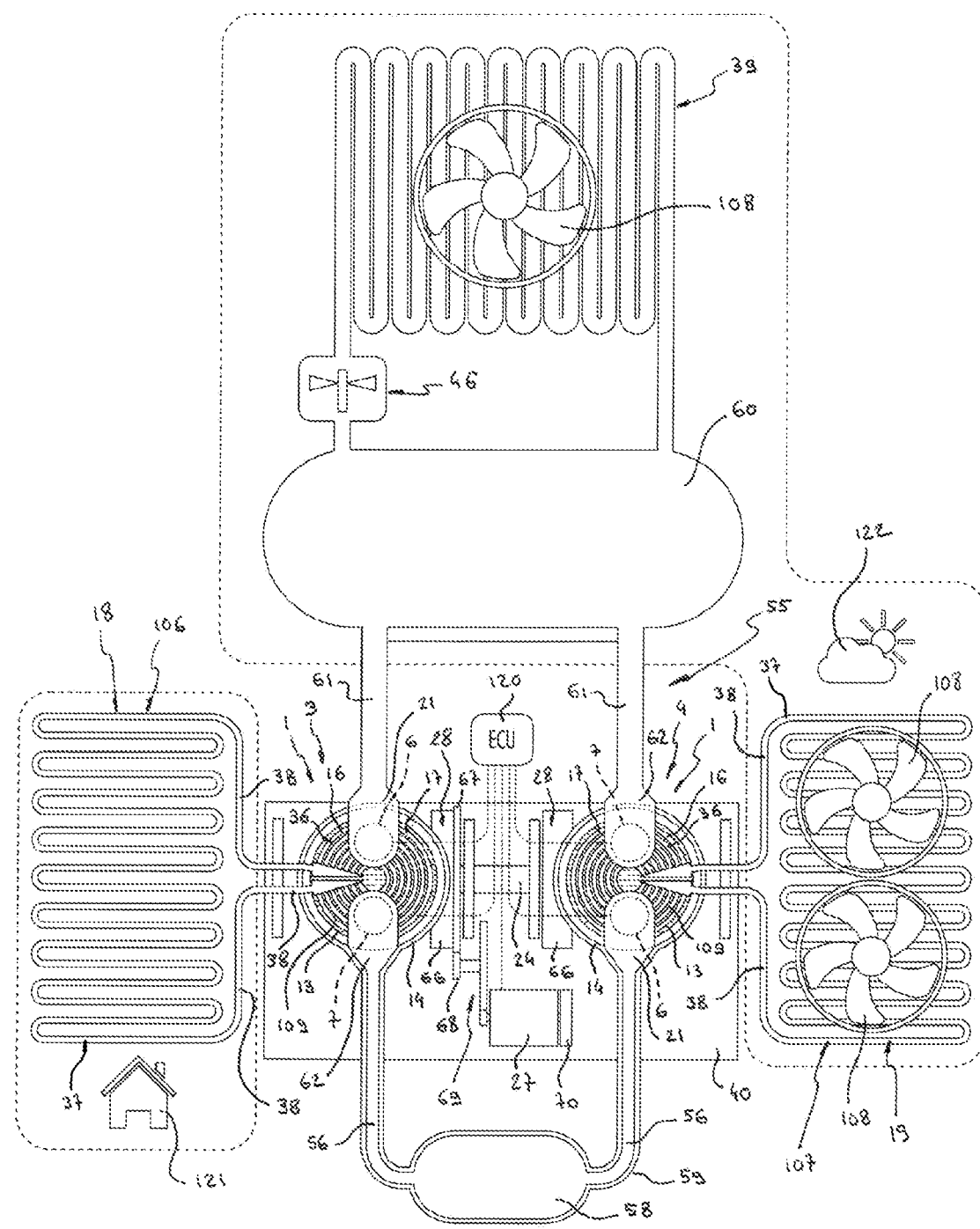

[Fig. 10]
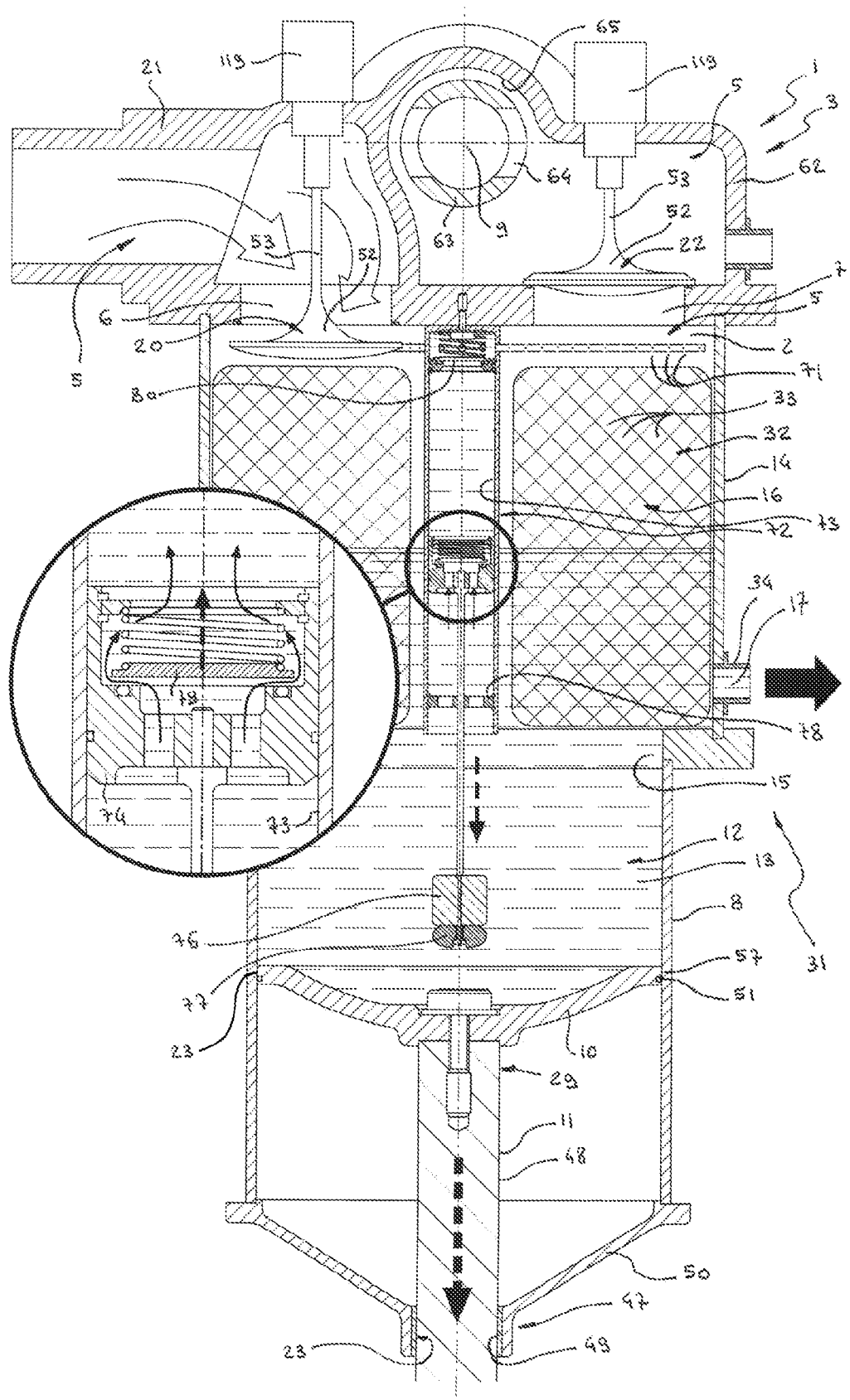

[Fig. 11]
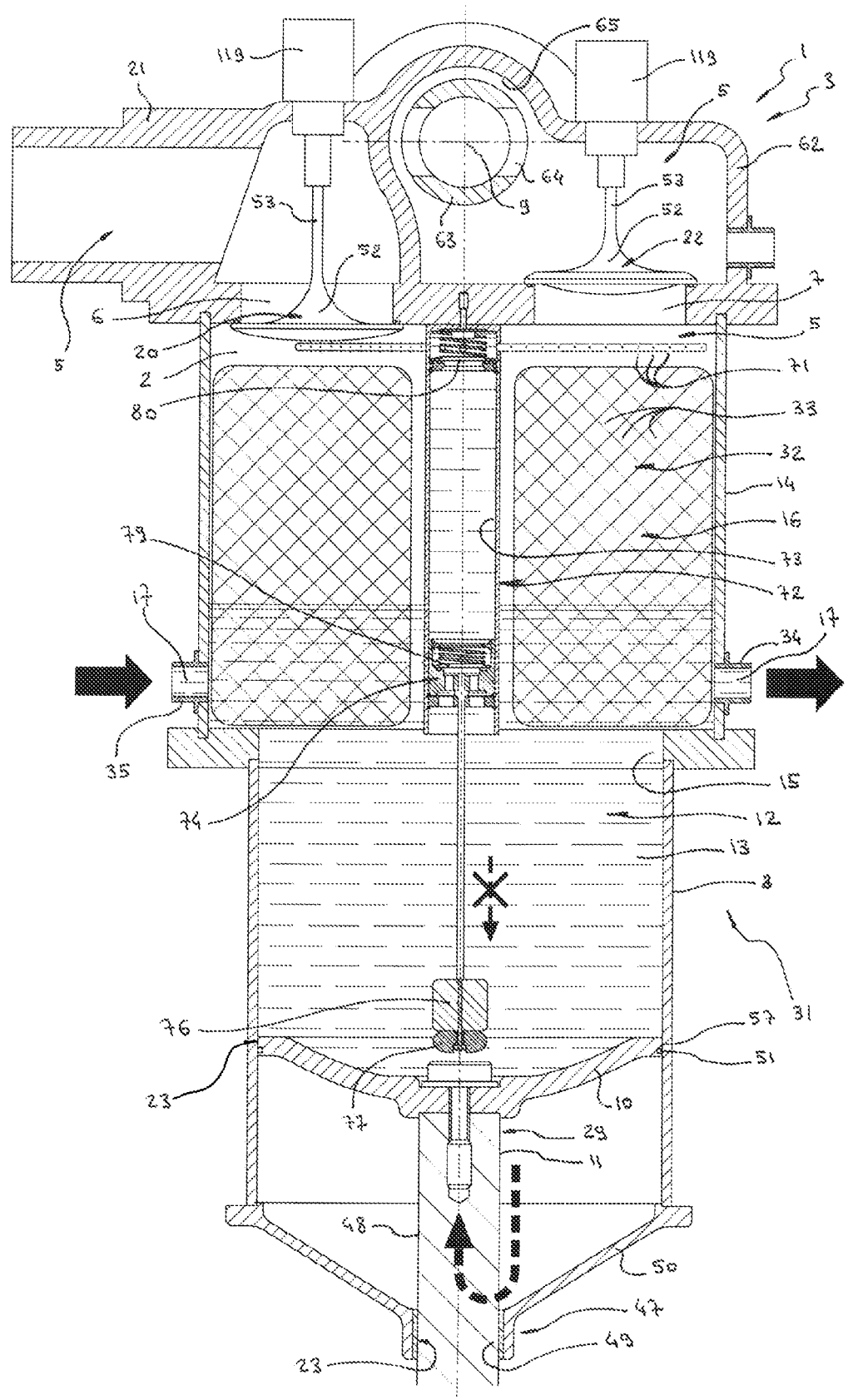

[Fig. 12]
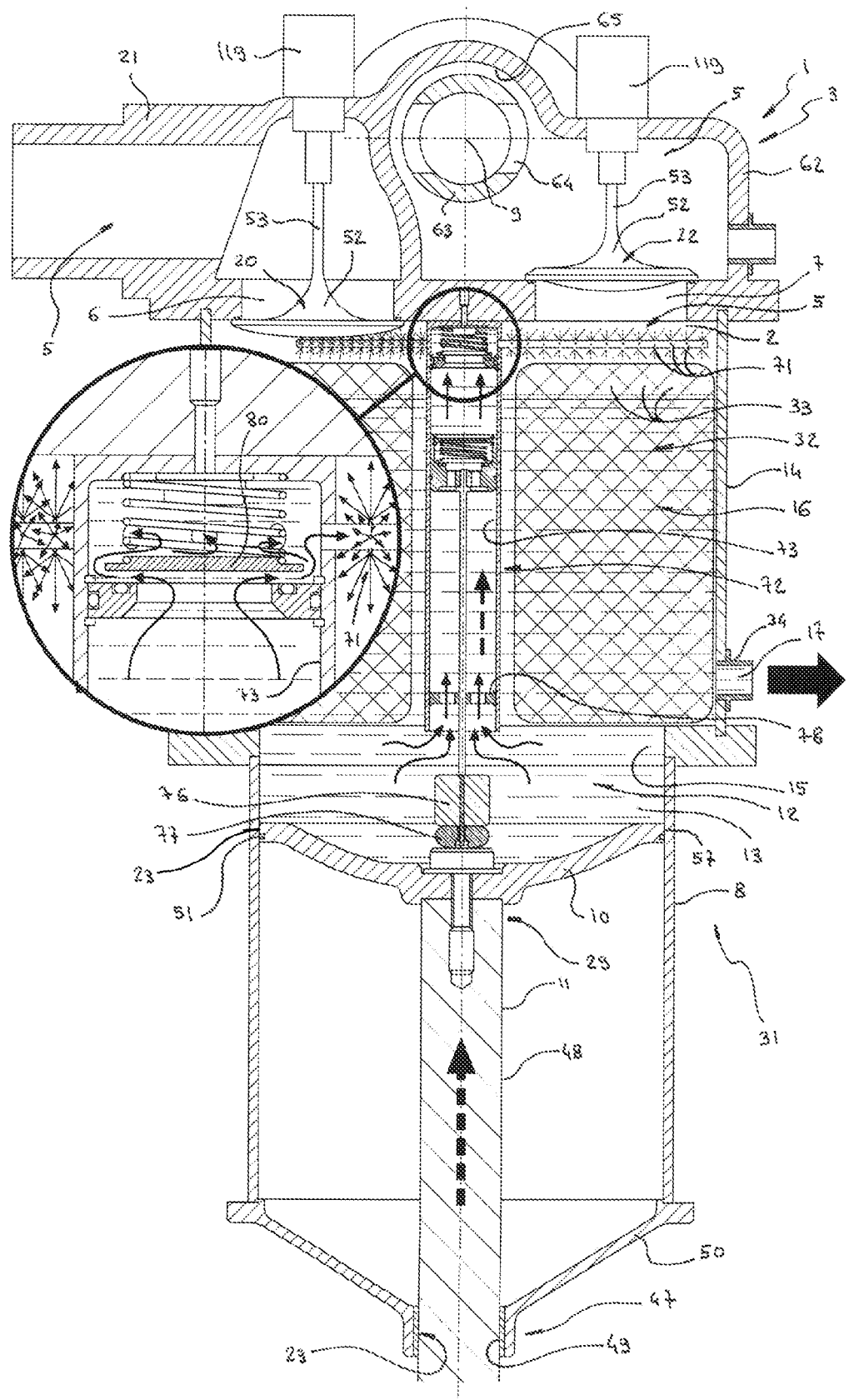

[Fig. 13]
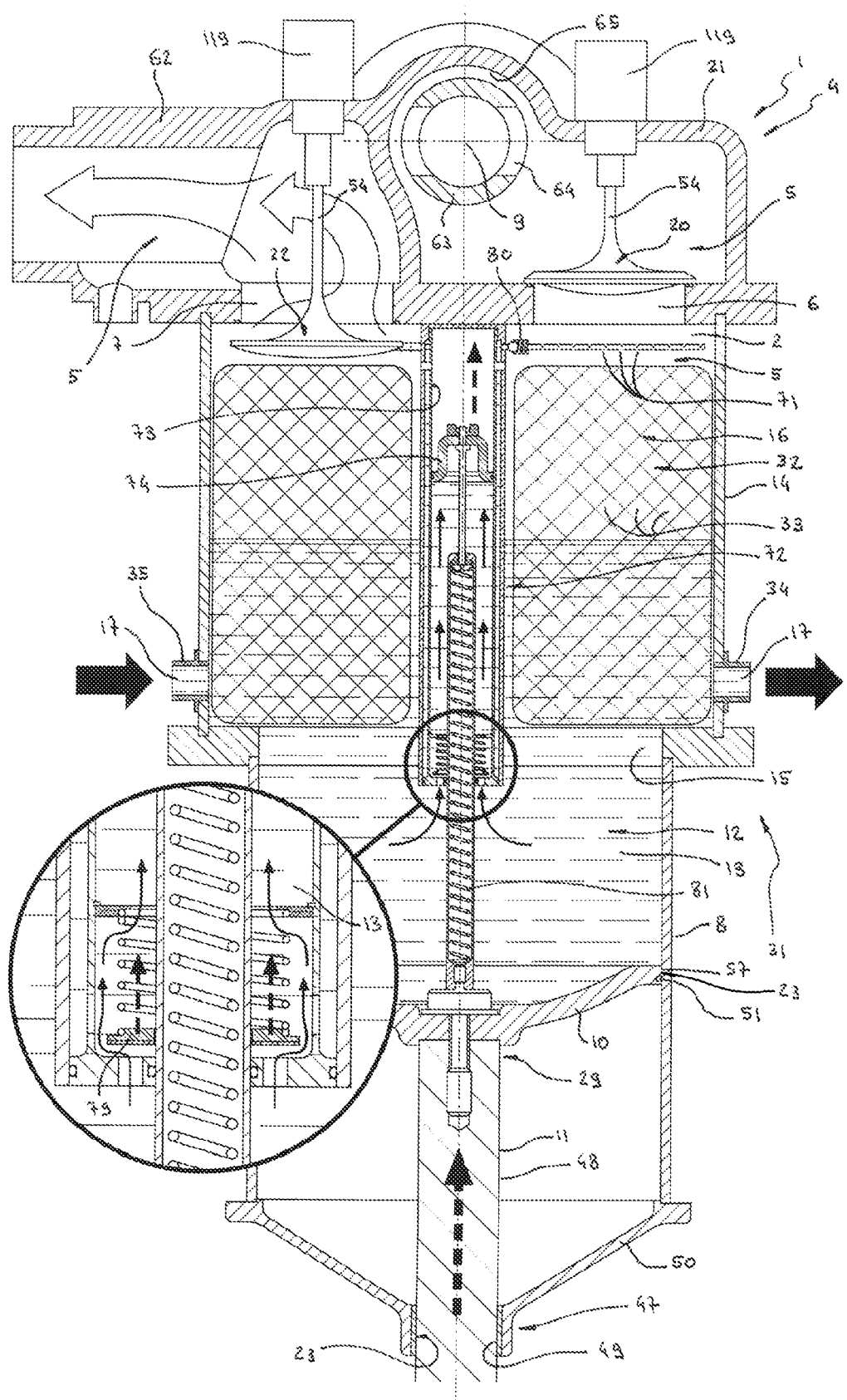

[Fig. 14]
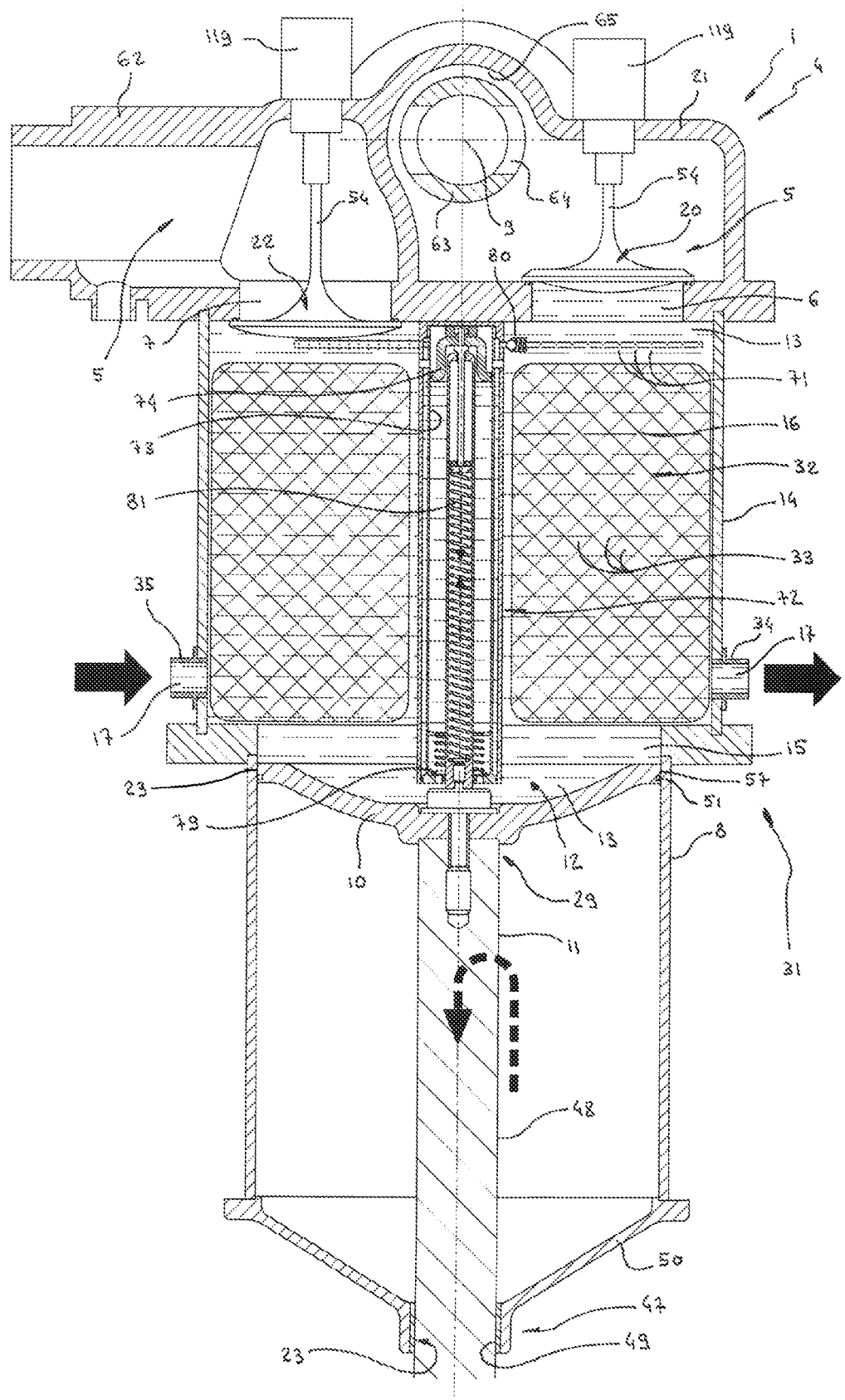

[Fig. 15]
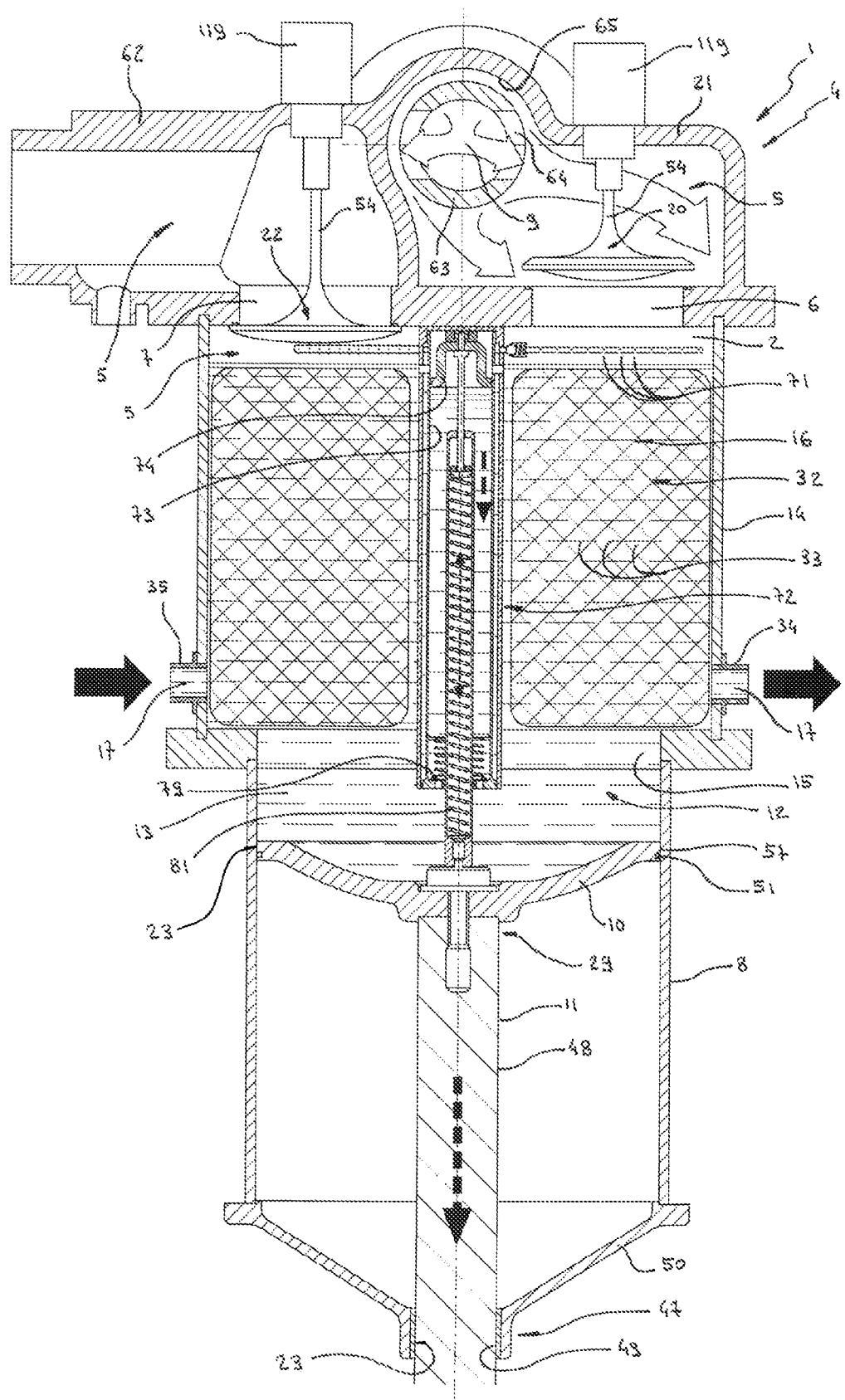

[Fig. 16]
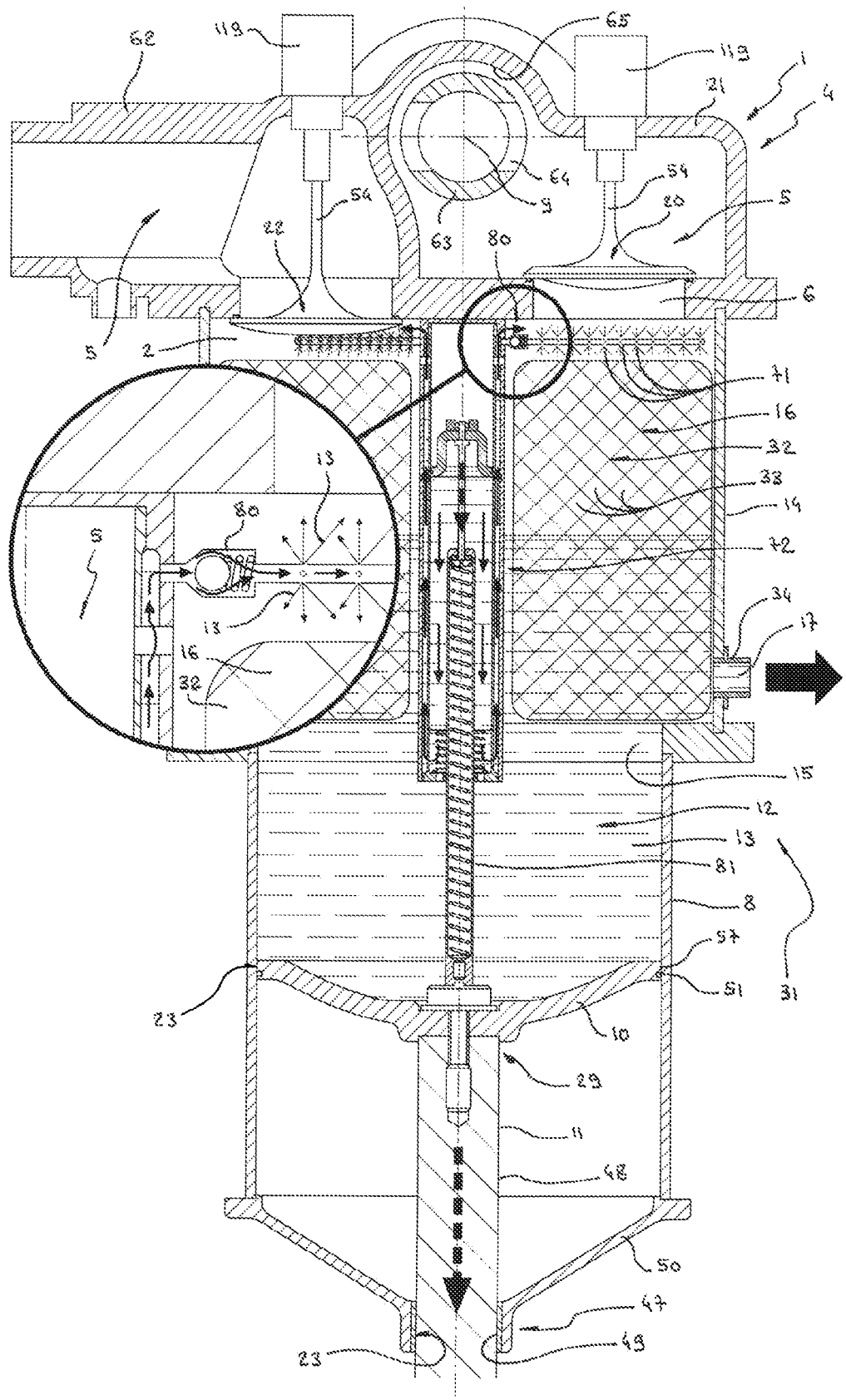

[Fig. 17]
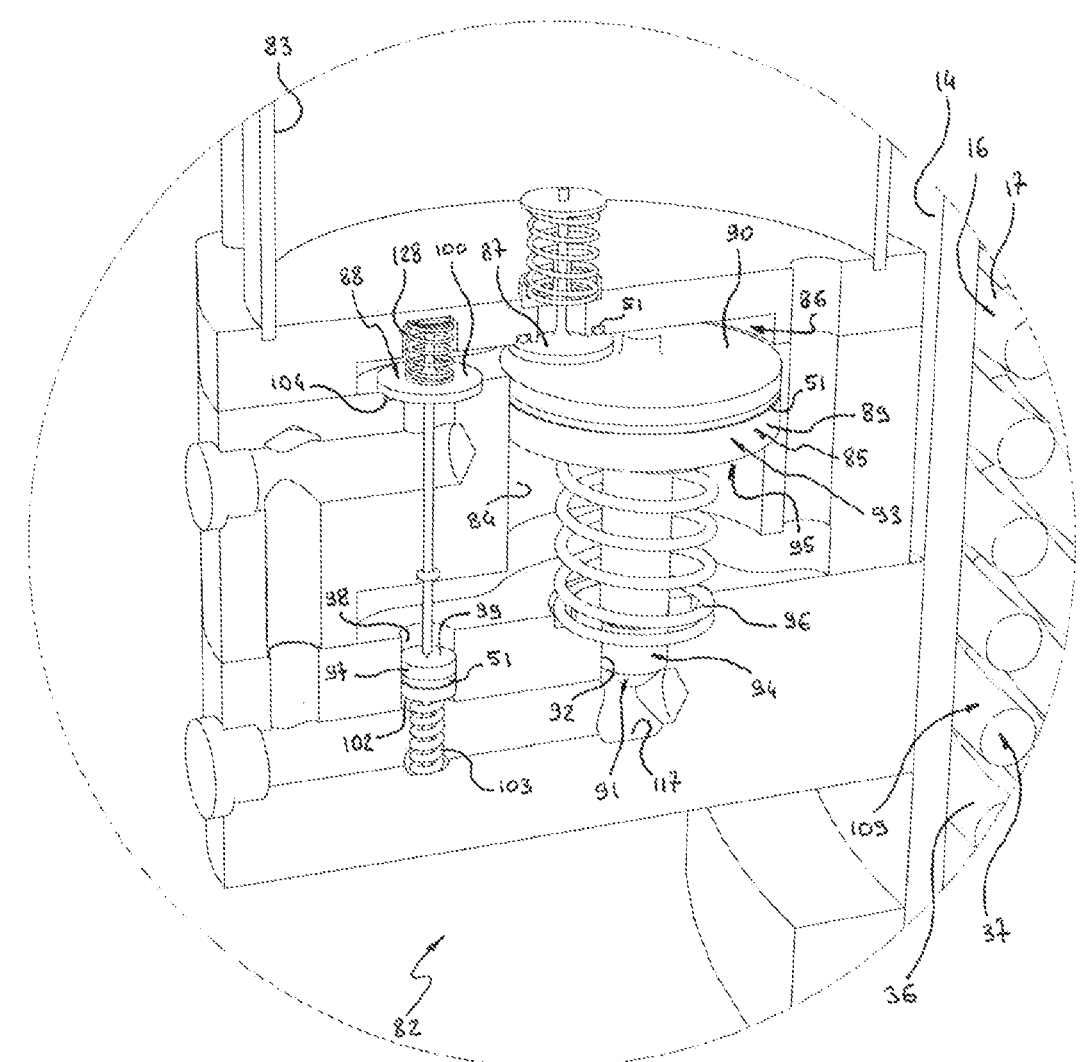

[Fig. 18]
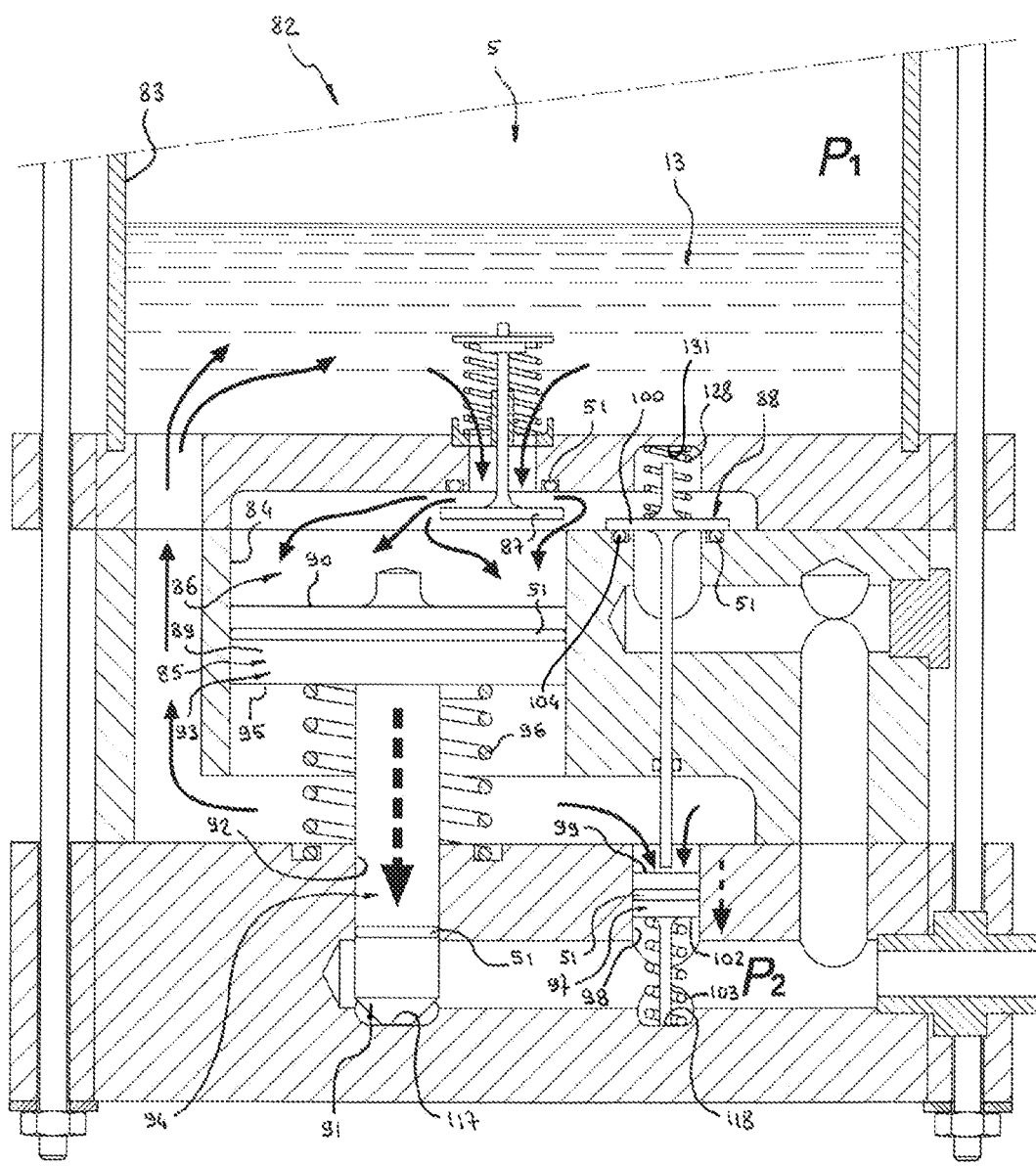

[Fig. 19]
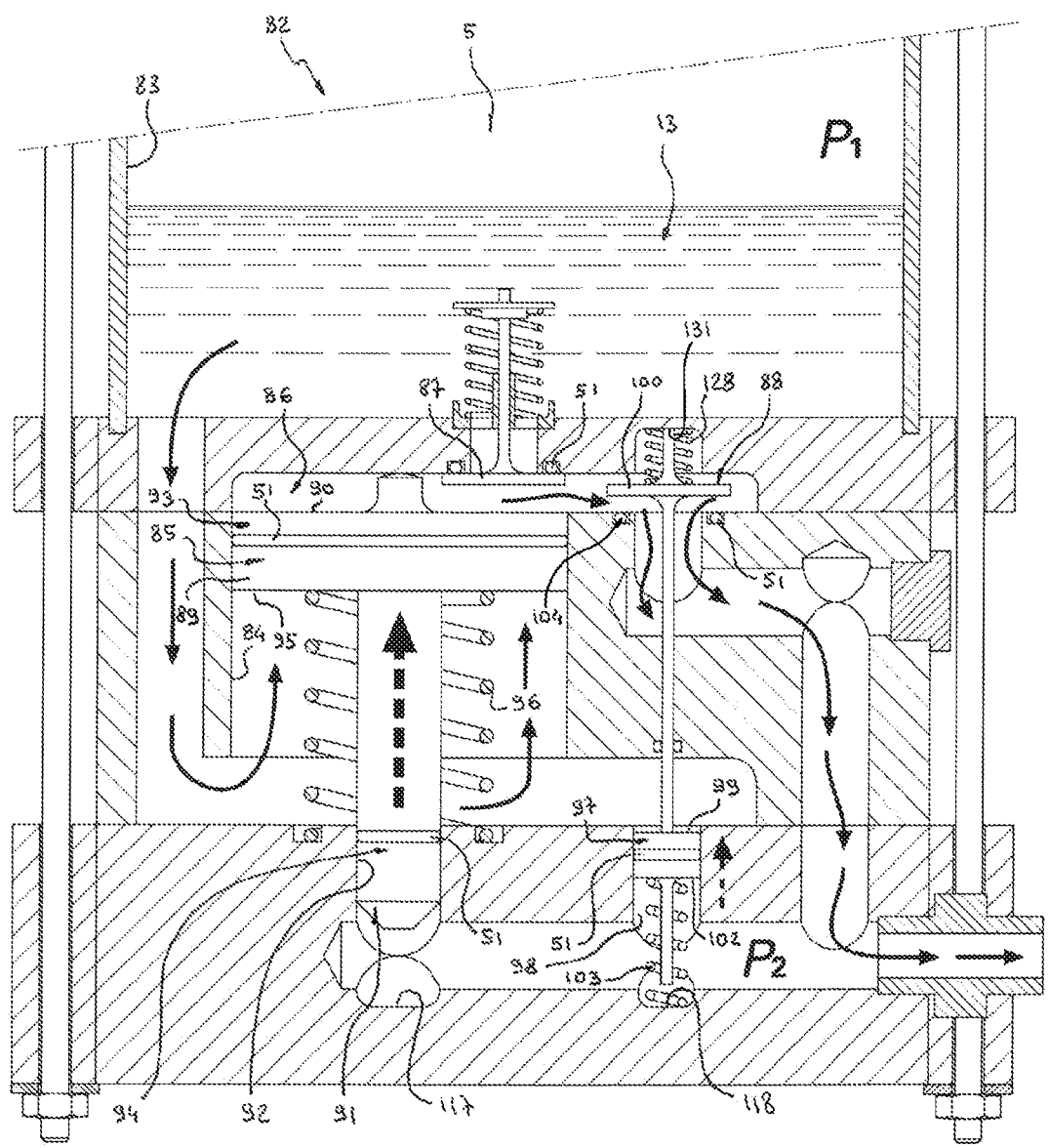

[Fig. 20]
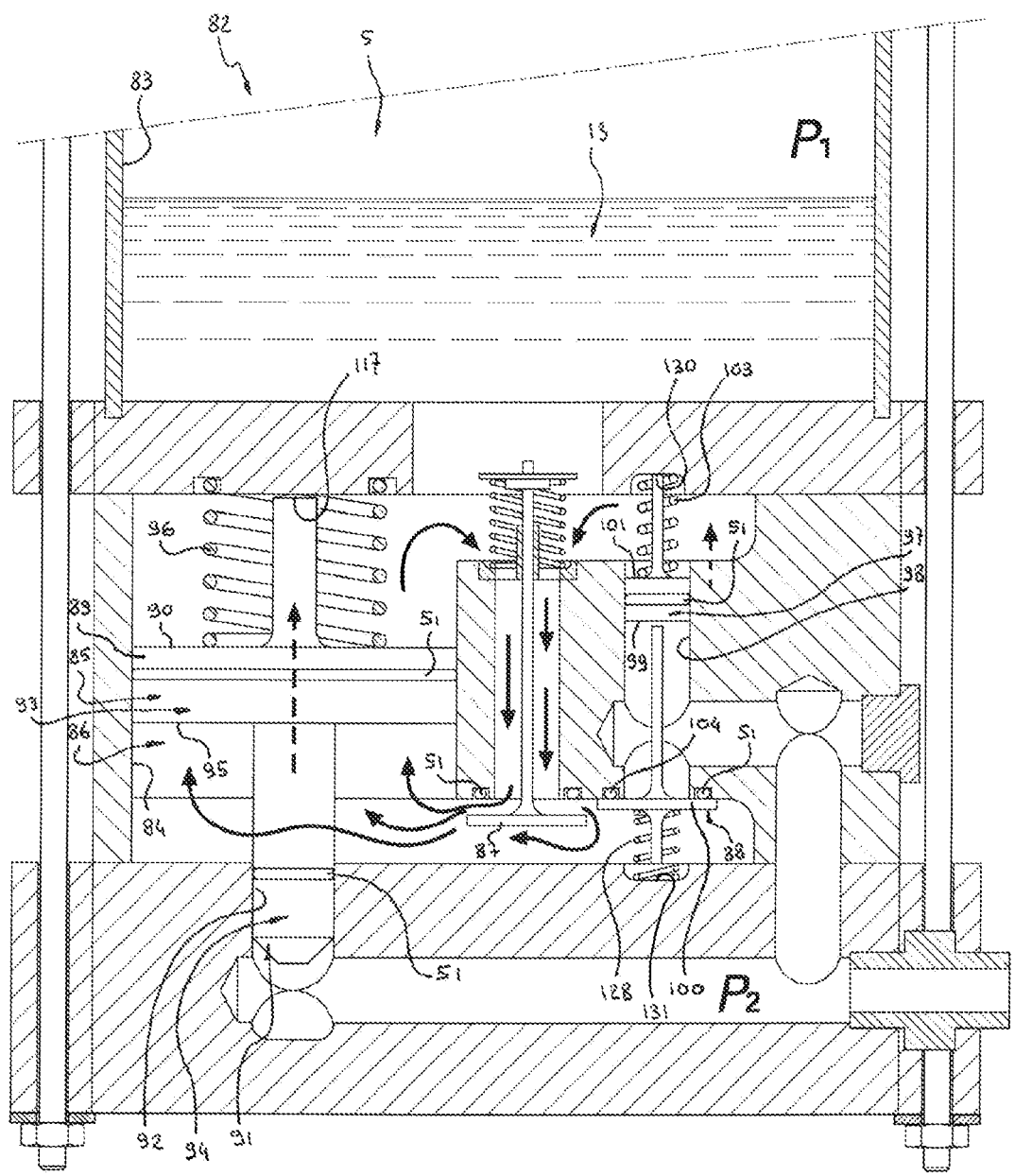

[Fig. 21]
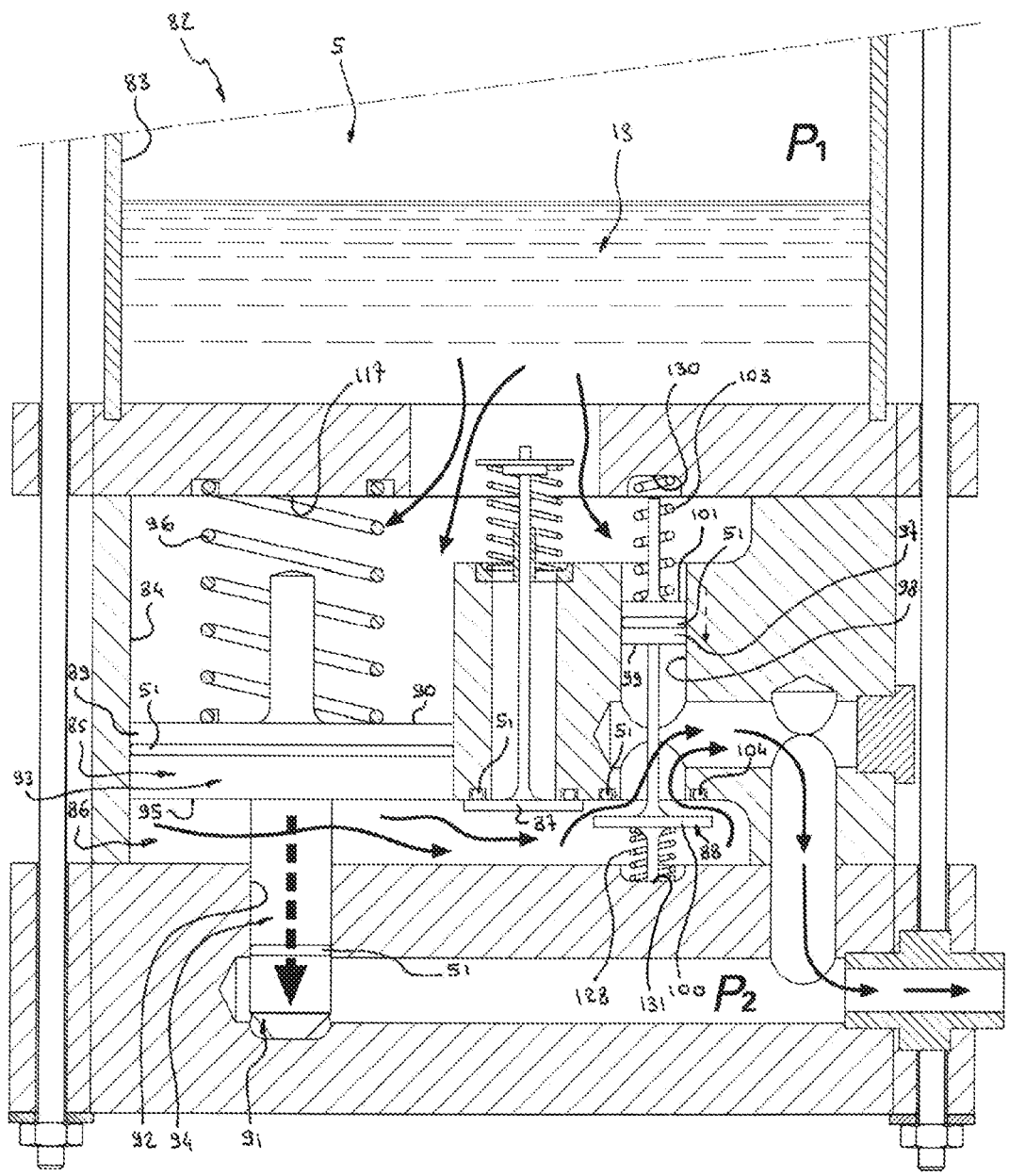

[Fig. 22]
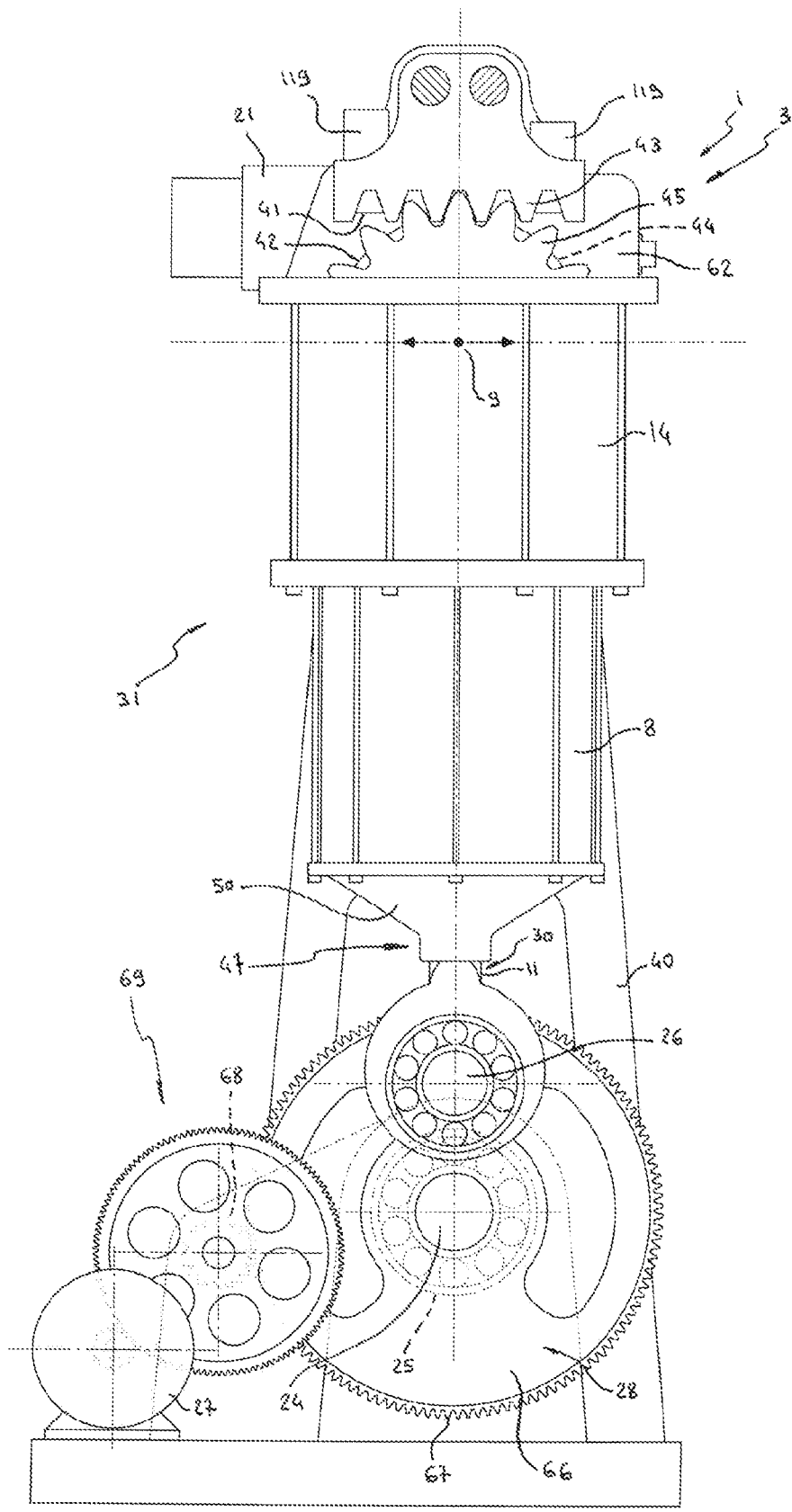

[Fig. 23]
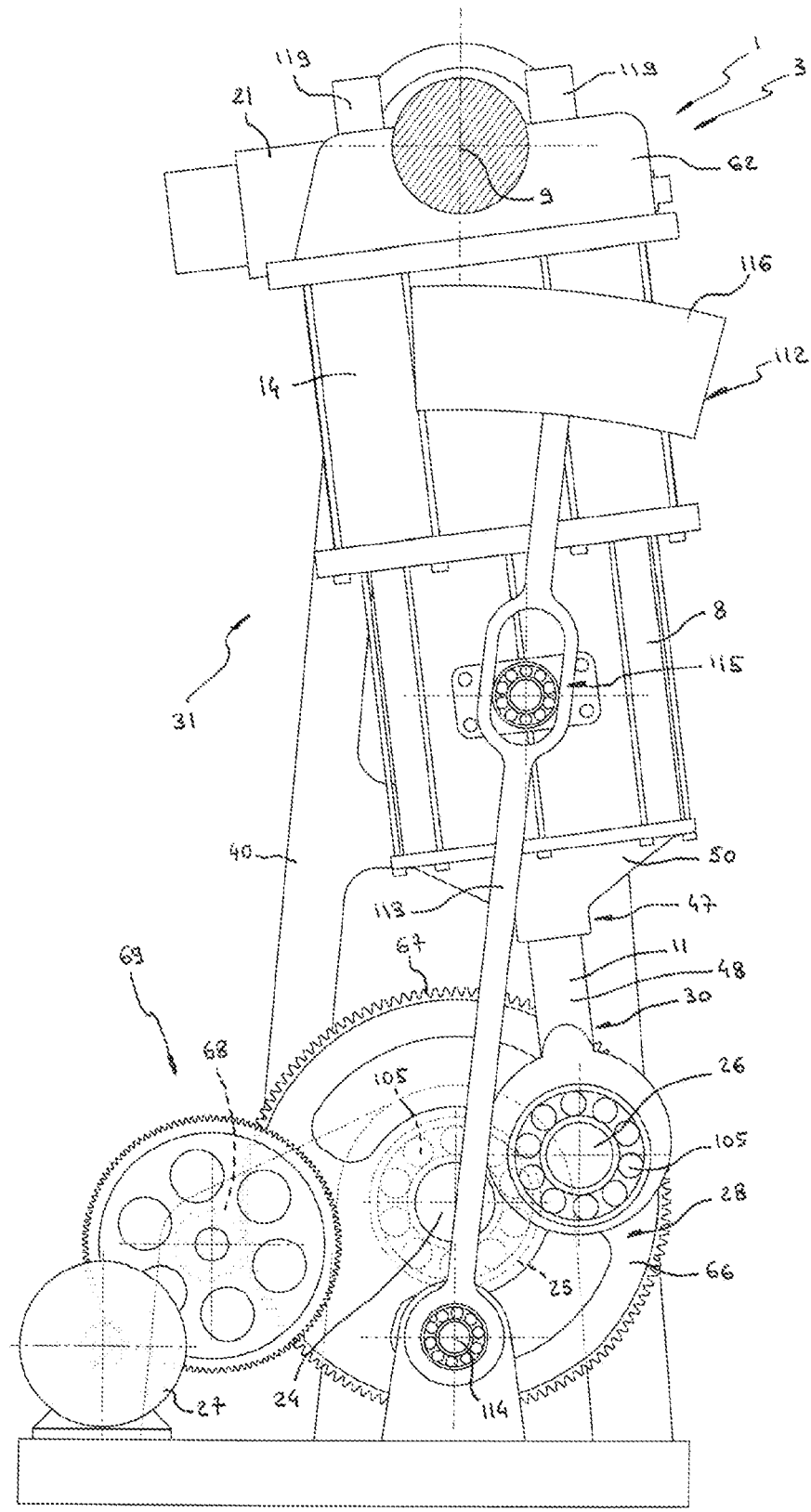

MECHANICAL LIQUID PISTON SLOW EXPANSION COMPRESSOR

This application claims priority to U.S. 63/496,553 filed Apr. 17, 2023, the entire contents of which are hereby incorporated by reference.

The present invention relates to a mechanical liquid piston slow expansion compressor Various compressors are used to compress gases in numerous fields of human activity, whether in industry, agriculture or transport, but also in the residential or commercial sector, particularly to produce heat or cold by means of heat pumps.

Whether this relates to producing compressed air, necessary for machines or methods, or to ensure the operation of heat pumps intended for heating or for air conditioning, the efficiency of compressors is a determinant factor which has a high impact on energy consumption.

In most applications, the heat produced during the compression of a gas constitutes an irrecoverable energy loss. For said applications, the ideal compressor would be an isothermal compressor, i.e. which discharges, as it is produced, the heat resulting from the compression of the gas, in order to minimise the work necessary for said compression.

However, in practice, producing a fully isothermal compressor is impossible, as to transfer the heat coming from the compression of a gas as it is produced, it is necessary that there is a temperature difference between said gas and a heat absorption well.

It is however possible to move towards an isothermal compression by using heat exporting means positioned at the core of the gases, said means exposing, as much as possible, a large heat exchange surface to said gases, impressing on the latter, turbulent movements which are favourable to convection heat exchanges, this while confining any heat emission by radiation in a closed chamber and by leaving time for the heat exchanges to occur.

However, a quasi-isothermal compression is not sufficient to guarantee a high efficiency to a compressor, as non-thermodynamic energy losses are unavoidable, which must be minimised.

Among said non-thermodynamic energy losses, mechanical losses appear by friction of the compressor itself or those linked to its accessories, the pressure losses, also called "load losses" occurring either at the flaps or inlet and outlet valves of said compressor, or at the conduits which connect said compressor to the compressed gas consumption points, or also, the possible sealing losses, internal or external to said compressor.

In the scope of ecological transition, the heat pumps which integrate a gas compressor occupy an essential space, as they can heat and air condition buildings at a lesser energy cost, this by extracting renewable heat into the environment.

With global warming which is occurring on a global scale, and due to the evolution of ways of life, alone, the air conditioning of buildings already consumes more than ten percent of the electricity produced throughout the world, this share being intended to grow significantly over the years to come, both in proportion and in volume, to the point that the efficiency of heat pumps represents a major energy challenge.

The same applies for the heating of buildings which itself absorbs more than twenty percent of the world's primary energy and which, in the decades to come, is intended to massively resort to low-temperature heat pumps, said pumps being the most effective.

The principle of heat pumps currently used throughout the world is mainly based on state change, from vapour to liquid or vice versa, of a refrigerant fluid, the saturating vapour pressure of which is adapted to the targeted heating or refrigeration temperature range, and to the pressures that the installations can support.

State, or phase change refrigerating cycles have the advantage of a great calorie or refrigerant power density, as they utilise the latent heat from evaporation or from condensation of a refrigerant fluid by modulating the pressure and the temperature of said fluid, such that it evaporates or condenses.

In the current art, and considering economic, technological, physical limitations, and limitations in producing heat pumps, the state change refrigerating cycles remain far from the most efficient.

However, all refrigerating cycles do not resort to the state change of a specially formulated refrigerant fluid.

For example, the Brayton-Joule cycle, also called Bell-Coleman cycle, provides the compression and the isentropic expansion of a gas without state change, with, after said compression, transfer of heat by said gas to a constant pressure colder environment and with, after said expansion, heat puncture by said gas to said chamber to be cooled, also at a constant pressure.

However, the practical efficiency of the Bell-Coleman cycle remains low, with, in practice, a just greater performance coefficient, one and same often less than one, contrary to state change and refrigerant fluid heat pumps, the performance coefficient of which can culminate in four, even five for one, which means that for an invested energy unit, up to four to five energy units are collected in calorie or refrigerant form.

Due to its low practical energy efficiency, the Bell-Coleman cycle, is only mainly used when compressed air is naturally available, which can be the case in aeroplanes, and onboard certain trains.

Contrary to Bell-Coleman cycle heat pumps, due to their high efficiency, refrigerant fluid and state change heat pumps are widely used to heat or air condition buildings.

However, the efficiency of refrigerant fluid heat pumps remains a lot below the ideal Carnot efficiency which, by taking the temperature differences usually retained to take measurements, would give a performance coefficient greater than twenty, while the best heat pumps currently on the market deliver a performance coefficient of five.

But the ideal Carnot efficiency is only an indicator of the maximum efficiency theoretically accessible, as it does not consider the necessary temperature differences, such that the heat exchanges occur, nor the mechanical and practical stresses for producing heat pumps.

However, there would be a significant advantage, due to the rarefaction of energy and of the climate and ecological challenges linked to said energy, to maximise the effectiveness coefficient of heat pumps used to produce heating, air conditioning, or refrigeration as close as possible to the ideal Carnot efficiency.

Subject to having an adapted and efficient compression and expansion machine, it is actually possible to get close to the ideal efficiency of the Carnot cycle.

To achieve this aim, the compressor of said machine must compress a gas in two successive steps.

The first step consists of an adiabatic compression which occurs until the temperature of said gas is sufficiently high, such that the latter can transfer heat, for example, to a heating circuit of buildings, while the second step is an isothermal compression during which the temperature reached by said gas at the end of adiabatic compression is preserved during the rest of the compression of said gas, by gradually transferring to said heating circuit, the heat produced by said isothermal compression and this, until repression of said gas outside of said compressor.

Then, the expander of said machine must expand the gas which has been compressed beforehand according to the process opposite that which has just been described, also in two successive steps.

The first step consists of an adiabatic expansion which occurs until the temperature of said gas is sufficiently low, such that the latter can extract heat, for example, in the environment outside of said building, while the second step is an isothermal expansion, during which the temperature reached by said gas at the end of adiabatic expansion is preserved during the rest of the expansion of said gas, by gradually extracting into said environment, the heat necessary for maintaining said temperature during the rest of said isothermal expansion, and this, until the repression of said gas outside of said expander.

One of the advantages of such a heat pump is no longer resorting to polluting, toxic or combustible refrigerant fluids, which for some, destroy the ozone layer or produce a powerful greenhouse effect.

No longer depending on refrigerant fluids has an importance which is greater than regulations providing to prohibit, from 2030, refrigerant fluids, the global warming power of which is greater than or equal to one hundred and fifty times that of carbon dioxide.

These regulatory provisions will reduce the number of refrigerant fluids which can be used in conventional heat pumps, and will significantly impact the technology of said pumps, even increase the cost price of said pumps.

The most probable substitute for the refrigerant fluids currently used in conventional heat pumps is carbon dioxide, which is a non-polluting gas, the specific global warming power of which is low, but which has the main disadvantage of high operational pressures of more than one hundred atmospheres, which makes the sealing and the safety of installations more difficult to guarantee.

It is therefore understood, that any interest of reproducing as faithfully as possible, the heat pump ideal cycle of Sadi Carnot, by producing a quasi-isothermal compressor and volume expander, which use a fluid which remains in the gaseous state during the whole of said cycle.

This route is only possible by imposing a stable setpoint temperature on the gas during its compression or its isothermal expansion, which can be achieved with a medium which stores heat directly in a compression of expansion chamber, said medium being associated with means which export said heat during the compression phase, or which import said heat in the expansion phase.

Several designs describe close-to-isothermal compressors or expanders with means for storing and importing or exporting heat.

This is the case, for example, of the quasi-isothermal machine that patent GB2534244 describes, said machine comprising a piston which is oriented downwards and which has a heat absorption and return structure, said piston compressing a gas in a variable volume in the bottom of which a constant fluid volume resides.

According to the invention of patent GB2534244, said piston compresses or expands said gas, while forcing the latter to cool or to heat in contact with the heat absorption and return structure, said structure being able to be constituted of metal sheets which, when they are outside of the liquid exchanging heat with the gas, however that when they are immersed in said liquid, they exchange heat with the latter.

According to the invention of patent GB2534244, the liquid remains approximately immobile, contrary to liquid piston compressors, according to which the liquid is mobile on the contrary, which implies that said liquid is not subjected to decelerations which are too far from the Earth's gravity, without causing the cavitation and the fluctuation of said liquid.

On the contrary, the invention of patent GB2534244 thus makes it possible to manufacture a compressor or a rapid rotation expander without causing the liquid to move, which has the advantage of giving said compressor or said expander a high volume power density.

It is noted that the particular configuration of patent GB2534244 proposes a relatively conventional rod and crank system to actuate the piston carrying the heat absorption and return structure.

Another approach consists of moving a liquid by way of a piston which translates into a cylinder as patent CN111734604 provides, said liquid, contrary to patent GB2534244, submerging a static heat dissipator.

In the manner of patent CN111734605, numerous publications also state liquid pistons which alternatively force a gas and a liquid to pass through a porous medium or a heat accumulation and return system.

This technical approach is, in particular, retained by various research programmes dedicated to energy storage systems in the form of compressed air, for example, intended to accumulate renewable energy produced by offshore wind turbines.

It results from most of these devices that the compression or expansion efficiency highly depends on the total heat exchange surface between the gas, the liquid and the heat absorption and return structures, whatever the nature, but also, the time left for said exchanges to occur.

To favour said exchanges, it is therefore preferable to produce slow rotation compressors or expanders, this in return for a lesser volume power.

Further to the time left for the heat exchanges to occur, the advantage of slow rotation compressors or expanders is that they leave time for the transfer of gases to occur, so as to limit the pressure losses at the inlet and outlet ports of said compressors and expanders.

Indeed, if the latter rotate slowly, their actual thermodynamic pressure-volume diagram will be close to the ideal theoretical diagram, as less deformed by the transfer of gases, and the practical efficiency of a heat pump integrating said compressors and expanders will be closer to the maximum theoretical efficiency accessible according to the ideal Carnot cycle.

As, indeed, the inertia forces which reduce the performance of the controlled flaps and valves, responsible for transferring the gases in or outside of a compressor or an expander evolve more or less with the square of the rotation speed of said compressor or of said expander.

This results in a delay in opening and/or closing said flaps and valves which affects the effectiveness of the thermodynamic cycle.

Consequently from the above, a slow rotation single-phase heat pump which compresses and expands a gas according to the Carnot cycle will initially occupy more volume than its conventional equivalent, the refrigerant fluid of which passes successively from the gaseous state to the liquid state and vice versa, and the compressor of which operates at a high speed.

The problem of slow rotation compressors and expanders is that, at the same power, the mechanical parts which constitute them are subjected to greater forces than those which constitute their quicker equivalent, and that the large dimensions of said parts which result from said forces generate high energy losses by friction.

Further to a large dimension of said parts, the disadvantage of the slow rotation of said compressors or expanders, is that it is unfavourable to establishing a hydrodynamic lubrication system between said parts, that this is, for example, at the friction interface of a piston in a cylinder, or at the pivot connections between said piston and a rod, between said rod and the crank of a crankshaft, and between the latter and a casing.

It would therefore be highly advantageous to implement liquid pistons coupled with heat exchange, storage, return, import and export means, by means of very high mechanical efficiency slow machines which leave a sufficiently long time, on the one hand, for heat exchanges to maximise their effectiveness, and on the other hand, for the transferring of gases to minimise their energy losses.

Such a configuration would make it possible to produce high energy performance heat pumps, delivering an efficiency closer to that of the ideal Carnot cycle, that their conventional counterparts which operate a state change refrigerant fluid, and only requiring, for example, atmospheric air and water to operate.

It would, for example, be possible to obtain said configuration, a performance coefficient of around seven, where under the same measuring conditions and in the same environment, the performance coefficient of the best refrigerant fluid heat pump on the market would be around five.

But, as has been described above, to obtain such an efficiency difference, a quasi-isothermal compression and expansion must be produced, by favouring, to the maximum, heat exchanges during said compression and said expansion, limiting, to the maximum, losses by transfer, losses by internal or external gas leakages, and limiting, to the maximum, losses by friction.

For example, the performance coefficient of a Carnot cycle single-phase heat pump, given its necessity to compress a greater quantity of gas than its state change refrigerant fluid counterpart, is necessarily very sensitive to the energy efficiency of its mechanical transmission device, said efficiency, if it is insufficient, having the consequence of giving said Carnot cycle single-phase heat pump a lower efficiency than that of its said counterpart.

Indeed, as a Carnot cycle single-phase heat pump must compress a greater quantity of gas than its state change refrigerant fluid counterpart, the performance coefficient of said single-phase heat pump is very dependent on the energy efficiency of its gas compression and expansion mechanical transmission device.

If said efficiency is insufficient, said single-phase heat pump will have a performance coefficient lower than that of its refrigerant fluid counterpart.

This sensitivity to the compression and expansion mechanical efficiency of a Carnot cycle single-phase heat pump is all the greater, when a performance coefficient greater than five is targeted, for example.

For example, a Carnot cycle single-phase heat pump which delivers ten kilowatts of thermal power with a performance coefficient of five, requires an external energy input of a power of two kilowatts in the form of mechanical work.

If the mechanical efficiency of said single-phase heat pump is mediocre and forms a mechanical loss of one kilowatt, the performance coefficient of said pump falls from five to three point three, and the energy bill of the owner of said pump increases by fifty percent.

In this case, said single-phase heat pump loses all its interest or almost all, with respect to its state change refrigerant fluid conventional equivalent.

This is why the mechanical liquid piston slow expansion compressor according to the invention provides an innovative configuration with a very high mechanical and volume efficiency, coupled with effective heat exchanges and flows, so as to give, in particular to Carnot cycle single-phase heat pumps which result from this, a performance coefficient significantly greater than that of their state change refrigerant fluid conventional equivalent.

Thus, the mechanical liquid piston slow expansion compressor is mainly provided to produce, on the one hand, high energy efficiency compressors and/or expanders which can be used in any field of activity, and on the other hand, high performance coefficient heat pumps.

A heat pump results, in particular, from the mechanical liquid piston slow expansion compressor according to the invention:

Which delivers a performance coefficient greater than that of conventional state change refrigerant fluid heat pumps, said pump according to the invention therefore reducing, other things being equal, the energy necessary to produce heat or cold;

The thermodynamic efficiency of which is close to that of the ideal Carnot cycle which cannot be exceeded, to the point that, in all likelihood, the replacement of said heat pump with another design can barely be motivated by an additional improvement of the efficiency;

Which does not resort to any refrigerant fluid which is damaging to health or to the environment, said pump being able to operate, for example, with atmospheric air or nitrogen and avoid any regulatory or safety limitation relating to handling, storage or recycling refrigerant fluids;

The operating temperature range of which is very expansive due to the non-dependency of said pump on any refrigerant fluid at all, said pump being able to operate in heating or air conditioning mode, in any region in the world without damaging its efficiency;

Of a simple design, to the point that said pump can be produced in practically all countries in the world, in workshops at a technically modest level, in particular, by assembling low cost price components, which can be easily produced, or which are widely available on the market;

The simple mechanical configuration of which makes it possible to ensure its maintenance without great technical skill, and at a lesser cost;

Which makes it possible for any qualified plumber/heating engineer to simply, and in an accessible manner, produce a heating and air conditioning network which is easily integrated in buildings and in the environment of said buildings, this without requiring approval or certification linked to handling gases which are dangerous for health and the environment;

The robust mechanism of which, gives it a service life which can reach, subject to replacing minor parts, several decades, even more than a century without deterioration neither of the operation, nor of the efficiency of said pump, such a service life constituting an additional advantage of said pump for the environment, compared with conventional refrigerant fluid heat pumps when the entirety of the service life of said pumps is analysed, including manufacture and recycling;

Which is silent and which can be integrated in buildings by producing minimum noise pollution;

The arrangement of which makes it possible to expose, at a lesser cost, large heat exchange surfaces with the environment, by resorting to low rotation speed, low energy consumption, and low sound emission motor fans;

The manufacture of which does not require, neither rare or strategic material, nor highly technological know-how and knowledge;

It is understood that the mechanical liquid piston slow expansion compressor according to the invention relates, further to heat pumps, to compressors, and to gas expanders, to any other application which is close in its design and in its principle, which could advantageously draw on the particular features and functionalities of said expansion compressor according to the invention.

The other features of the present invention have been described in the description and in the secondary claims, dependent directly or indirectly on the main claim.

The mechanical liquid piston slow expansion compressor defining a variable pneumatic volume which forms a compressor or an expander, a working gas being able to enter said volume via an inlet port or exit from said volume via an outlet port, comprises:

A liquid cylinder which can, directly or indirectly, pivot about a tilt axis which is perpendicular to the axis of said cylinder and which is secured to a static frame;

A hydraulic piston which can sealingly translate in the liquid cylinder to form, with the latter, a variable hydraulic volume which is totally or partially filled with a working liquid;

A gas and liquid reservoir which is connected to the variable hydraulic volume by a communication conduit, such that said reservoir is mainly or totally filled with working liquid, when the variable hydraulic volume is minimum, and is partially or totally filled with working gas, when the variable hydraulic volume is maximum, the variation of absolute volume of the working gas contained in the variable pneumatic volume forming, on the one hand, the variable pneumatic volume, and being on the other hand, approximately equal to the variation of absolute volume of the working liquid contained in the variable hydraulic volume;

Heat exchange and accumulation means housed in the gas and liquid reservoir, said means being able, on the one hand, to exchange heat with the working gas or with the working liquid, and on the other hand, temporarily store all or some of said heat;

Heat export or input means which take or which transfer, directly or indirectly, heat to the heat exchange and accumulation means, and/or to the working liquid and/or to the working gas, said heat taken then being transferred to heating means or said transferred heat having been taken beforehand to cooling means, said heating means and said cooling means being external to the gas and liquid reservoir;

Filling means which enable or prohibit the passage of working gas from an intake plenum to the gas and liquid reservoir via the inlet port;

Draining means which enable or prohibit the passage of working gas from the gas and liquid reservoir to a repression plenum via the outlet port;

A connecting rod, a first rod end of which is fixedly secured to the hydraulic piston, said rod being approximately parallel to the longitudinal axis of said piston;

Piston guiding means which maintain the hydraulic piston and the connecting rod parallel to said cylinder, whatever the position of said piston in said cylinder;

A crankshaft which can rotate about an axis parallel to the tilt axis in at least one shaft bearing, and which has at least one crank around which a second rod end of the connecting rod articulates;

At least one drive motor which directly or indirectly rotates the crankshaft;

Kinetic energy storage means which are directly or indirectly connected to the crankshaft.

The mechanical liquid piston slow expansion compressor according to the invention comprises a tilt axis which is a tubular ball joint which ends the liquid cylinder and the inside of which forms, totally or partially, the communication conduit, said ball joint being able to sealingly pivot in a female ball joint housing secured to the gas and liquid reservoir.

The mechanical liquid piston slow expansion compressor according to the invention comprises a tubular ball joint which receives, in its centre, a ball joint axis which is parallel to the tilt axis, said axis articulating around a ball joint bridle which is directly or indirectly secured to the gas and liquid reservoir.

The mechanical liquid piston slow expansion compressor according to the invention comprises a ball joint bridle which is connected to the gas and liquid reservoir by way of a bridle connection articulated around which said bridle can rotate.

The mechanical liquid piston slow expansion compressor according to the invention comprises a liquid cylinder and a gas and liquid reservoir which form a rigid assembly which pivots about the tilt axis.

The mechanical liquid piston slow expansion compressor according to the invention comprises heat exchange and accumulation means which are constituted of a porous medium which has porosities, into which and from which the working liquid and the working gas alternatively enter and exit.

The mechanical liquid piston slow expansion compressor according to the invention comprises heat export and input means which are constituted of a circulating part of the working liquid, said part exiting from the liquid cylinder or from the gas and liquid reservoir via a liquid outlet conduit to return into said cylinder or into said reservoir via a liquid inlet conduit, this after having transferred heat to the heating means or after having taken the heat to the cooling means.

The mechanical liquid piston slow expansion compressor according to the invention comprises heat export or input means which are constituted of at least one heat exchanger conduit housed in the gas and liquid reservoir and in which a heat-transfer fluid circulates, which transports the heat taken or transferred to the heat exchange and accumulation means and/or to the working liquid and/or to the working gas up to the cooling means or to the heating means via heat transport conduits.

The mechanical liquid piston slow expansion compressor according to the invention comprises heat exchange and accumulation means which are constituted of at least one liquid spray nozzle supplied by a liquid spray pump, said nozzle being able to atomise the working liquid into fine droplets in the internal volume of the gas and liquid reservoir.

The mechanical liquid piston slow expansion compressor according to the invention comprises a tilt axis which is constituted of a rolling track which is secured to the static frame and on which a rolling surface can roll, which is directly or indirectly secured to the liquid cylinder, a rolling track gearwheel, the primitive circle of which coincides with the contact line between the rolling track and the rolling surface being secured to the static frame and engaging with a rolling surface gearwheel which is directly or indirectly secured to the liquid cylinder.

The mechanical liquid piston slow expansion compressor according to the invention comprises piston guiding means which are constituted of a sliding pivot connection formed between an external cylindrical surface that the connecting rod has, and a sliding ring which is securely connected to the liquid cylinder by way of a ring carrier structure.

The mechanical liquid piston slow expansion compressor according to the invention comprises piston guiding means which are constituted of a guiding skirt provided at the periphery of the hydraulic piston, said skirt being able to translate at a low clearance into said cylinder.

The mechanical liquid piston slow expansion compressor according to the invention comprises filling means and/or draining means which are constituted of at least one compressor flap and/or at least one controlled compressor valve, however that in operation, the working gas is expelled from the gas and liquid reservoir via the repression plenum under a pressure greater than that under which it has been introduced beforehand into said reservoir via the intake plenum while the heat export or input means transfer heat to the heating means, such that the variable pneumatic volume forms a compressor.

The mechanical liquid piston slow expansion compressor according to the invention comprises filling means and/or draining means which are constituted of at least one controlled expansion valve, however that in operation, the working gas is expelled from the gas and liquid reservoir via the repression plenum under a pressure less than that under which it has been introduced beforehand into said reservoir via the intake plenum, while the heat export or input means take heat to the cooling means, such that the variable pneumatic volume forms an expander.

The mechanical liquid piston slow expansion compressor according to the invention comprises a repression plenum of the compressor which is connected to the intake plenum of the expander by a high pressure gas conduit such that the working gas repressed via the repression plenum of said compressor is introduced into said expander via the intake plenum of said expander, the crankshaft of said compressor being directly or indirectly connected to the crankshaft of said expander, said compressor and said expander engaging to form a heat pump.

The mechanical liquid piston slow expansion compressor according to the invention comprises a high pressure gas conduit which is connected to at least one high pressure gas reservoir.

The mechanical liquid piston slow expansion compressor according to the invention comprises an intake plenum of the compressor and a repression plenum of the expander which communicate by way of a low pressure gas reservoir to which they are respectively connected by a low pressure gas conduit.

The mechanical liquid piston slow expansion compressor according to the invention comprises an intake plenum and a repression plenum which are positioned in the upper part of the gas and liquid reservoir, the latter being itself positioned above the liquid cylinder, such that, due to the Earth's gravity, the working gas firstly always exits from the gas and liquid reservoir via the repression plenum, and that the working liquid firstly always enters into said reservoir via the intake plenum.

The mechanical liquid piston slow expansion compressor according to the invention comprises a tilt axis which is constituted of a hollow cylindrical axis which has at least one opening radial space, said cylindrical axis being positioned above the gas and liquid reservoir, while the intake plenum and/or the repression plenum is connected to an annular gas collector which surrounds said cylindrical axis and which comprises the opening radial space, such that the working gas can circulate between the inside of the hollow cylindrical axis and the intake plenum and/or the repression plenum via the opening radial space and the annular gas collector.

The mechanical liquid piston slow expansion compressor according to the invention comprises kinetic energy storage means which are constituted of a low speed inertia flywheel which is rotatably secured, on the one hand, to the crankshaft, and on the other hand, to a ring gear that the drive motor rotates by way of at least one ring drive pinion, the primitive diameter of which is smaller than that of said ring, the latter and said pinion forming a high gearing mesh system, however that a high speed inertia flywheel is directly or indirectly rotatably secured to the ring drive pinion.

The mechanical liquid piston slow expansion compressor according to the invention comprises a liquid spray pump which is constituted of a pump cylinder which is provided in the liquid cylinder and/or in the extension of said cylinder, a pump piston moved by the hydraulic piston and/or by the liquid cylinder being able to translate into said pump cylinder.

The mechanical liquid piston slow expansion compressor according to the invention comprises a pump piston which comprises a start-of-travel touch needle by way of which it is moved, said piston being returned onto an end-of-travel abutment by a piston return mass.

The mechanical liquid piston slow expansion compressor according to the invention comprises a pump piston which is moved by way of a movement spring.

The mechanical liquid piston slow expansion compressor according to the invention comprises an overflow pump which, upon each crankshaft rotation, transfers a small quantity of working liquid from an overflow reservoir to the gas and liquid reservoir and/or the liquid cylinder.

The mechanical liquid piston slow expansion compressor according to the invention comprises an overflow reservoir which communicates with the repression plenum, the working gas pressure which is in said reservoir being close or identical to that which is in said plenum.

The mechanical liquid piston slow expansion compressor according to the invention comprises an overflow pump which comprises a pump blind cylinder, in which an overflow pump piston can sealingly translate, the latter and said cylinder forming a variable overflow pump volume which, when it increases, is filled with working liquid coming from the overflow reservoir via at least one overflow pump intake flap and which, when it decreases, represses said liquid to the gas and liquid reservoir and/or the liquid cylinder via a repression valve.

The mechanical liquid piston slow expansion compressor according to the invention comprises an overflow pump piston which is a two-body staged piston which comprises a body of a large diameter which has a face with a large cross-section which forms one of the walls of the variable overflow pump volume, said staged piston also comprising, axially opposite the face with a large cross-section, a body of a small diameter which can sealingly translate into an actuation cylinder, the internal volume of which is connected directly, or not, to that of the liquid cylinder, said body of a smaller diameter having a face with a small cross-section on which the pressure which is in the liquid cylinder is exerted, said staged piston also offering, at the junction between the body of a large diameter and the body of a small diameter, a face with an average cross-section from which the body of a small diameter emerges, which is connected to the overflow reservoir, and which is subjected to the pressure in said reservoir, while a staged piston abutment fixes the maximum volume of the variable overflow pump volume and that a two-body piston return spring tends to repel the two-body staged piston in the direction of its face with a large cross-section.

The mechanical liquid piston slow expansion compressor according to the invention comprises a repression valve which comprises a valve actuator piston which can sealingly translate into a valve actuator cylinder and which has, firstly, a valve actuation axial face which communicates with the overflow reservoir and on which the pressure in said reservoir is exerted, said face being able to raise an overflow flap from an overflow flap seat when the valve actuator piston is moved in the direction of said face which has the effect of putting the variable overflow pump volume in communication with the gas and liquid reservoir and/or the liquid cylinder via said overflow flap, and secondly, a liquid cylinder side axial face which communicates with the liquid cylinder, on which the pressure in said cylinder is exerted, and which can come into contact with a liquid cylinder side abutment when the valve actuator piston is moved in the direction of said liquid cylinder side axial face, however, that an actuation piston return spring tends to repel the valve actuation piston in the direction of its valve actuation axial face, and that an overflow flap return spring tends to return the overflow flap in contact with the overflow flap seat with which it engages, the force that the actuation piston return spring produces being greater than the force that the overflow flap return spring produces.

The mechanical liquid piston slow expansion compressor according to the invention comprises an overflow pump piston which is a two-body staged piston which comprises a body of a large diameter which has a face with a large cross-section which is connected to the overflow reservoir and which is subjected to the pressure in said reservoir, said staged piston also comprising, axially opposite the face with a large cross-section, a body of a small diameter which can sealingly translate into an actuation cylinder, the internal volume of which is connected directly, or not, to that of the liquid cylinder, said body of a small diameter, having a face with a small cross-section, on which the pressure which is in the liquid cylinder is exerted, at the junction between the body of a large diameter and the body of a small diameter, a face with an average cross-section, from the body of a small diameter emerges, said face forming one of the walls of the variable overflow pump volume, while a staged piston abutment fixes the maximum volume of the variable overflow pump volume and that a two-body piston return spring tends to repel the two-body staged piston in the direction of its face with a small cross-section.

The mechanical liquid piston slow expansion compressor according to the invention comprises a repression valve which comprises a valve actuator piston which can sealingly translate into a valve actuator cylinder and which has, firstly, a valve actuation axial face which communicates with the liquid cylinder and on which the pressure in said cylinder is exerted, said face being able to raise an overflow flap of an overflow flap seat when the valve actuator piston is moved in the direction of said face which has the effect of putting the variable overflow pump volume in communication with the gas and liquid reservoir and/or the liquid cylinder via said overflow flap, and secondly, a reservoir side axial face which communicates with the overflow reservoir, on which the pressure in said reservoir is exerted, and which can come into contact with an overflow reservoir side abutment when the valve actuator piston is moved in the direction of said reservoir side axial face, however that an actuation piston return spring tends to repel the valve actuator piston in the direction of its valve actuation axial face, and that an overflow flap return spring tends to return the overflow flap in contact with the overflow flap seat with which it engages, the force that the actuation piston return spring produces being greater than the force that the overflow flap return spring produces.

The mechanical liquid piston slow expansion compressor according to the invention comprises counterbalancing means which are totally or partially substituted for the piston guiding means to incline the liquid cylinder during the rotation of the crankshaft.

The mechanical liquid piston slow expansion compressor according to the invention comprises counterbalancing means which are constituted of a counterbalancing mast which, on the one hand, comprises a counterbalancing mass and which, on the other hand, is articulated about a mast axis which is parallel to the tilt axis of the liquid cylinder and which is secured to the static frame, however that the counterbalancing mast forms, with said cylinder, a pivoting-sliding articulation and constitutes an imbalance contrary to that of said cylinder.

The description below regarding the accompanying drawings and given as non-limiting examples will make it possible to best understand the invention, the features that it has, and the advantages that it is able to provide:

FIG. 1 is a cross-sectional view of a particular configuration of the mechanical liquid piston slow expansion compressor according to the invention, according to which, the tilt axis of the liquid cylinder is a tubular ball joint, the inside of which totally or partially forms the communication conduit, and which can sealingly pivot in a female ball joint housing secured to the gas and liquid reservoir.

FIG. 2 is a cross-sectional view of the mechanical liquid piston slow expansion compressor according to the invention, the liquid cylinder and the gas and liquid reservoir of which form a rigid assembly which pivots about the tilt axis.

FIG. 3 is a three-dimensional cross-sectional view of the rigid assembly such as shown in FIG. 2, according to a variant of the mechanical liquid piston slow expansion compressor according to the invention, an overflow pump being coupled with the gas and liquid reservoir.

FIG. 4 is an exploded three-dimensional view of the rigid assembly shown in FIG. 3, without the overflow pump.

FIG. 5 is a pressure-volume diagram of the thermodynamic cycle of a heat pump constituted of a compressor and of an expander, each formed of the mechanical liquid piston slow expansion compressor according to the invention.

FIG. 6 is a three-dimensional assembly view, seen from the front of a heat pump constituted of a compressor and of an expander, each formed of the mechanical liquid piston slow expansion compressor according to the invention.

FIG. 7 is a three-dimensional assembly view, seen from the rear of the heat pump shown in FIG. 6.

FIG. 8 is a three-dimensional cross-sectional view of the heat pump shown in FIG. 6.

FIG. 9 is a schematic view of the environment and of the accessories of a heat pump constituted of a compressor and of an expander, each formed of the mechanical liquid piston slow expansion compressor according to the invention.

FIG. 10 is a schematic cross-sectional view of a liquid spray pump of a compressor formed from the mechanical liquid piston slow expansion compressor according to the invention, the pump piston of said spray pump being moved in a pump cylinder by the hydraulic piston, said pump piston being in the process of suctioning the working liquid under the effect of a piston return mass, the pump intake flap that said pump piston comprises, being shown enlarged in an inset.

FIG. 11 is a schematic cross-sectional view which shows what occurs after FIG. 10, when the pump piston comes into contact with its suctioning end-of-travel abutment, however that the hydraulic piston of the compressor according to the mechanical liquid piston slow expansion compressor according to the invention has ended its descending travel and started its ascending travel.

FIG. 12 is a schematic cross-sectional view which shows what occurs after FIG. 11, when the hydraulic piston of the compressor according to the mechanical liquid piston slow expansion compressor according to the invention comes again into contact with the start-of-travel touch needle of the pump piston to force the latter to repel the working liquid that it had suctioned in FIG. 10 to the liquid spray nozzles via the pump repression flap, the latter being shown enlarged in an inset.

FIG. 13 is a schematic, cross-sectional view of a liquid spray pump of an expander formed from the mechanical liquid piston slow expansion compressor according to the invention, the pump piston of which is moved in a pump cylinder by the hydraulic piston and by way of a movement spring, said pump piston being in the process of suctioning the working liquid via a pump intake flap that the pump cylinder comprises, said flap being shown enlarged in an inset.

FIG. 14 is a schematic, cross-sectional view which shows what occurs after FIG. 13, when the pump piston is abutted from suctioning end-of-travel, however that the hydraulic piston of the expander according to the mechanical liquid piston slow expansion compressor according to the invention has continued its ascending travel by compressing the movement spring, and has not yet started its descending travel.

FIG. 15 is a schematic cross-sectional view which shows what occurs after FIG. 14, when the hydraulic piston of the expander according to the mechanical liquid piston slow expansion compressor according to the invention has started its descending travel, which has the effect of decompressing the movement spring, the pump piston remaining in contact with its ascending end-of-travel abutment.

FIG. 16 is a schematic, cross-sectional view which shows what occurs after FIG. 15, when the movement spring has been expanded to the point that the hydraulic piston of the expander according to the mechanical liquid piston slow expansion compressor according to the invention has driven in its movement the pump piston and has forced the latter to repress the working liquid that it had suctioned in FIG. 13 to the liquid spray nozzles via the pump repression flap, the latter being shown enlarged in an inset.

FIG. 17 is a three-dimensional cross-sectional view of an overflow pump and of an overflow reservoir provided for a compressor formed from the mechanical liquid piston slow expansion compressor according to the invention.

FIG. 18 is a schematic, cross-sectional view of an overflow pump for a compressor formed from the mechanical liquid piston slow expansion compressor according to the invention, the pressure in the overflow reservoir of said pump being greater than the pressure in the liquid cylinder, which has the effect of filling the variable overflow pump volume with working liquid coming from said overflow reservoir.

FIG. 19 is a schematic, cross-sectional view which shows what occurs after FIG. 18, when the pressure in the overflow reservoir of the overflow pump of the compressor formed from the mechanical liquid piston slow expansion compressor according to the invention becomes substantially equal to the pressure in the liquid cylinder, which makes it possible for the two-body piston return spring to move the overflow pump piston to expel the working liquid taken in beforehand in the variable overflow pump volume to the liquid cylinder.

FIG. 20 is a schematic, cross-sectional view of an overflow pump for an expander formed from the mechanical liquid piston slow expansion compressor according to the invention, the pressure in the overflow reservoir of said pump being less than the pressure in the liquid cylinder, which has the effect of filling the variable overflow pump volume with working liquid coming from said overflow reservoir.

FIG. 21 is a schematic, cross-sectional view which shows what occurs after FIG. 20, when the pressure in the overflow reservoir of the overflow pump of the expander formed from the mechanical liquid piston slow expansion compressor according to the invention becomes substantially equal to the pressure in the liquid cylinder, which makes it possible for the two-body piston return spring to move the overflow pump piston to expel the working liquid taken in beforehand in the variable overflow pump volume to the liquid cylinder.

FIG. 22 is a side view of a variant of the mechanical liquid piston slow expansion compressor according to the invention, according to which the liquid cylinder and the gas and liquid reservoir form a rigid assembly which pivots about a tilt axis constituted of a rolling track secured to the static frame on which a rolling surface secured to the gas and liquid reservoir can roll, the rolling track being connected to a rack and pinion which engages with a rolling surface gearwheel linked to the rolling surface.

FIG. 23 is a side view of a variant of the mechanical liquid piston slow expansion compressor according to the invention, according to which the counterbalancing means engage with the piston guiding means to incline during the rotation of the crankshaft, a rigid assembly formed from the liquid cylinder and from the gas and liquid reservoir, said counterbalancing means being constituted of a counterbalancing mast, the counterbalancing mass of which forms an imbalance contrary to that of said assembly.

DESCRIPTION OF THE INVENTION

In FIGS. 1 to 23, the mechanical liquid piston slow expansion compressor 1 according to the invention, various details of its components, its variants, and its accessories have been shown.

As can be seen, particularly in FIGS. 1 to 3, in FIG. 8, and in FIGS. 10 to 16, the mechanical liquid piston slow expansion compressor 1 defines a variable pneumatic volume 2 which forms a compressor 3 or an expander 4, a working gas 5 being able to enter said volume 2 via an inlet port 6 or exit from said volume 2 via an outlet port 7.

FIGS. 1 to 4, 6 to 8, 10 to 16, and 22 and 23 show that the mechanical liquid piston slow expansion compressor 1 according to the invention comprises a liquid cylinder 8 which can, directly or indirectly, pivot about a tilt axis 9 which is perpendicular to the axis of said cylinder 8 and which is secured to a static frame 40, said axis 9 being able to, according to the pivot mechanism of said cylinder 8 provided, move with respect to said frame 40 according to the inclination of the liquid cylinder 8, the latter advantageously being able to receive a thermal insulation layer 59 to avoid heat being exchanged with the ambient environment.

It is noted that the tilt axis 9 can receive at least one roller bearing 105 as particularly shown in FIG. 4 and in FIGS. 6 to 8, or at least one ball bearing or needle bearing known per se, while the static frame 40 can, for example, be fixed or placed on the floor of a residential, commercial or industrial building 121.

As can be seen in FIGS. 1 to 4, in FIG. 8 and in FIGS. 10 to 16, the mechanical liquid piston slow expansion compressor 1 according to the invention comprises a hydraulic piston 10 which can sealingly translate into the liquid cylinder 8 to form with the latter, a variable hydraulic volume 12 which is totally or partially filled with a working liquid 13.

It is noted that the maximum acceleration or deceleration to which the hydraulic piston 10 is subjected between its halfway point and its high neutral position must preferably remain less than the Earth's gravity, such that the working liquid 13 always remains fully in contact with said piston 10 and that no cavitation phenomenon or excessive mixture between the working gas 5 and the working liquid 13 occurs.

It is noted in FIGS. 1 to 3, in FIG. 8 and in FIGS. 10 to 16, that the hydraulic piston 10 can advantageously comprise at least one seal 51, whether the latter is an O-ring, a lip seal, composite seal, or of a type known to a person skilled in the art, said seal 51 prohibiting working liquid 13 from leaking between said piston 10 and the liquid cylinder 8.

Alternatively, to said seal 51, at least one cut or continuous metallic segment can form a seal between the hydraulic piston 10 and the liquid cylinder 8, however that the working liquid 13 can be, for example, constituted of pure water, or added with glycol to lower the solidification temperature of said water.

In FIGS. 1 to 3, in FIG. 8 and in FIGS. 10 to 16, it has also been shown that the mechanical liquid piston slow expansion compressor 1 according to the invention also comprises a gas and liquid reservoir 14 which is connected to the variable hydraulic volume 12 by a communication conduit 15, such that said reservoir 14 is mainly or totally filled with working liquid 13, when the variable hydraulic volume 12 is minimum, and is filled partially or totally with working gas 5 when the variable hydraulic volume 12 is maximum, the variation of absolute volume of the working gas 5 contained in the variable pneumatic volume 2 forming, on the one hand, the variable pneumatic volume 2, and being on the other hand, approximately equal to the variation of absolute volume of the working liquid 13 contained in the variable hydraulic volume 12 according to the communicating vessels principle.

It is noted that the gas and liquid reservoir 14 can advantageously receive an external thermal insulation to avoid heat being exchanged with the ambient environment.

FIGS. 1 to 4, and FIGS. 8 to 16 show that the mechanical liquid piston slow expansion compressor 1 according to the invention also comprises heat exchange and accumulation means 16 housed in the gas and liquid reservoir 14, said means 16 being able, on the one hand, to exchange heat with the working gas 5 or with the working liquid 13, and on the other hand, temporarily store all or some of said heat.

In same said FIGS. 1 to 4 and 8 to 16, it has been shown that the mechanical liquid piston slow expansion compressor 1 according to the invention comprises heat export or input means 17 which take or which transfer, directly or indirectly, heat to the heat exchange and accumulation means 16 and/or to the working liquid 13 and/or to the working gas 5, said taken heat then being transferred to heating means 18 or said transferred heat having been taken beforehand to cooling means 19, said heating means 18 and said cooling means 19 being external to the gas and liquid reservoir 14 and being able to take the form of underfloor heating and cooling 106 provided in a commercial or dwelling building 121, of a fan coil unit known per se, or of an air-water, soil-water or water-water exchanger 107 provided outside 122, according to the principles ordinarily retained for aerothermic or geothermic heat pumps.

As can be seen in FIGS. 1 to 4 and in FIGS. 10 to 16, the mechanical liquid piston slow expansion compressor 1 according to the invention also comprises filling means 20 which enable or prohibit the passage of working gas 5 from an intake plenum 21 to the gas and liquid reservoir 14 via the inlet port 6.

FIGS. 1 to 4 and FIGS. 10 to 16 also show that the mechanical liquid piston slow expansion compressor 1 according to the invention also comprises draining means 22, which enable or prohibit the passage of working gas 5 from the gas and liquid reservoir 14 to a repression plenum 62 via the outlet port 7.

It is noted in FIGS. 1 to 4, 6 to 8, 10 to 16, and in FIGS. 22 and 23, that the mechanical liquid piston slow expansion compressor 1 according to the invention comprises a connecting rod 11, a first rod end 29 of which is fixedly secured to the hydraulic piston 10, said rod 11 being approximately parallel to the longitudinal axis of said piston 10.

As can be seen clearly in FIGS. 1 to 3, in FIG. 8, and in FIGS. 10 to 16, the mechanical liquid piston slow expansion compressor 1 according to the invention comprises piston guiding means 23 which maintain the hydraulic piston 10 and the connecting rod 11 parallel to said cylinder 8, whatever the position of said piston 10 in said cylinder 8;

FIGS. 1 and 2, FIGS. 6 to 9 and FIGS. 22 and 23 also show that the mechanical liquid piston slow expansion compressor 1 according to the invention comprises a crankshaft 24 or eccentric shaft known per se which can rotate about an axis parallel to the tilt axis 9 in at least one shaft bearing 25, and which has at least one crank 26 around which a second rod end 30 of the connecting rod 11 is articulated.

In same said figures, it is noted that advantageously, the crankshaft 24 can rotate in the shaft bearing 25 and/or the second rod end 30 can be articulated around the crank 26 by way of a roller bearing 105, ball bearing or needle bearing, known per se.

In FIGS. 1, 2, 6, 22 and 23, it is also seen that the mechanical liquid piston slow expansion compressor 1 according to the invention comprises at least one drive motor 27 which rotates, directly or indirectly, the crankshaft 24, said motor 27 being able to be electric, thermal with internal or external combustion, hydraulic, pneumatic, or of any other type known to a person skilled in the art.

Finally, and as shown in FIGS. 1, 2, 6, 7, 8, 22 and 23, that the mechanical liquid piston slow expansion compressor 1 according to the invention also comprises kinetic energy storage means 28 which are directly or indirectly connected to the crankshaft 24.

It has been shown in FIG. 1 that according to a variant of the mechanical liquid piston slow expansion compressor 1 according to the invention, the tilt axis 9 can be a tubular ball joint 111 which ends the liquid cylinder 8, and the inside of which totally or partially forms the communication conduit 15, said ball joint 111 being able to sealingly pivot in a female ball joint housing 123 secured to the gas and liquid reservoir 14.

It will moreover be noted that this configuration is reversible, i.e. that the tubular ball joint 111 can end the gas and liquid reservoir 14, while the female ball joint housing 123 can be secured to the liquid cylinder 8.

It is also noted that the internal diameter of the liquid cylinder 8 can be advantageously provided less than or equal to the external diameter of the tubular ball joint 111 which forms a sealing with the female ball joint housing 123, which avoids that the pressure which is in said liquid cylinder 8 and in the gas and liquid reservoir 14 exerts a force on said liquid cylinder 8, which would tend to move the latter away from the gas and liquid reservoir 14.

It is also noted in FIG. 1 that the female ball joint housing 123 can receive, at the equator of the tubular ball joint 111, a seal 51 made of an abrasion-resistant material such as polytetrafluoroethylene filled with anti-friction particles.

As can still be seen in FIG. 1, the female ball joint housing 123 can receive a cut circular pad 127 made of an anti-friction material, like bronze or "Teflon", the mounting of which around the tubular ball joint 111 is made possible by a cut that said pad 127 has.

According to the variant of the mechanical liquid piston slow expansion compressor 1 according to the invention shown in FIG. 1, the tubular ball joint 111 can receive, in its centre, a ball joint axis 124 which is parallel to the tilt axis 9, said axis 124 being articulated around a ball joint bridle 125 which is directly or indirectly secured to the gas and liquid reservoir 14, the centre of the ball joint axis 124 and the centre of the tilt axis 9 being combined.

It will be noted that the ball joint bridle 125 maintains the distance between the liquid cylinder 8 and the gas and liquid reservoir 14 constant, said bridle 125 engaging with the cut circular pad 127 which maintains the tubular ball joint 111 at the centre of the female ball joint housing 123.

It will also be noted that the ball joint axis 124 and its anchoring in the tubular ball joint 111 must preferably be compact and have a hydrodynamic shape which favours a low resistance to the passage of working liquid 13 which circulates between the liquid cylinder 8 and the gas and liquid reservoir 14.

It will also be noted that the ball joint axis 124 can be a simple pivot connection or a cardan connection or a spherical ball joint connection.

Still according to the variant of an embodiment of the mechanical liquid piston slow expansion compressor 1 according to the invention shown in FIG. 1, the ball joint bridle 125 can be connected to the gas and liquid reservoir 14 by way of an articulated bridle connection 126 around which said bridle 125 can rotate.

FIGS. 1, 2, 6, 7, 8 and FIGS. 10 to 16 show that according to another variant of an embodiment of the mechanical liquid piston slow expansion compressor 1 according to the invention, the liquid cylinder 8 and the gas and liquid reservoir 14 can form a rigid assembly 31 which pivots about the tilt axis 9, the communication conduit 15 being, in this case, constituted of the junction zone comprised between said cylinder 8 and said reservoir 14, and not compulsorily having the same diameter as the latter.

It is noted that according to said variant, flexible conduits can advantageously connect the intake plenum 21 and/or the repression plenum 62, for example, to a high pressure gas reservoir 58 or to a low pressure gas reservoir 60, or can connect the gas and liquid reservoir 14 to heating means 18 and/or to cooling means 19.

As has been shown in FIGS. 10 to 16, the heat exchange and accumulation means 16 can be constituted of a porous medium 32 which has porosities 33 into which and from which the working liquid 13 and the working gas 5 alternatively enter and exit.

As an example, said porous medium 32 can be constituted of porous ceramic, of a ceramic or metal structure, or of a metallic straw made of copper or aluminium.

FIGS. 10 to 16 also illustrate that the heat export or input means 17 can be constituted of a circulating part of the working liquid 13, said part exiting from the liquid cylinder 8 or from the gas and liquid reservoir 14 via a liquid outlet conduit 34 to return into said cylinder 8 or into said reservoir 14 via a liquid inlet conduit 35, this after having transferred heat to the heating means 18 or after having taken heat to the cooling means 19.

It is noted, that in this case, circulation solenoid valves not represented can regulate the working liquid 13 flow rate which passes into the liquid outlet conduit 34 and into the liquid inlet conduit 35.

As another variant of an embodiment of the mechanical liquid piston slow expansion compressor 1 according to the invention, in FIGS. 1 to 4, in FIGS. 8 and 9 and in FIG. 17, it is shown that the heat export or intake means 17 can be constituted of at least one heat exchanger conduit 36 housed in the gas and liquid reservoir 14 and in which a heat-transfer fluid 37 circulates, which transports the heat taken or transferred to the heat exchange and accumulation means 16 and/or to the working liquid 13 and/or to the working gas 5 up to the cooling means 19 or to the heating means 18 via heat transport conduits 38.

It is noted that in this case, the heat exchanger conduit 36 can itself form the heat exchange and accumulation means 16.

As an example, the heat exchanger conduit 36 can take the form of a copper or aluminium pipe winding 109, however that the heat transport conduits 38 are coated with a thermal insulator on their portion comprised between the gas and liquid reservoir 14, on the one hand, and the cooling means 19 or the heating means 18, on the other hand.

It is noted that the coils or the layers that the heat exchanger conduit 36 can constitute, can be maintained in place in the gas and liquid reservoir 14 and against one another by maintaining plates or by separation baffles 110 which can constitute chicanes and/or passage restrictions creating working liquid 13 and/or working gas 5 jets during the passage of said liquid 13 and/or of said gas 5 through said restrictions.

Furthermore, the heat exchanger conduit 36 can receive external fins which increase its contact surface with the working liquid 13 or the working gas 5.

In FIGS. 1 to 4, in FIG. 8 and in FIGS. 10 to 16, it has been shown that, according to a particular configuration of the mechanical liquid piston slow expansion compressor 1 according to the invention, the heat exchange and accumulation means 16 can be constituted of at least one liquid spray nozzle 71 supplied by a liquid spray pump 72, said nozzle 71 being able to atomise the working liquid 13 into fine droplets in the internal volume of the gas and liquid reservoir 14, the number, the position, and the orientation of the nozzles 71 not being limited and being provided, such that the working liquid 13 thus atomised exposes, to the working gas 5, a large developed heat exchange surface, while the driving speed of said gas 5 by said liquid 13 also favours, as much as possible, the heat exchanges between said gas 5 and said liquid 13.

It is noted that the liquid spray pump 72 can have one or more pistons, can be a gear pump, a turbine pump or of a type known by a person skilled in the art, and be housed inside or outside of the gas and liquid reservoir 14.

The liquid spray pump 72 can, for example, by constituted by a piston which is directly or indirectly moved by a cam rotated by the crankshaft 24, the profile of said cam being calculated, such that the atomisation of the working liquid 13 starts at the suitable angular moment for rotating said shaft 24, and for an angular duration and according to an optimal intensity variation law.

It is noted, that preferably, the liquid spray pump 72 suctions the working liquid 13 into the liquid cylinder 8 and/or into the gas and liquid reservoir 14 before repressing said liquid 13 via the liquid spray nozzle 71, such that the pressure difference between the intake and the repression of said pump 72 is minimum.

In FIG. 22, it has been shown that according to another variant of the mechanical liquid piston slow expansion compressor 1 according to the invention, the tilt axis 9 can be constituted of a rolling track 41 which is secured to the static frame 40 and on which a rolling surface 42 which is directly or indirectly secured to the liquid cylinder 8 can roll, a rolling track gearwheel 43 or a rack and pinion, the primitive circle 44 of which coincides with the contact line between the rolling track 41 and the rolling surface 42 being secured to the static frame 40 and engaging with a rolling surface gearwheel 45 or a rack and pinion which is directly or indirectly secured to the liquid cylinder 8.

This particular configuration of the mechanical liquid piston slow expansion compressor 1 according to the invention makes it possible to limit the losses by friction at the tilt axis 9, while synchronising the angular positioning of the liquid cylinder 8 with respect to the static frame 40.

It is noted that in this case, a retaining flange can be provided, which is secured to the liquid cylinder 8 and which can come into contact with the static frame 40 if the pressure in said cylinder 8 is insufficient to maintain the rolling track 41 in contact with the rolling surface 42.

It is noted that according to the geometry retained for the rolling surface 42 and for the rolling track 43, the tilt axis 9 of the liquid cylinder 8 can, by rotating, be moved with respect to the static frame 40 according to infinite kinematic laws.

As is noted in FIGS. 1 to 3, in FIGS. 6 to 8, in FIGS. 10 to 16, and in FIGS. 22 and 23, the piston guiding means 23 of the mechanical liquid piston slow expansion compressor 1 according to the invention can be constituted of a sliding pivot connection 47 formed between an external cylindrical surface 48 that the connecting rod 11 has and a sliding ring 49 which is securely connected to the liquid cylinder 8 by way of a ring carrier structure 50 which can, according to a complementary variant of an embodiment of the mechanical liquid piston slow expansion compressor 1 according to the invention, constitute a lubricant reservoir which contains a lubricant, the latter having the responsibility of lubricating the sliding ring 49 on the one hand, and one or more seals 51 that the hydraulic piston 10 can comprise at its periphery, on the other hand.

It is noted that a lubricant sprinkler or injector can be provided, which atomises the lubricant inside said lubricant reservoir to ensure a good distribution of lubricant over all the members which require to be lubricated.

It has been shown in FIGS. 1 to 4, in FIG. 8, and in FIGS. 10 to 16, that the piston guiding means 23 can be constituted of a guiding skirt 57 provided at the periphery of the hydraulic piston 10, said skirt 57 being able to translate at a low clearance in said cylinder 8 to centre said piston 10 in said cylinder 8, whatever the axial position of said piston 10 in said cylinder 8.

It has also been shown in FIGS. 1 to 4 and in FIGS. 10 to 12, that the filling means 20 and/or the draining means 22 can be constituted of at least one compressor flap 52 and/or of at least one controlled compressor valve 53, however that in operation, the working gas 5 is expelled from the gas and liquid reservoir 14 via the repression plenum 62 under a pressure greater than that under which it has been introduced beforehand in said reservoir 14 via the intake plenum 21, while the heat export or input means 17 transfer heat to the heating means 18, such that the variable pneumatic volume 2 forms a compressor 3.

It is noted that the heating means 18 can be, for example, constituted of an underfloor heating provided in a commercial or dwelling building 121, of a fan coil unit known per se, or of an air-water, air-soil or water-water exchanger provided on the outside 122, according to the principles ordinarily retained for aerothermic or geothermic heat pumps.

It is noted that the compressor flap 52 can be formed of a single strip or contact part returned on a seat sealed by a spring, whatever its type, or be formed of a valve assisted by an electromechanical actuator which engages with at least one pressure switch or with a pressure sensor coupled with a computer 120.

It has been shown in FIGS. 13 to 16 that the filling means 20 and/or the draining means 22 can be constituted of at least one controlled expander valve 54, however that in operation, the working gas 5 is expelled from the gas and liquid reservoir 14 via the repression plenum 62 under a pressure less than that under which it has been introduced beforehand in said reservoir 14 via the intake plenum 21, while the heat export or input means 17 take heat to the cooling means 19, such that the variable pneumatic volume 2 forms an expander 4.

It is noted that the cooling means 19 can be, for example, constituted of an underfloor cooling provided in a commercial or dwelling building 121, of a fan coil unit known per se, or an air-water, air-soil or water-water exchanger provided on the outside 122, according to the principles ordinarily retained for aerothermic or geothermic heat pumps.

According to a variant of the mechanical liquid piston slow expansion compressor 1 according to the invention shown in FIGS. 6 to 9, the repression plenum 62 of the compressor 3 can be connected to the intake plenum 21 of the expander 4 by a high pressure gas conduit 56, such that the working gas 5 repressed via the repression plenum 62 of said compressor 3 is introduced in said expander 4 via the intake plenum 21 of said expander 4, the crankshaft 24 of said compressor 3 being directly or indirectly connected to the crankshaft 24 of said expander 4, said compressor 3 and said expander 4 engaging to form a heat pump 55 executing a heat pump cycle close to that of Carnot, i.e. a quasi-adiabatic compression followed by a quasi-isothermal compression performed in the compressor 3, then a quasi-adiabatic expansion followed by a quasi-isothermal expansion performed in the expander 4.

According to this particular embodiment of the mechanical liquid piston slow expansion compressor 1 according to the invention, the crankshaft 24 of the compressor 3 and the crankshaft 24 of the expander 4 can only form one single and same crankshaft 24 comprising at least two cranks 26, one of which for the compressor 3, and the other for the expander 4.

Alternatively, the crankshaft 24 of the compressor 3 can be indirectly connected to the crankshaft 24 of the expander 4 by way of mechanical, electric, hydraulic, pneumatic transmission means, or by way of any other transmission means at all.

It is noted, that advantageously, the angular position on the crankshaft 24 of the crank 26 of the compressor 3 relative to that of the crank 26 of the expander 4 can be calculated, such that the resistant torque that said compressor 3 exerts on the crankshaft 24 is, as much as possible, compensated for by the motor torque that said expander 4 exerts on said shaft 24, such that the drive motor 27 is subjected to the maximum motor torque, or resistant as low as possible.

In FIG. 9, it has also been shown that the high pressure gas conduit 56 can be connected to at least one high pressure gas reservoir 58 which can accumulate the hot and high pressure working gas 5, the high pressure gas conduit 56 and/or the high pressure gas reservoir 58 advantageously being able to be thermally insulated from their outside environment by a thermal insulation layer 59.

Still in FIG. 9, it has been shown that the intake plenum 21 of the compressor 3 and the repression plenum 62 of the expander 4 can communicate by way of a low pressure gas reservoir 60 to which they are respectively connected by a low pressure gas conduit 61, said low pressure gas reservoir 60 being able to accumulate cold and relatively low pressure working gas 5, the low pressure gas conduit 61 and/or said reservoir 60 advantageously being able to be thermally exposed to the environment to which the cooling means 19 are themselves exposed, even being able to totally or partially form a low pressure gas heating exchanger 39 which forces said environment to transfer heat to said working gas 5.

Thus, and as is shown in FIG. 9, a circulation turbine 46 can force the working gas 5 contained in the low pressure gas reservoir 60 to circulate in a low pressure gas heating exchanger 39 that said reservoir 60 comprises, while at least one motor fan 108 forces the atmospheric air from the environment to which the cooling means 19 are exposed, to pass through said exchanger 39.

Advantageously, the pressure in the low pressure reservoir 60 can be greater than the atmospheric pressure to give the heat pump 55 are greater compactness.

It is noted that advantageously, insofar as the heat pump 55 that the mechanical liquid piston slow expansion compressor 1 according to the invention forms, comprises a low pressure gas reservoir 60, the working gas 5 can be different from the atmospheric air and be constituted of any element or molecule, such as pure nitrogen, helium, argon, or carbon dioxide, said element or molecule being chosen according to its chemical reactivity, to its thermodynamic performance, and of its ability to favour heat exchanges, in particular with the working liquid 13 and the heat exchange and accumulation means 16.

This also makes it possible to prevent the corrosion of the components constituting the mechanical liquid piston slow expansion compressor 1 according to the invention, and the development of microorganisms.

It is noted that, if they are thermally insulated from the outside environment, the high pressure gas reservoir 58 and the low pressure gas reservoir 60 can form, with the heat pump 55, a total closed volume which preserves energy in the form of pressure and/or of heat, while said energy is not transformed into useful heat or cold, which contributes to the high efficiency of said pump 55.

It is noted in FIGS. 1 to 4, in FIGS. 6 to 8, in FIGS. 10 to 16, and in FIGS. 22 and 23, that the intake plenum 21 and the repression plenum 62 can advantageously be positioned in the upper part of the gas and liquid reservoir 14, the latter being itself positioned above the liquid cylinder 8, such that due to the Earth's gravity, the working gas 5 always exits firstly from the gas and liquid reservoir 14 via the repression plenum 62, and that the working liquid 13 always enters firstly into said reservoir 14 via the intake plenum, the working liquid 13 always remaining mainly below the working gas 5 in the rigid assembly 31, even if said liquid 13 can contain a certain proportion of said gas 5, dissolved or in the form of bubbles.

According to a particular variant of an embodiment of the mechanical liquid piston slow expansion compressor 1 according to the invention shown in FIGS. 2 to 4, in FIGS. 6 to 8, and in FIGS. 10 to 16, the tilt axis 9 can be constituted of a hollow cylindrical axis 63 which has at least one opening radial space 64, said cylindrical axis 63 being positioned above the gas and liquid reservoir 14, while the intake plenum 21 and/or the repression plenum 62 is connected to an annular gas collector 65 which surrounds said cylindrical axis 63 and which comprises the opening radial space 64, such that the working gas 5 can circulate between the inside of the hollow cylindrical axis 63 and the intake plenum 21 and/or the repression plenum 62 via the opening radial space 64 and the annular gas collector 65.

It is noted that rotating shaft seals can advantageously be placed axially on either side of the opening radial space 64 and at the interface between the hollow cylindrical axis 63 and the annular gas collector 65, said seals forming a sealing to the working gas 5 between said axis 63 and said collector 65.

As a particular embodiment of the mechanical liquid piston slow expansion compressor 1 according to the invention detailed in FIG. 6, the kinetic energy storage means 28 can be constituted of a low speed inertia flywheel 66 which is rotatably secured, on the one hand, to the crankshaft 24, and on the other hand, to a ring gear 67 that the drive motor 27 rotates by way of at least one ring drive pinion 68, the primitive diameter of which is smaller than that of said ring 67, the latter and said pinion 68 forming a high gearing mesh system 69, however that a high speed inertia flywheel 70 is directly or indirectly rotatably secured to the ring drive pinion 68.

According to this particular configuration of the mechanical liquid piston slow expansion compressor 1 according to the invention, the instant torque variations that the compression or the expansion of the working gas 5 in the gas and liquid reservoir 14 imposes on the crankshaft 24, are mainly absorbed by the inertia of the low speed inertia flywheel 66 and by that of the high speed inertia flywheel 70, such that the torque which resists or which drives the drive motor 27 is smooth, said motor 27 thus being mainly subjected to the only resistant average torque necessary for maintaining the crankshaft 24 in regular rotation.

It will be noted that the high speed inertia flywheel 70 can optionally be confined in a vacuum casing.

In this case, the power transmission between said flywheel 70 and the ring drive pinion 68 can be performed by contactless magnetic couping.

It will also be noted that to facilitate the rotation of the assembly constituted of the low speed inertia flywheel 66 and of the crankshaft 24, the drive motor 27 can be rotatably fixedly secured to the high speed inertia flywheel 70, however that a disengageable coupler can be inserted between the assembly formed by said motor 27 and said flywheel 70 on the one hand, and the ring drive pinion 68 on the other hand, said coupler being able to be magnetic, hydraulic, or of any other type.

It has been shown in FIGS. 1, 2, 6, 9, 22 and 23, that a high gearing mesh system 69 can advantageously be inserted between the drive motor 27 and the ring drive pinion 68.

As shown in FIGS. 3 and 4, and in FIGS. 10 to 16, that the liquid spray pump 72 can be constituted of a pump cylinder 73 which is provided in the liquid cylinder 8 and/or in the extension of said cylinder 8, a pump piston 74 moved by the hydraulic piston 10 and/or by the liquid cylinder 8 being able to translate into said pump cylinder 73.

It is noted that the pump cylinder 73 can be directly or indirectly secured, either to the liquid cylinder 8 or to the gas and liquid reservoir 14, or to the hydraulic piston 10, while the same applies for the pump piston 74.

It is noted, particularly in FIGS. 10 to 16, that as a non-limiting example, the liquid spray pump 72 can comprise at least one pump intake flap 79 and at least one pump repression flap 80, said flaps 79, 80 being able to be secured either to the pump cylinder 73 or to the pump piston 74.

It can also be noted that the pump cylinder 73 can comprise discharge orifices in its length, said orifices making it possible to increase or decrease the repression pressure of the working liquid 13 by the liquid spray pump 72 according to the relative position of the pump piston 74 in said pump cylinder 73.

In FIGS. 10 to 12, it is noted that the pump piston 74 can comprise a start-of-travel touch needle 77 by way of which it is moved, said piston 74 being returned on an end-of-travel abutment 78 by a piston return mass 76 or a piston return spring, not represented.

This particular configuration of the mechanical liquid piston slow expansion compressor 1 according to the invention in particular makes it possible that the travel of the pump piston 74 is shorter than that of the hydraulic piston 10 and that, for example, the liquid spray nozzle 71 atomises the working liquid 13 in the internal volume of the gas and liquid reservoir 14, only when the hydraulic piston 10 arrives close to its high neutral position.

In FIGS. 13 to 16, it has been shown that the pump piston 74 can be moved by way of a movement spring 81 which makes it possible to uncouple the distance variation between the pump piston 74 and the pump cylinder 73 of that between the liquid cylinder 8 and the hydraulic piston 10.

This particular configuration can also be retained to preserve a relatively constant pressure in the pump cylinder 73, whatever the rotation speed of the crankshaft 24.

In FIGS. 3, 6 and 7, and in FIGS. 17 to 21, it has been shown that upon each rotation of the crankshaft 24, an overflow pump 82 can transfer a small quantity of working liquid 13 from an overflow reservoir 83 to the gas and liquid reservoir 14 and/or the liquid cylinder 8.

Thus, when the hydraulic piston 10 performs back-and-forth movements in the liquid cylinder 8 and when the variable hydraulic volume 12 is minimum, the gas and liquid reservoir 14 is fully filled with working liquid 13, the small quantity of working liquid 13 introduced by the overflow pump 82 in the gas and liquid reservoir 14 overflowing upon each rotation of the crankshaft 24 of said reservoir 14 to return to the overflow reservoir 83 via the outlet port 7 and the repression plenum 62.

This particular configuration of the mechanical liquid piston slow expansion compressor 1 according to the invention enables all of the working gas 5 that the variable pneumatic volume 2 contains to be expelled from said volume 2, when the variable hydraulic volume 12 is minimum, which gives said volume 2 an infinite volume ratio, and a volume efficiency close to one hundred percent.

As is noted in FIG. 3, the overflow reservoir 83 can communicate with the repression plenum 62, the working gas pressure 5 which is in said reservoir 83 being close or identical to that which is in said plenum 62, while said reservoir 83 is located below the repression plenum 62 such that, due to the Earth's gravity, the working liquid 13 which overflows from the gas and liquid reservoir 14 via the outlet port 7 and the repression plenum 62 naturally returns into said overflow reservoir 83.

It is noted in FIGS. 17 to 21, that the overflow pump 82 comprises a pump blind cylinder 84 in which an overflow pump piston 85 can sealingly translate, the latter and said cylinder 84 forming a variable overflow pump volume 86 which, when it increases, is filled with working liquid 13 coming from the overflow reservoir 83 via at least one overflow pump intake flap 87 and which, when it decreases, represses said liquid 13 to the gas and liquid reservoir 14 and/or the liquid cylinder 8 via a repression valve 88.

It is noted that the pump blind cylinder 84 can be assembled or not, i.e. that it can be made of one single part, or receive a cylinder head which closes its end opposite that blocked by the overflow pump piston 85.

In FIGS. 17 to 19, it is noted that the overflow pump piston 85 can be a two-body staged piston 89 which comprises a body of a large diameter 93 which has a face with a large cross-section 90 which forms one of the walls of the variable overflow pump volume 86, said staged piston 89 also comprising, axially opposite the face with a large cross-section 90, a body of a small diameter 94 which can sealingly translate into an actuation cylinder 92, the internal volume of which is connected directly or not to that of the liquid cylinder 8, said body of a small diameter 94 having a face with a small cross-section 91 on which the pressure which is in the liquid cylinder 8 is exerted, said staged piston 89 also offering, at the junction between the body of a large diameter 93 and the body of a small diameter 94, a face with an average cross-section 95 from which the body of a small diameter 94 emerges, which is connected to the overflow reservoir 83, and which is subjected to the pressure in said reservoir 83, while a staged piston abutment 117 fixes the maximum volume of the variable overflow pump volume 86 and that a two-body piston return spring 96 tends to repel the two-body staged piston 89 in the direction of its face with a large cross-section 90.

In FIGS. 17 to 19, it is also noted that the repression valve 88 comprises a valve actuator piston 97 which can sealingly translate into a valve actuator cylinder 98 and which has, firstly, a valve actuation axial face 99 which communicates with the overflow reservoir 83 and on which the pressure in said reservoir 83 is exerted, said face 99 being able to raise an overflow flap 100 of an overflow flap seat 104 when the valve actuator piston 97 is moved in the direction of said face 99 which has the effect of putting the variable overflow pump volume 86 in communication with the gas and liquid reservoir 14 and/or the liquid cylinder 8 via said overflow flap 100, and secondly, a liquid cylinder side axial face 102 which communicates with the liquid cylinder 8 or with the gas and liquid reservoir 14, on which the pressure in said cylinder 8 is exerted, and which can come into contact with a liquid cylinder side abutment 118 when the valve actuator piston 97 is moved in the direction of said liquid cylinder side axial face 102, however that an actuation piston return spring 103 tends to repel the valve actuator piston 97 in the direction of its valve actuation axial face 99, and that an overflow flap return spring 128 tends to return the overflow flap 100 in contact with the overflow flap seat 104 with which it engages, the force that the actuation piston return spring 103 produces being greater than the force that the overflow flap return spring 128 produces.

As a non-represented alternative, the repression valve 88 can comprise a cylindrical slide on the external surface of which a slide recess is provided, said slide being able to sealingly translate into a slide cylinder, into which an intake space opens, connected to the variable overflow pump volume 86, and an escape space connected to the gas and liquid reservoir 14 or to the liquid cylinder 8, while according to the axial position of the cylindrical slide in the slide cylinder, the slide recess can connect, or not, the intake space with the escape space, the cylindrical slide 97 having a reservoir side axial face which communicates with the overflow reservoir 83 and on which the pressure in said reservoir 83 is exerted, and a liquid cylinder side axial face which can rest on a liquid cylinder side slide abutment, which communicates with the liquid cylinder 8, or with the gas and liquid reservoir 14 and on which the pressure in said cylinder 8 or that in the gas and liquid reservoir 14 is exerted, however that a slide return spring tends to repel the cylindrical slide in the direction of its reservoir side axial face, up to a reservoir side slide abutment which, when it is reached by said slide, puts the intake space in communication with the escape space via the slide recess.

In FIGS. 20 and 21, it has been shown that the overflow pump piston 85 can be a two-body staged piston 89 which comprises a body of a large diameter 93 which has a face with a large cross-section 90 which is connected to the overflow reservoir 83 and which is subjected to the pressure in said reservoir 83, said staged piston 89 also comprising, axially opposite the face with a large cross-section 90, a body of a small diameter 94 which can sealingly translate into an actuation cylinder 92, the internal volume of which is connected directly, or not, to that of the liquid cylinder 8, said body of a small diameter 94 having a face with a small cross-section 91 on which the pressure in the liquid cylinder 8 is exerted, said staged piston 89 also offering, at the junction between the body of a large diameter 93 and the body of a small diameter 94, a face with an average cross-section 95 from which the body of a small diameter 94 emerges, said face 95 forming one of the walls of the variable overflow pump volume 86, while a staged piston abutment 117 fixed the maximum volume of the variable overflow pump volume 86, and that a two-body piston return spring 96 tends to repel the two-body staged piston 89 in the direction of its face with a small cross-section 91.

Still in FIGS. 20 and 21, it has been shown that the repression valve 88 can comprise a valve actuator piston 97 which can sealingly translate into a valve actuator cylinder 98 and which has, firstly, a valve actuation axial face 99 which communicates with the liquid cylinder 8 and on which the pressure in said cylinder 8 is exerted, said face 99 being able to raise an overflow flap 100 of an overflow flap seat 104, when the valve actuator piston 97 is moved in the direction of said face 99 which has the effect of putting the variable overflow pump volume 86 in communication with the gas and liquid reservoir 14 and/or the liquid cylinder 8 via said overflow flap 100, and secondly, a reservoir side axial face 101 which communicates with the overflow reservoir 83, on which the pressure in said reservoir 83 is exerted, and which can come into contact with an overflow reservoir side abutment 130, when the valve actuator piston 97 is moved in the direction of said reservoir side axial face 101, however that an actuation piston return spring 103 tends to repel the valve actuator piston 97 in the direction of its valve actuation axial face 99, and that an overflow flap return spring 128 tends to return the overflow flap 100 in contact with the overflow flap seat 104 with which it engages, the force that the actuation piston return spring 103 produces being greater than the force that the overflow flap return spring 128 produces.

As a non-represented alternative, the repression valve 88 can comprise a cylindrical slide on the external surface of which a slide recess is provided, said slide being able to translate into a slide cylinder, into which an intake space connected to the variable overflow pump volume 86, and an escape space connected to the gas and liquid reservoir 14 or to the liquid cylinder 8 open, while according to the axial position of the cylindrical slide in the slide cylinder, the slide recess can connect or not the intake space with the escape space, the cylindrical slide having a reservoir side axial face, which can rest on a reservoir side slide abutment, which communicates with the overflow reservoir 83, and on which the pressure in said reservoir 83 is exerted, and a liquid cylinder side axial face which communicates with the liquid cylinder 8 or with the gas and liquid reservoir 14 and on which the pressure in said cylinder 8 is exerted, however that a slide return spring tends to repel the cylindrical slide in the direction of its liquid cylinder side axial face up to a liquid cylinder side slide abutment which, when it is reached by said slide, put the intake space in communication with the escape space via the slide recess.

According to a particular embodiment of the mechanical liquid piston slow expansion compressor 1 according to the invention shown in FIG. 23, counterbalancing means 112 can be totally or partially substituted for the piston guiding means 23 to incline the liquid cylinder 8 during the rotation of the crankshaft 24 so as to reduce, even annul the radial forces exerted on said guiding means 23 by the inclination of said cylinder 8 due to the mass of the latter, and to the Earth's gravity.

According to this particular configuration, the counterbalancing means 112 can be constituted of a counterbalancing mast 113 which, on the one hand, comprises a counterbalancing mass 116 and which, on the other hand, is articulated about a mast axis 114 which is parallel to the tilt axis 9 of the liquid cylinder 8 and which is secured to the static frame 40, however that the counterbalancing mast 113 forms with said cylinder 8, a pivoting-sliding articulation 115 and constitutes an imbalance contrary to that of said cylinder 8, the pivoting-sliding articulation 115 being able to be constituted, as shown in FIG. 23, of an axis which emerges from the external surface of the liquid cylinder 8, said axis receiving a bearing which can be moved in an oblong cavity that the counterbalancing mast 113 has.

It is noted that according to a particular embodiment of the mechanical liquid piston slow expansion compressor 1 according to the invention, the counterbalancing mast 113 can receive a counterbalancing mass 116, the weight and/or the position of which can be variable.

It is noted that alternatively to the above, the counterbalancing means 112 can be constituted of a rotating drive and synchronisation mechanism of the liquid cylinder 8 of any type at all, or of mechanisms with elastic connections which themselves also tend to reduce even annul the radial forces exerted on the piston guiding means 23 by the inclination of the cylinder 8 due to the mass of the latter, and to the Earth's gravity.

Operation of the Invention

The operation of the mechanical liquid piston slow expansion compressor 1 according to the invention is understood easily in view of FIGS. 1 to 23.

The aim of said expansion compressor 1 is, in particular, to constitute a variable pneumatic volume 2 in which the heat exchanges are maximised between a working gas 5, which can be atmospheric air, and a working liquid 13, which can be water, during the compression or the expansion of said gas 5 and this, such that said compression or said expansion is as isothermal as possible, the working liquid 13 which has a high volume calorie capacity, mainly imposing its temperature on the working gas 5, the volume calorie capacity of which is low.

Thus, when if, as FIGS. 1 to 4, FIGS. 10 to 12, and FIGS. 22 and 23 show, the mechanical liquid piston slow expansion compressor 1 according to the invention forms a compressor 3, a working gas 5 is compressed in the variable pneumatic volume 2.

In this case, said gas 5 first rises in pressure and in temperature, until the latter reaches that of the working liquid 13 contains in the liquid cylinder 8 and in the gas and liquid reservoir 14, then, this temperature level being reached, said gas 5 continues to be compressed and rise in pressure, however that the heat produced by the compression of said gas 5 is transferred to said liquid 13 as said heat is produced, to the point that the compression of said gas 5 ends close to isothermally.

If, conversely, and as FIGS. 13 to 16 show, the mechanical liquid piston slow expansion compressor 1 according to the invention forms an expander 4, a working gas 5 is expanded in the variable pneumatic volume 2.

In this other case, said gas 5 first descends in pressure and in temperature until the latter reaches that of the working liquid 13 contains in the liquid cylinder 8 and in the gas and liquid reservoir 14, then, this temperature level being reached, said gas 5 continues to be expanded and descended in pressure, however that its temperature is permanently maintained close to that of the working liquid 13, the latter transferring for that, heat to said gas 5, to the point that the expansion of said gas 5 ends close to isothermally.

Thus, and as has been shown in FIGS. 1 to 4, in FIGS. 10 to 12, in FIGS. 22 and 23, and in FIGS. 13 to 16, the mechanical liquid piston slow expansion compressor 1 according to the invention can form a compressor 3, or an expander 4, the gas and liquid reservoir 14 in which the variable pneumatic volume 2 is formed, housing heat exchange and accumulation means 16 provided to exchange heat with the working gas 5 or with the working liquid 13, and to temporarily store all or some of said heat before exporting the latter via heat export or input means 17 to heating means 18 as FIG. 9 shows, or after having imported said heat via said export or input means 17 from cooling means 19, as FIG. 9 also shows.

As shown in FIG. 9, and as a non-limiting example, the heating means 18 can be constituted of a heating and cooling underfloor 106 installed in a building 121, while the cooling means 19 can take the form of an air-water exchanger 107 placed outside 122 of said building 121.

Further to favouring heat exchanges between a working gas 5 and a working liquid 13 during the compression or the expansion of said gas 5, the mechanical liquid piston slow expansion compressor 1 according to the invention minimises the energy losses by friction, the latter being undesirable in that they reduce the efficiency of the compressor 3 or of the expander 4 that said expansion compressor 1 forms.

For this, contrary to the conventional rod and crank systems that compressors and alternative thermal motors ordinarily commercialised comprise, the hydraulic piston 10 of the mechanical liquid piston slow expansion compressor 1 according to the invention sealingly translates into the liquid cylinder 8 to form with the latter, a variable hydraulic volume 12, this without undergoing significantly high radial force.

As can be seen, for example, in FIGS. 1 and 2, this result is obtained, thanks to the pivoting of the liquid cylinder 8 about a tilt axis 9, which is perpendicular to the axis of said cylinder 8, and which is secured to a static frame 40, however that the hydraulic piston 10 and its connecting rod 11 are maintained parallel to the liquid cylinder 8 by piston guiding means 23 secured to said cylinder 8, whatever the position of said piston 10 in said cylinder 8.

As can be seen in FIGS. 1 to 3, in FIGS. 6 to 8, in FIGS. 10 to 16, and in FIGS. 22 and 23, the piston guiding means 23 can be constituted of a sliding pivot connection 47 formed between an external cylindrical surface 48 that the connecting rod 11 has, and a sliding ring 49 which is securely connected to the liquid cylinder 8 by way of a ring carrier structure 50.

Thus, and as FIGS. 1 and 2, FIGS. 6 to 8, and FIGS. 22 and 23 show, the crank 26 around which a second rod end 30 of the connecting rod 11 is articulated, always remains approximately in the axis of the liquid cylinder 8.

According to this particular configuration specific to the mechanical liquid piston slow expansion compressor 1 according to the invention, contrary to the most common rod and crank systems, the axial force that the pressure of the working gas 5 exerts on the hydraulic piston 10 by way of the working liquid 13 is no longer translated by radial force other than what is exerted by said piston 10 on the liquid cylinder 8.

As, indeed, the low rotation speed of the mechanical liquid piston slow expansion compressor 1 does not favour the establishment of a hydrodynamic lubrication system between the hydraulic piston 10 and the liquid cylinder 8, said system requiring, to be established, a high relative speed between said piston 10 and said cylinder 8.

Moreover, if the working liquid which interferes between the hydraulic piston 10 and the liquid cylinder 8 is water, the latter not being very viscous and having low lubricating properties, it is also unfavourable to establishing a hydrodynamic bearing capacity system at the interface between said piston 10 and said cylinder 8.

This particular feature of the mechanical liquid piston slow expansion compressor 1 which consists of removing any radial force exerted by the hydraulic piston 10 on the liquid cylinder 8 is of utmost importance, in particular to give to any heat pump 55 formed of a compressor 3 and of an expander 4 according to the invention, a high efficiency and a performance coefficient greater than that of conventional heat pumps operating a refrigerant fluid.

Always with the aim of minimising the energy losses by friction, it is noted in FIGS. 1 to 3, in FIGS. 6 to 8, and in FIGS. 22 and 23, that all the pivot connections of the mechanical liquid piston slow expansion compressor 1 receive a roller bearing 105 known per se, whether this relates to the tilt axis 9, shaft bearings 25, or crank 26.

The actual friction coefficient of the roller bearings 105 being very low, said pivot connections dissipate little energy and have little negative impact on the energy efficiency of any heat pump 55 constituted from the mechanical liquid piston slow expansion compressor 1 according to the invention.

The aim of the mechanical liquid piston slow expansion compressor 1 according to the invention is also to minimise the energy losses by working gas leakages 5, said leakages reducing the actual efficiency of the compressor 3 or of the expander 4 that said expansion compressor 1 forms.

In this regard, it is noted that the hydraulic piston 10 forms a sealing with the liquid cylinder 8 into which it translates, and that this sealing is applied to the working liquid 13, and not to the working gas 5 itself which, due to its low density, the Earth's gravity, and the low rotation speed of the mechanical liquid piston slow expansion compressor 1, always remains above said working liquid 13.

It results from this particular configuration of the mechanical liquid piston slow expansion compressor 1 according to the invention that the sealing that the hydraulic piston 10 forms with the liquid cylinder 8 only prevents possible working liquid 13 leakages and not working gas 5 leakages, the volume flow rate of said possible leakages being highly limited by the high density and viscosity of said liquid 13, in this case and as a non-limiting example, water.

It is also noted that a sealing pushed between the hydraulic piston 10 and the liquid cylinder 8 is all the more achievable than the mechanical liquid piston slow expansion compressor 1 rotates slowly.

Indeed, the low rotation speed of said expansion compressor 1 implies a low relative linear speed between the hydraulic piston 10 and the liquid cylinder 8, which makes it possible to equip the hydraulic piston 10 of a flexible and continuous seal 51 for example constituted of an elastomer O-ring which flattens on the internal wall of the liquid cylinder 8, a friction ring made of polytetrafluoroethylene filled with anti-friction particles, this material being notably resistant to abrasion.

It is advantageously noted, that the working liquid 13 can be formed of a mixture of glycol and water, which, further to lowering the solidification temperature of said water and prevent it freezing, can contribute to increasing the durability of the seal 51, to limiting the energy losses by friction produced by said seal 51, and to also reducing, if necessary, the possible working liquid 13 leakages at the interface of the contact between the hydraulic piston 10 and the liquid cylinder 8.

It will be noted that, for the working liquid 13 to always remain fully in contact with the hydraulic piston 10 and that no cavitation phenomenon or over-mixture occurs between the working gas 5 and the working liquid 13, the maximum acceleration or deceleration of the hydraulic piston 10 between its halfway point and its high neutral position must remain less than the Earth's gravity.

In this regard, the rotation speed of the crankshaft 24 must remain low, that will be fixed, as a non-limiting example, to forty rotations per minute.

This low speed explains the necessity to add kinetic energy storage means 28 to the crankshaft 24, which are, according to the example of the embodiment of the mechanical liquid piston slow expansion compressor 1 according to the invention shown in FIGS. 1 and 2, in FIGS. 6 to 8, and in FIGS. 22 and 23, constituted of a low speed inertia flywheel 66 which is rotatably secured, on the one hand, to the crankshaft 24, and on the other hand, to a gearwheel 67 that the drive motor 27 rotates by way of a high efficiency ring drive pinion 68, the primitive diameter of which is smaller than that of said ring 67, the latter and said pinion 68 forming a high gearing mesh system 69.

It is also noted in FIG. 6, that a high speed inertia flywheel 70 can advantageously be provided rotatably secured to the ring drive pinion 68.

According to this particular configuration of the mechanical liquid piston slow expansion compressor 1 according to the invention, the instant torque variations that the compression or the expansion of the working gas 5 in the gas and liquid reservoir 14 imposes on the crankshaft 24, are mainly absorbed by the inertia of the low speed inertia flywheel 66 and by that of the high speed inertia flywheel 70, such that the torque which resists or which drives the drive motor 27 is smooth, said motor 27 thus being mainly subjected to the resistant average torque necessary for maintaining the crankshaft 24 in regular rotation.

Further to avoiding any cavitation or over-mixture phenomenon between the working gas 5 and the working liquid 13, the low rotation speed of forty rotations per minute imposed on the crankshaft 24 leaves significant time for the transferring of the working gas 5 to the filling means 20 or draining means 22 of the compressor 3 and of the expander 4.

Indeed, further to the time left for the heat exchanges to occur in the gas and liquid reservoir 14 between the working gas 5 and/or the working liquid 13 on the one hand, and the heat exchange and accumulation means 16 on the other hand, the advantage of a slow rotation of the compressor 3 or of the expander 4 is that it leaves time for the transferring of the working gas 5 to occur, so as to limit the pressure losses at the inlet port 6 and at the outlet port 7 of said compressor 3 or of said expander 4.

As, indeed, the filling means 20 which enable or which prohibit the passage of the working gas 5 from an intake plenum 21 to the gas and liquid reservoir 14 via the inlet port 6, or the draining means 22 which enable or prohibit the passage of working gas 5 from the gas and liquid reservoir 14 to a repression plenum 62 via the outlet port 7, can be constituted of at least one compressor flap 52 assisted or not by electric means, by at least one controlled compressor valve 53, or by at least one controlled expander valve 54.

Yet, these components 52, 53, 54 oppose to their movement the inertia forces, the intensity of which evolves at the square of the rotation speed of the crankshaft 24 and in this regard, if said shaft 24 only rotates, for example, forty rotations per minute, said forces are so low, that they no longer have a negative consequence on the efficiency of the mechanical liquid piston slow expansion compressor 1 according to the invention.

It results from the above, that the actual pressure-volume thermodynamic diagram of a heat pump 55 comprising a compressor 3 and an expander 4 formed from the mechanical liquid piston slow expansion compressor 1 according to the invention, is close to that of the ideal Carnot cycle, practice meeting theory as close as possible.

The low rotation speed of the crankshaft 24 also gives to the mechanical liquid piston slow expansion compressor 1 according to the invention a service life of several decades, even several centuries, subject to changing a few parts subjected to ageing, like the seal 51 of the hydraulic piston 10.

To continue the description of the operation of the mechanical liquid piston slow expansion compressor 1 according to the invention and as shown in FIGS. 6 to 9, in this case, it is considered that a compressor 3 and an expander 4 formed from said slow expansion compressor 1 engage to form a heat pump 55 which executes a refrigerant cycle close to that ideal Carnot cycle.

In this regard, it is noted in FIGS. 6 to 9, that the repression plenum 62 of the compressor 3 is connected to the intake plenum 21 of the expander 4 by a high pressure gas conduit 56, such that the working gas 5 repressed via the repression plenum 62 of said compressor 3 is introduced in said expander 4 via the intake plenum 21 of said expander 4, the crankshaft 24 of said compressor 3 being connected to the crankshaft 24 of said expander 4.

It can be noted in FIG. 9, that the high pressure gas conduit 56 is connected to a high pressure gas reservoir 58 which can accumulate, as a non-limiting example, working gas 5, the temperature of which is forty degrees Celsius, and the pressure of which is forty-six bar absolute.

In this regard and as shown in FIG. 9, the high pressure gas conduit 56 and the high pressure gas reservoir 58 can advantageously be coated with a thermal insulation layer 59 which prevents any useless dissipation of heat into the outside environment of the heat pump 55.

It is also noted in FIG. 9, that the intake plenum 21 of the compressor 3 and the repression plenum 62 of the expander 4 communicate by way of a low pressure gas reservoir 60 to which they are respectively connected by a low pressure gas conduit 61.

As a non-limiting example, the pressure and the temperature of the working gas 5 contained in the low pressure gas reservoir 60 are respectively one and a half bar absolute, and two degrees Celsius.

Still as a non-limiting example and as shown in FIG. 9, in this case, it is assumed that the heating means 18 are constituted of a heating and cooling underfloor 106 in which a heat-transfer fluid 37 circulates, which transports heat from the compressor 3 to said underfloor 106, said fluid 37 entering into said underfloor 106 at a temperature of thirty-five degrees Celsius, such that the latter maintains a temperature of twenty-one degrees Celsius in a dwelling building 121, while the cooling means 19 are formed of an air-water exchanger 107 which is placed outside 122 of said building 121, and through which the atmospheric air is forced to pass through two motor fans 108, a heat-transfer fluid 37 circulating in said exchanger 107 to transport heat from said exchanger 107 to the expander 4, said fluid 37 entering into said exchanger 107 at a temperature of two degrees Celsius, while the outside temperature of the building 121 is seven degrees Celsius.

In relation to FIGS. 6 to 8, it is also assumed that the travel of the hydraulic piston 10 of the compressor 3 and of the expander 4 is four hundred millimetres, while the bore of the liquid cylinder 8 of said compressor 3 and of said expander 4 is four hundred and ten millimetres, said piston 10 and said cylinder 8 therefore forming a variable hydraulic volume 12 of fifty-one point five litres.

FIG. 5 represents principle pressure-volume diagrams, the scales not necessarily being respected, such as executed by the heat pump 55 which has just been described, the top diagram being executed by the compressor 3, while the bottom diagram is executed by the expander 4, the two said diagrams being virtually connected by the dotted line arrows to reconstitute the diagram of the heat pump Carnot cycle.

As regards the diagram of the compressor 3, i.e. the top diagram of FIG. 5, the cross-section A-B forms an adiabatic compression which makes it possible to increase the initial temperature T1 of the working gas 5 from two degrees Celsius up to forty degrees Celsius, the latter temperature being referenced T2.

In doing so, the pressure of the working gas 5 passes from one and a half bar to two point four bars.

The hydraulic piston 10 of the compressor 3 continuing its travel to its high neutral position, the cross-section B-C forms an isothermal compression, during which the pressure of the working gas 5 passes from two point four to forty-six bars, however that the temperature T2 of forty degrees Celsius of said gas 5 remains constant, said gas 5 transferring its heat Q1 as said heat is produced to the working liquid 13 and to the heat exchange and accumulation means 16.

The cross-section C-D corresponds to the transferring of the working gas 5 from the gas and liquid reservoir 14 of the compressor 3 to the high pressure gas reservoir 58 shown in FIG. 9, the temperature and the pressure of said gas 5 being respectively forty degrees Celsius and forty-six bars.

Said transferring occurs successively via the compressor flap 52 of the outlet port 7 of the compressor 3, its repression plenum 62, and the high pressure gas conduit 56.

The cross-section D-E of the diagram of the compressor 3 illustrates the sudden drop in pressure which occurs in the gas and liquid reservoir 14 of the compressor 3, when the compressor flap 52 of the outlet port 7 of said compressor 3 is closed and that immediately after, the compressor flap 52 of its inlet port 6 opens.

The cross-section E-A corresponds to the intake by the compressor 3 of working gas 5 coming from the low pressure gas reservoir 60 shown in FIG. 9 successively via the low pressure gas conduit 61, the intake plenum 21, and the compressor flap 52 of the inlet port 6 of said compressor 3.

As regards the diagram of the expander 4, i.e. the bottom diagram of FIG. 5, the cross-section F-G corresponds to the transferring of the working gas 5 from the high pressure gas reservoir 58 to the gas and liquid reservoir 14 of said expander 4, the temperature T2 and the pressure of said gas 5 being respectively forty degrees Celsius and forty-six bars.

The cross-section G-H forms an adiabatic expansion which lowers the initial temperature T2 of the working gas 5 from forty degrees Celsius to two degrees Celsius, the latter temperature being referenced T1, however that at the same time, the pressure passes from forty-six to approximately twenty-nine bars.

Then, the cross-section H-I forms an isothermal expansion during which the pressure of the working gas 5 passes from twenty-nine bars to one and a half bar absolute, however that the temperature T1 of two degrees Celsius of said gas 5 remains constant, the latter removing the heat Q2 at the working liquid 13 and at the heat exchange and accumulation means 16 to maintain its temperature close to two degrees Celsius.

The cross-section I-J of FIG. 5 corresponds to the repression of the working gas 5 contained in the gas and liquid reservoir 14 of the expander 4 to the low pressure gas reservoir 60, said gas 5 circulating to this, successively via a controlled expander valve 54, which forms the draining means 22 of the outlet port 7 of said expander 4, then via the repression plenum 62 of said expander 4, and finally, via the low pressure gas conduit 61 which connects said expander 4 to the low pressure gas reservoir 60.

The cross-section J-F of the pressure-volume diagram of the expander 4 itself illustrates the sudden increase in pressure which occurs in the gas and liquid reservoir 14 of said expander 4, when the controlled expander valve 54 which forms the draining means 22 of the outlet port 7 of said expander 4 is closed, however that immediately after, the controlled expander valve 54 which forms the filling means 20 of the inlet port 6 of said expander 4 opens to engage a new cycle of the expander 4.

Thus, the two pressure-volume diagrams shown in FIG. 5 engage to reconstitute the heat pump Carnot cycle by means of the working gas 5, the state of which does not change, the compressor 3 executing the hot part of said cycle, however that the expander 4 executes the cold part of said cycle.

If the export of heat Q1 and the export of heat Q2 were perfect, the heating power of the heat pump 55 which has just been described would be approximately seventeen kilowatts for a performance coefficient of more than eight.

Once subtracted, the losses by friction induced by the different pivot connections which, as has been shown in FIGS. 1 to 3, in FIGS. 6 to 8, and in FIGS. 22 and 23, are constituted of low friction roller bearings 105, the performance coefficient of said heat pump 55 descends approximately to seven point seven.

If the cooling means 19 are constituted of an air-water exchanger 107 such as shown in FIG. 9, and that the cumulated power consumed by the motor fans 108 to force the heat exchanges between the atmospheric air and the water which circulates in said exchanger 107 is five hundred Watts, the performance coefficient of said heat pump 55 descends to six point three.

Knowledgeable from these observations, any interest of the particular mechanical configuration of the mechanical liquid piston slow expansion compressor 1 according to the invention is understood, as indeed, if, all things equal moreover, said expansion compressor 1 had a conventional linkage which engages with a fixed liquid cylinder, even with a rod/crank ratio of four, i.e. with a particularly bulky rod of eight hundred and forty millimetres long, the performance coefficient of the heat pump which would result from this would descend to around four, instead of six point three accessible with said particular mechanical configuration of said slow expansion compressor 1 according to the invention.

Such a performance coefficient would not be distinguished enough from that of conventional heat pumps to justify a technology change, and this all the more so, than such a Carnot cycle heat pump using a gas without phase change would have all chances of being a lot heavier, voluminous and bulky than its conventional counterpart.

The only interest of replacing refrigerant fluids such as hydrofluorocarbons with atmospheric air, would not be sufficient in justifying a technology change either, as carbon dioxide provided in the near future, replacing said fluids, will remain acceptable environmentally.

However, a performance coefficient of around six instead of four currently accessible represents an energy saving with the same service provided of thirty-three percent, which is very interesting both on an energy and economic level, and on an environmental level.

However, this performance coefficient is only accessible with the mechanical liquid piston slow expansion compressor 1 according to the invention, on the condition that the heat exchanges Q1 and Q2 shown on the pressure-volume diagrams of FIG. 5 occur with great effectiveness.

That is why, in FIGS. 1 to 4, in FIGS. 8 and 9, and in FIG. 17, it has been shown that heat exchanger conduits 36 housed in the gas and liquid reservoir 14 of the compressor 3 and of the expander 4 can, for example, be formed of a copper pipe winding 109 in which a heat-transfer fluid 37 circulates, and constitute both the heat exchange and accumulation means 16 and the heat export and intake means 17.

According to this particular configuration of the mechanical liquid piston slow expansion compressor 1 according to the invention, the heat exchanger conduits 36 take or transfer heat to the working liquid 13 and to the working gas 5, then, the heat-transfer fluid 37 which circulates in said conduits 36 transports said heat from the cooling means 19 or to the heating means 18.

It is noted in FIGS. 3 and 4, that the coils that the copper pipe winding 109 forms, are maintained in place against one another by separation baffles 110, to which external fins could optionally be added, which increase the contact surface of the heat exchanger conduit 36 with the working liquid 13 or the working gas 5.

Also, when the hydraulic piston 10 is positioned at its low neutral position and when the variable pneumatic volume 2 is maximum, the working gas 5 is exposed in contact with the copper pipe winding 109 and its optional external fins, however that when said piston 10 is at its high neutral position, and that the variable pneumatic volume 2 is minimum, said winding 109 is immersed in the working liquid 13.

It has been shown in FIGS. 1 to 4, in FIG. 8, and in FIGS. 10 to 16, that the upper part of the gas and liquid reservoir 14 receives liquid spray nozzles 71 which atomise the working liquid 13 into fine droplets in the internal volume of said reservoir 14, such that said liquid 13 forms an additional heat exchange and accumulation means 16 which removes or transfers heat to the working gas 5, particularly during the isothermal compression phase corresponding to the curve cross-section B-C of the pressure-volume diagram of FIG. 5 as regards the compressor 3, and during the expansion phase corresponding to the curve cross-section H-I of said diagram as regards the expander 4.

This particular configuration of the mechanical liquid piston slow expansion compressor 1 according to the invention makes it possible to maximise the heat exchanges between the working gas 5 and the working liquid 13.

As is noted in FIGS. 2 to 4, in FIG. 8, and in FIGS. 10 to 16, the liquid spray nozzles 71 are supplied with working liquid 13 by a liquid spray pump 72, which is constituted of a pump cylinder 73 which houses a pump piston 74 moved by the hydraulic piston 10.

The operation of the liquid spray pump 72 of the compressor 3 according to a particular embodiment of said pump 72 is detailed in FIGS. 10 to 12, while the operation of the liquid spray pump 72 of the expander 4 according to a particular embodiment of said pump 72 is detailed in FIGS. 13 to 16, the details of said operations being, in view of said figures, clear for a person skilled in the art.

In FIGS. 3, 6 and 7, it is noted that the repression plenum 62 of the compressor 3 and of the expander 4 formed from the mechanical liquid piston slow expansion compressor 1 according to the invention communicates with an overflow reservoir 83, the lower part of which comprises an overflow pump 82.

According to this particular configuration of the mechanical liquid piston slow expansion compressor 1 according to the invention, upon each rotation of the crankshaft 24, the overflow pump 82 transfers a small quantity of working liquid 13 from the overflow reservoir 83 to the liquid cylinder 8 of the compressor 3 or, as the case may be, of the expander 4.

Said particular configuration makes it possible that when the hydraulic piston 10 performs back-and-forth movements in the liquid cylinder 8 and when the variable hydraulic volume 12 is minimum, the gas and liquid reservoir 14 is fully filled with working liquid 13, the small quantity of working liquid 13 introduced by the overflow pump 82 in the gas and liquid reservoir 14 overflowing upon each rotation of the crankshaft 24 of said reservoir 14 to return to the overflow reservoir 83 via the outlet port 7 and the repression plenum 62.

This particular embodiment of the mechanical liquid piston slow expansion compressor 1 according to the invention makes it possible for all of the working gas 5 that the variable pneumatic volume 2 contains, to actually be expelled from said volume 2 when the variable hydraulic volume 12 is minimum, which gives to said variable pneumatic volume 2, an infinite volume ratio, and a volume efficiency close to one hundred percent.

As can be easily deduced from FIGS. 3, 6 and 7, whether this relates to the compressor 3 or the expander 4, the working gas pressure 5 which is in the overflow reservoir 83 is similar to that which is in the repression plenum 62.

It is seen in FIGS. 3, 6 and 7 that the overflow reservoir 83 is located below the repression plenum 62 such that, due to the Earth's gravity, the working liquid 13 which overflows the gas and liquid reservoir 14 via the outlet port 7 and the repression plenum 62 naturally returns into said overflow reservoir 83.

The overflow pump 82 has been shown in FIGS. 17 to 19, such that it can be provided for the compressor 3, according to a particular configuration of the mechanical liquid piston slow expansion compressor 1 according to the invention.

As is seen in said FIGS. 17 to 19, the overflow pump piston 85 is a two-body staged piston 89 which comprises a body of a large diameter 93 which has a face with a large cross-section 90, the latter forming one of the walls of a variable overflow pump volume 86.

FIGS. 17 to 19 show that said staged piston 89 also comprises, axially opposite the face with a large cross-section 90, a body of a small diameter 94, which can sealingly translate into an actuation cylinder 92, the internal volume of which is connected to that of the gas and liquid reservoir 14 and of the liquid cylinder 8, said body of a small diameter 94 having a face with a small cross-section 91, on which the pressure which is in said cylinder 8 is exerted, said pressure being referenced P2 in FIGS. 18 and 19.

It is also noted in FIGS. 17 to 19, that said staged piston 89 has, at the junction between the body of a large diameter 93 and the body of a small diameter 94, a face with an average cross-section 95 from which the body of a small diameter 94 emerges, said face 95 being connected to the overflow reservoir 83 and being subjected to the pressure in said reservoir 83 referenced P1 in FIGS. 18 and 19, while a staged piston abutment 117 fixes the maximum volume of the variable overflow pump volume 86 and that a two-body piston return spring 96 tends to repel the two-body staged piston 89 in the direction of its face with a large cross-section 90.

Thus, and as is easily understood from FIG. 18, when the pressure P2 which is in the liquid cylinder 8 is less than the pressure P1, which is in the overflow reservoir 83, the two-body staged piston 89 is maintained flattened on the staged piston abutment 117 while the two-body piston return spring 96 is compressed by the force that the pressure difference P1 minus P2 produces, exerted over the entire surface of the face with a small cross-section 91, the repression valve 88 being closed.

When the hydraulic piston 10 of the compressor 3 arrives at the high neutral position, the pressure P2 which is in the liquid cylinder 8 becomes substantially equal to the pressure P1 which is in the overflow reservoir 83, there is no longer a force which is exerted on the face with a small cross-section 91, and the two-body piston return spring 96 repels the two-body staged piston 89 as FIG. 19 shows, which has the effect of expelling the working liquid 13 from the variable overflow pump volume 86 to the liquid cylinder 8 via the open repression valve 88, the actual energy consumption of the transferring of said liquid 13 from said volume 86 to said cylinder 8 being very low.

When the hydraulic piston 10 of the compressor 3 starts descending again, which corresponds to the cross-section D-E of the pressure-volume diagram of FIG. 5, the repression valve 88 is calculated to be closed immediately, while the pressure P2 in the liquid cylinder 8 becomes less than the pressure P1 which is in the overflow reservoir 83.

Following the compression of the two-body piston return spring 96 by the two-body staged piston 89, the latter being moved under the effect of the pressure difference P1 minus P2 which is exerted on the face with a small cross-section 91 with, at the same time, the increasing of the variable overflow pump volume 86, into which a new working liquid 13 load coming from the overflow reservoir 83 is taken in, and via the overflow pump intake flap 87.

As is noted in FIGS. 18 and 19, the repression valve 88 comprises a valve actuator piston 97 which can sealingly translate into a valve actuator cylinder 98.

Said piston 97 has a valve actuation axial face 99 which communicates with the overflow reservoir 83 and on which the pressure P1 in said reservoir 83 is exerted.

As is seen in FIG. 19, said axial face 99 can come into contact with an overflow flap 100 to raise the latter from an overflow flap seat 104 when the valve actuator piston 97 is moved in the direction of said face 99.

In this case, and considering the particular position of the overflow pump 82 shown in FIG. 3 and in FIGS. 6 and 7, the variable overflow pump volume 86 is put into communication with the gas and liquid reservoir 14 via said overflow flap 100.

It is also noted in FIGS. 18 and 19, that the valve actuator piston 97 also has a liquid cylinder side axial face 102 which communicates with the gas and liquid reservoir 14 and on which the pressure P2 in said reservoir 14 and in the liquid cylinder 8 is exerted, said face being able to come into contact, as FIG. 18 shows, with a liquid cylinder side abutment 118 when the valve actuator piston 97 is moved in the direction of said liquid cylinder side axial face 102.

In FIGS. 18 and 19, it is noted that an actuation piston return spring 103 tends to repel the valve actuator piston 97 in the direction of its valve actuation axial face 99, and that an overflow flap return spring 128 tends to return the overflow flap 100 in contact with the overflow flap seat 104 with which it engages.

As is easily deduced from FIGS. 18 and 19, such that the repression valve 88 can operate, the force that the actuation piston return spring 103 produces must be greater than the force that the overflow flap return spring 128 produces.

Thus, and as is easily understood from FIGS. 18 and 19, when the pressure P2 which is in the gas and liquid reservoir 14 and the liquid cylinder 8 is less than the pressure P1 which is in the overflow reservoir 83, the liquid cylinder side axial face 102 of the valve actuator piston 97 is maintained flattened on the liquid cylinder side abutment 118, while the actuation piston return spring 103 is compressed by the force that the pressure difference P1 minus P2 produces between that which is exerted on the valve actuation axial face 99 and that which is exerted on the liquid cylinder side axial face 102.

In this case, the overflow flap 100 rests on its overflow flap seat 104, and the working liquid 13 cannot circulate between the variable overflow pump volume 86 and the liquid cylinder 8.

When the hydraulic piston 10 of the compressor 3 arrives at the high neutral position, the pressure P2 which is in the liquid cylinder 8 becomes substantially equal to the pressure P1 which is in the overflow reservoir 83, and the pressure which is exerted on the valve actuation axial face 99 is equivalent to that which is exerted on the liquid cylinder side axial face 102.

It results from this situation, that the actuation piston return spring 103 repels the valve actuator piston 97 in the direction of the overflow flap 100, until the valve actuation axial face 99 comes into contact with said flap 100, then raises the latter from its overflow flap seat 104 and this, until said flap 100 reaches a maximum flap opening abutment 131.

The overflow flap 100 being moved away from its overflow flap seat 104, the two-body staged piston 89 can be moved under the action of its two-body piston return spring 96, and expel working liquid 13 from the variable overflow pump volume 86 to the gas and liquid reservoir 14.

While the hydraulic piston 10 of the compressor 3 starts descending again, which corresponds to the cross-section D-E of the pressure-volume diagram of FIG. 5, the pressure P2 in the gas and liquid reservoir 14 and the liquid cylinder 8 becomes less than the pressure P1 which is in the overflow reservoir 83.

The compression of the actuation piston return spring 103 by the valve actuator piston 97 results from this, the latter being moved under the effect of the pressure difference P1 minus P2 between that which is exerted on its valve actuation axial face 99, and that which is exerted on its liquid cylinder side axial face 102, said piston 97 leaving the overflow flap return spring 128 returning the overflow flap 100 in contact with its overflow flap seat 104.

It is noted in FIGS. 20 and 21, that the overflow pump 82 of the expander 4 falls under the same principles as those which have just been described, with this difference that the transferring of working liquid 13 from the overflow reservoir 83 to the liquid cylinder 8 occurs not when the hydraulic piston 10 reaches its high neutral position, but when said piston 10 reaches its low neutral position.

This is due to the fact that the cycle of the compressor 3 occurs, on average, at a pressure lower than that in the repression plenum 62 of said compressor 3, while the cycle of the expander 4 occurs, on average, at a pressure greater than that in the repression plenum 62 of said expander 4.

Therefore, such that the filling of the variable overflow pump volume 86 can occur, the operation with respect to the pressure differences of the overflow pump 82 of the compressor 3 must be preferably inverted with respect to that of the overflow pump 82 of the expander 4.

As is easily deduced from FIG. 9, the controlling of the heat pump 55 is performed mainly by adjusting the rotation speed of the crankshaft 24 and by adapting the laws of motion of controlled expander valves 54, the latter each being actuated in opening and/or in closing by a valve actuator 119, said controlling of said speed and of said actuator 119 being ensured by a computer 120.

As, indeed, with all things being equal, the power of the heat pump 55 is proportional to the rotation speed of its crankshaft 24, which is a first adjustment which enables the computer 120 to adjust said power.

But, further to the rotation speed of its crankshaft 24, the more or less late and more or less staggered raising of the controlled expander valves 54 makes it possible, in particular, to adjust the pressure which is in the low pressure gas reservoir 60 relative to that which is in the high pressure gas reservoir 58.

This adjustment has a great importance, in that the pressure difference in question determines, in particular, the quantity of heat produced by the heat pump 55 upon each rotation of the crankshaft 24.

This adjustment occurs, for example, by making the expander 4 transfer less working gas 5 from the high pressure gas reservoir 58 to the gas and liquid reservoir 14 during the cross-section F-G of the diagram of said expander 4 of FIG. 5, than the compressor 3 transfers during the cross-section C-D of said diagram, which has the effect of making the pressure increase in the high pressure gas reservoir 58, while making the pressure lower in the low pressure gas reservoir 60.

If, on the contrary, the expander 4 transfers more working gas 5 from the high pressure gas reservoir 58 to the gas and liquid reservoir 14 during the cross-section F-G of the diagram of said expander 4 of FIG. 5, than the compressor 3 transfers during the cross-section C-D of said diagram, the pressure in the high pressure gas reservoir 58 lowers, however that the pressure increases in the low pressure gas reservoir 60.

It will be noted, that advantageously, the controlled expander valves 54 can behave both like valves and like flaps, i.e. that it can open under the effect of a pressure difference, in addition to being actuated in opening by their valve actuator 119.

In this regard, said valves 54 are preferably autoclaves, i.e. that during the majority of the time of the thermodynamic cycle of the expander 4, the pressure difference between the intake plenum 21 of said expander 4 and its gas and liquid reservoir 14, or that between the repression plenum 62 of said expander 4 and said reservoir 14, tends to maintain said valves 54 flattened on their seat, the latter being able to be, for example, constituted of an elastomer or polymer O-ring housed in a recess.

If, however, the pressure in the gas and liquid reservoir 14 of the expander 4 becomes greater than that in the intake plenum 21 of said expander 4, the controlled expander valve 54 can open without intervention of its valve actuator 119.

The same applies for the controlled expander valve 54, which communicates with the repression plenum 62 of said expander 4 via its outlet port 7, said valve 54 being able to open without intervention of its valve actuator 119, if the pressure which is in said plenum 62 becomes greater than that which is in the gas and liquid reservoir 14 of said expander 4.

It is easily deduced from FIG. 9, that the heat pump 55 can operate in "heating" mode when the heating and cooling underfloor 106 placed inside a building 121 forms the heating means 18 which are connected to the heat export or input means 17 of the compressor 3, while the air-water exchanger 107 placed outside 122 of said building 121 constitutes the cooling means 19, which are connected to the heat export or input means 17 of the expander 4.

If the heat pump 55 operates in "air conditioning" mode, the heating and cooling underfloor 106 placed inside said building 121 forms the cooling means 19 which are connected to the heat export or input means 17 of the expander 4, however that the air-water exchanger 107 placed outside 122 of said building 121 constitutes the cooling means 19 which are connected to the heat export or input means 17 of the compressor 3.

The change of mode can easily be performed by inverting the heat transport conduits 38 using one or more manual or motorised valves, whatever their type, said conduits 38 initially connected to the compressor 3 becoming connected to the expander 4, and vice versa.

It will be noted that the mechanical liquid piston slow expansion compressor 1 according to the invention and the heat pump 55 which results from this can, further to the different members and accessories represented in FIGS. 1 to 4 and in FIGS. 6 to 23, comprise various other appliances and accessories such as pressure and/or temperature sensors, a frequency variator to adjust the electric power supply of the electric drive motor 27, at least one angular coder and/or a passage detection sensor which returns to the computer 120, the speed and/or the angular position of the crankshaft 24, one or more pumps and/or compressors and/or valves making it possible to transfer working gas 5 or working liquid 13 from external sources to the high pressure gas reservoir 58 or the low pressure gas reservoir 60, or between said reservoirs 58, 60, purges, safety elements for people, pressure limiters or discharge valves, or any other equipment known to a person skilled in the art.

The heat pump 55 formed from the mechanical liquid piston slow expansion compressor 1 according to the invention can also comprise a thermal insulation layer 59 on all the necessary members, and whatever the nature of said layer 59, which can take the form of flexible or rigid insulating foam or wool, bricks, plates or screens which reflect radiations of any nature.

The thermal insulation layer 59 can insulate the heat pump 55 and its components from the environment outside said pump 55 and/or insulate the compressor 3 which is hot, from the expander 4 which is colder.

The heat pump 55 can also receive an acoustic insulation envelope, and its static frame 40 can rest on the floor by way of anti-vibration elastic studs.

The options of the mechanical liquid piston slow expansion compressor 1 according to the invention are not limited to the applications which have just been described, and it must moreover be understood that the description above has only been given as an example and that it does not at all limit the field of said invention, which is not moved away from by replacing the details of execution described by any other equivalent.

The invention claimed is:

1. A mechanical liquid piston slow expansion compressor defining a variable pneumatic volume which forms a compressor or an expander, a working gas being able to enter said volume via an input port or exit from said volume via an outlet port, comprising:

A liquid cylinder which can, directly or indirectly, pivot about a tilt axis which is perpendicular to the axis of said cylinder and which is secured to a static frame;

A hydraulic piston which can sealingly translate into the liquid cylinder to form with the latter, a variable hydraulic volume which is totally or partially filled with a working liquid;

A gas and liquid reservoir which is connected to the variable hydraulic volume by a communication conduit, such that said reservoir is mainly or totally filled with working liquid when the variable hydraulic volume is minimum, and is totally or partially filled with working gas when the variable hydraulic volume is maximum, the variation of absolute volume of the working gas contained in the variable pneumatic volume forming on the one hand, the variable pneumatic volume, and being on the other hand, approximately equal to the variation of absolute volume of the working liquid contained in the variable hydraulic volume;

Heat exchange and accumulation means housed in the gas and liquid reservoir, said means being able, on the one hand, to exchange heat with the working gas or with the working liquid and on the other hand, to temporarily store all or some of said heat;

Heat export or input means which take or which transfer, directly or indirectly, heat to the heat exchange and accumulation means and/or to the working liquid and/or to the working gas, said heat taken then being transferred to heating means or said transferred heat having been taken beforehand to cooling means, said heating means and said cooling means being external to the gas and liquid reservoir;

Filling means which enable or prohibit the passage of working gas from an intake plenum to the gas and liquid reservoir via the inlet port;

Draining means which enable or prohibit the passage of working gas from the gas and liquid reservoir to a repression plenum via the outlet port;

A connecting rod a first rod end of which is fixedly secured to the hydraulic piston, said rod being approximately parallel to the longitudinal axis of said piston;

Piston guiding means which maintain the hydraulic piston and the connecting rod parallel to said cylinder, whatever the position of said piston in said cylinder;

A crankshaft which can rotate about an axis parallel to the tilt axis in at least one shaft bearing, and which has at least one crank around which a second rod end of the connecting rod is articulated;

At least one drive motor which directly or indirectly rotates the crankshaft;

Kinetic energy storage means, which are directly or indirectly connected to the crankshaft.

2. The mechanical liquid piston slow expansion compressor according to claim 1, wherein the tilt axis is a tubular ball joint which is disposed at an end of the liquid cylinder, and the inside of which totally or partially forms the communication conduit, said ball joint being able to sealingly pivot in a female ball joint housing secured to the gas and liquid reservoir.

3. The mechanical liquid piston slow expansion compressor according to claim 2, wherein the tubular ball joint receives in its centre, a ball joint axis which is parallel to the tilt axis, said axis being articulated around a ball joint bridle which is directly or indirectly secured to the gas and liquid reservoir.

4. The mechanical liquid piston slow expansion compressor according to claim 3, wherein the ball joint bridle is connected to the gas and liquid reservoir by way of an articulated bridle connection around which said bridle can rotate.

5. The mechanical liquid piston slow expansion compressor according to claim 1, wherein the liquid cylinder and the gas and liquid reservoir form a rigid assembly which pivots about the tilt axis.

6. The mechanical liquid piston slow expansion compressor according to claim 1, wherein the heat exchange and accumulation means are constituted of a porous medium which has porosities into which and from which the working liquid and the working gas alternatively enter and exit.

7. The mechanical liquid piston slow expansion compressor according to claim 1, wherein the heat export or input means are constituted of a circulating part of the working liquid, said part exiting from the liquid cylinder or from the gas and liquid reservoir via a liquid outlet conduit to return into said cylinder or into said reservoir via a liquid inlet conduit, this after having transferred heat to the heating means or after having taken heat to the cooling means.

8. The mechanical liquid piston slow expansion compressor according to claim 1, wherein the heat export or input means are constituted of at least one heat exchanger conduit housed in the gas and liquid reservoir and in which a heat-transfer fluid circulates, which transports the heat taken or transferred to the heat exchange and accumulation means and/or to the working liquid and/or to the working gas up to the cooling means or to the heating means via heat transport conduits.

9. The mechanical liquid piston slow expansion compressor according to claim 1, wherein the heat exchange and accumulation means are constituted of at least one liquid spray nozzle supplied by a liquid spray pump, said nozzle being able to atomise the working liquid into fine droplets in the internal volume of the gas and liquid reservoir.

10. The mechanical liquid piston slow expansion compressor according to claim 1, wherein the tilt axis is constituted of a rolling track which is secured to the static frame and on which a rolling surface which is directly or indirectly secured to the liquid cylinder can roll, a rolling track gearwheel, the primitive circle of which coincides with the contact line between the rolling track and the rolling surface being secured to the static frame and engaging with a rolling surface gearwheel, which is directly or indirectly secured to the liquid cylinder.

11. The mechanical liquid piston slow expansion compressor according to claim 1, wherein the piston guiding means are constituted of a sliding pivot connection formed between an external cylindrical surface that the connecting rod has, and a sliding ring which is securely connected to the liquid cylinder by way of a ring carrier structure.

12. The mechanical liquid piston slow expansion compressor according to claim 1, wherein the piston guiding means are constituted of a guiding skirt provided at the periphery of the hydraulic piston, said skirt being able to translate at a low clearance into said cylinder.

13. The mechanical liquid piston slow expansion compressor according to claim 1, wherein the filling means and/or the draining means are constituted of at least one compressor flap or at least one controlled compressor valve, wherein in operation, the working gas is expelled from the gas and liquid reservoir via the repression plenum under a pressure greater than that under which it has been introduced beforehand in said reservoir via the intake plenum, while the heat export or input means transfer heat to the heating means, such that the variable pneumatic volume forms a compressor.

14. The mechanical liquid piston slow expansion compressor according to claim 1, wherein characterised in that the filling means or the draining means are constituted of at least one controlled expander valve, wherein in operation, the working gas is expelled from the gas and liquid reservoir via the repression plenum under a pressure less than that under which it has been introduced beforehand in said reservoir via the intake plenum, while the heat export or input means take heat to the cooling means, such that the variable pneumatic volume forms an expander.

15. The mechanical liquid piston slow expansion compressor according to claim 13 comprising both the compressor and the expander, each with a respective crankshaft, wherein the repression plenum of the compressor is connected to the intake plenum of the expander by a high pressure gas conduit, such that the working gas repressed via the repression plenum of said compressor is introduced in said expander via the intake plenum of said expander, the crankshaft of said compressor being directly or indirectly connected to the crankshaft of said expander, said compressor and said expander engaging to form a heat pump.

16. The mechanical liquid piston slow expansion compressor according to claim 15, wherein the high pressure gas conduit is connected to at least one high pressure gas reservoir.

17. The mechanical liquid piston slow expansion compressor according to claim 15, wherein the intake plenum of the compressor and the repression plenum of the expander communicate by way of a low pressure gas reservoir to which they are respectively connected by a low pressure gas conduit.

18. The mechanical liquid piston slow expansion compressor according to claim 1, wherein the intake plenum and the repression plenum are positioned in the upper part of the gas and liquid reservoir, the latter itself being positioned above the liquid cylinder, such that due to the Earth's gravity, the working gas always exits first from the gas and liquid reservoir via the repression plenum, and that the working liquid always enters first in said reservoir via the intake plenum.

19. The mechanical liquid piston slow expansion compressor according to claim 5, wherein the tilt axis is constituted of a hollow cylindrical axis which has at least one opening radial space, said cylindrical axis being positioned above the gas and liquid reservoir, while the intake plenum and/or the repression plenum is connected to an annular gas collector which surrounds said cylindrical axis and which comprises the opening radial space, such that the working gas can circulate between the inside of the hollow cylindrical axis and the intake plenum and/or the repression plenum via the opening radial space and the annular gas collector.

20. The mechanical liquid piston slow expansion compressor according to claim 1, wherein the kinetic energy storage means are constituted of a low speed inertia flywheel which is rotatably secured, to the crankshaft, and includes a ring gear that the drive motor rotates by way of at least one ring drive pinion, the primitive diameter of which is smaller than that of said ring gear, the latter and said pinion forming a high gearing mesh system, wherein a high speed inertia flywheel is directly or indirectly rotatably secured to the ring drive pinion.

21. The mechanical liquid piston slow expansion compressor according to claim 9, wherein the liquid spray pump is constituted of a pump cylinder which is provided in the liquid cylinder and/or in an extension of said cylinder, a pump piston moved by the hydraulic piston and/or by the liquid cylinder being able to translate into said pump cylinder.

22. The mechanical liquid piston slow expansion compressor according to claim 21, wherein the pump piston comprises a start-of-travel touch needle by way of which it is moved, said piston being returned on an end-of-travel abutment by a piston return mass.

23. The mechanical liquid piston slow expansion compressor according to claim 21, wherein the pump piston is moved by way of a movement spring.

24. The mechanical liquid piston slow expansion compressor according to claim 1, wherein, upon each rotation of the crankshaft, an overflow pump transfers a small quantity of working liquid from an overflow reservoir to the gas and liquid reservoir and/or the liquid cylinder.

25. The mechanical liquid piston slow expansion compressor according to claim 24, wherein the overflow reservoir communicates with the repression plenum, the working gas pressure which is in said reservoir being close or identical to that which is in said plenum.

26. The mechanical liquid piston slow expansion compressor according to claim 24, wherein characterised in that the overflow pump comprises a pump blind cylinder into which an overflow pump piston can sealingly translate, the latter and said cylinder forming a variable overflow pump volume which, when it increases, is filled with working liquid coming from the overflow reservoir via at least one overflow pump intake flap and which, when it decreases, represses said liquid to the gas and liquid reservoir and/or the liquid cylinder via a repression valve.

27. The mechanical liquid piston slow expansion compressor according to claim 26, wherein the overflow pump piston is a two-body staged piston which comprises a body of a large diameter which has a face with a large cross-section which forms one of the walls of the variable overflow pump volume, said staged piston also comprising, axially opposite the face with a large cross-section, a body of a small diameter which can sealingly translate into an actuation cylinder, the internal volume of which is connected, directly or not, to that of the liquid cylinder, said body of a small diameter having a face with a small cross-section on which the pressure which is in the liquid cylinder is exerted, said staged piston also offering, at the junction between the body of a large diameter and the body of a small diameter, a face with an average cross-section from which the body of a small diameter emerges, which is connected to the overflow reservoir, and which is subjected to the pressure in said reservoir, while a staged piston abutment fixes the maximum volume of the variable overflow pump volume and that a two-body piston return spring tends to repel the two-body staged piston in the direction of its face with a large cross-section.

28. The mechanical liquid piston slow expansion compressor according to claim 27, wherein the repression valve comprises a valve actuator piston which can sealingly translate into a valve actuator cylinder and which has, firstly, a valve actuation axial face which communicates with the overflow reservoir and on which the pressure in said reservoir is exerted, said face being able to raise an overflow flap from an overflow flap seat when the valve actuator piston is moved in the direction of said face which has the effect of putting the variable overflow pump volume in communication with the gas and liquid reservoir and/or the liquid cylinder via said overflow flap, and secondly, a liquid cylinder side axial face which communicates with the liquid cylinder, on which the pressure in said cylinder is exerted, and which can come into contact with a liquid cylinder side abutment when the valve actuator piston is moved in the direction of said liquid cylinder side axial face, wherein an actuation piston return spring tends to repel the valve actuator piston in the direction of its valve actuation axial face, and that an overflow flap return spring tends to return the overflow flap in contact with the overflow flap seat with which it engages, the force that the actuation piston return spring produces being greater than the force that the overflow flap return spring produces.

29. The mechanical liquid piston slow expansion compressor according to claim 26, wherein the overflow pump piston is a two-body staged piston which comprises a body of a large diameter which has a face with a large cross-section which is connected to the overflow reservoir and which is subjected to the pressure in said reservoir, said staged piston also comprising, axially opposite the face with a large cross-section, a body of a small diameter, which can sealingly translate into an actuation cylinder, the internal volume of which is connected, directly or not, to that of the liquid cylinder, said body of a small diameter having a face with a small cross-section on which the pressure which is in the liquid cylinder is exerted, said staged piston also offering, at the junction between the body of a large diameter and the body of a small diameter, a face with an average cross-section from which the body of a smaller diameter emerges, said face forming one of the walls of the variable overflow pump volume, while a staged piston abutment fixed the maximum volume of the variable overflow pump volume and that a two-body piston return spring tends to repel the two-body staged piston in the direction of its face with a small cross-section.

30. The mechanical liquid piston slow expansion compressor according to claim 29, wherein the repression valve comprises a valve actuator piston which can sealingly translate into a valve actuator cylinder and which has, firstly, a valve actuation axial face which communicates with the liquid cylinder and on which the pressure in said cylinder is exerted, said face being able to raise an overflow flap from an overflow flap seat when the valve actuator piston is moved in the direction of said face which has the effect of putting the variable overflow pump volume in communication with the gas and liquid reservoir and/or the liquid cylinder via said overflow flap, and secondly, a reservoir side axial face which communicates with the overflow reservoir, on which the pressure in said reservoir is exerted, and which can come into contact with an overflow reservoir side abutment when the valve actuator piston is moved in the direction of said reservoir side axial face, wherein an actuation piston return spring tends to repel the valve actuator piston in the direction of its valve actuation axial face, and that an overflow flap return spring tends to return the overflow flap in contact with the overflow flap seat with which it engages, the force that the actuation piston return spring produces being greater than the force that the overflow flap return spring produces.

31. The mechanical liquid piston slow expansion compressor according to claim 1, further comprising counterbalancing means to incline the liquid cylinder during the rotation of the crankshaft.

32. The mechanical liquid piston slow expansion compressor according to claim 31, wherein the counterbalancing means are constituted of a counterbalancing mast which, comprises a counterbalancing mass and which, is articulated about a mast axis which is parallel to the tilt axis of the liquid cylinder and which is secured to the static frame, wherein the counterbalancing mast forms with said cylinder, a pivoting-sliding articulation and constitutes an imbalance contrary to that of said cylinder.

\* \* \* \* \*